United States Patent [19]

Volk, Jr. et al.

[11] Patent Number: 4,463,430

[45] Date of Patent: Jul. 31, 1984

[54] MICROPROCESSOR BASED PELLET MILL CONTROL

[75] Inventors: Joseph A. Volk, Jr., Florissant; David Garner, Hazelwood, both of Mo.

[73] Assignee: Beta Corporation, St. Louis, Mo.

[21] Appl. No.: 298,166

[22] Filed: Aug. 31, 1981

[51] Int. Cl.³ .......................... G06F 15/46; G05B 1/02
[52] U.S. Cl. .................... 364/468; 364/467; 364/188; 364/181; 364/180; 364/173; 137/2; 79/488; 79/487
[58] Field of Search ...................... 99/487, 488; 137/2, 137/3; 364/468, 469, 148, 173, 180, 181, 188

[56] References Cited

U.S. PATENT DOCUMENTS

| | | | |
|---|---|---|---|
| 3,066,709 | 12/1962 | Bale, Jr. et al. | 143/120 |
| 3,125,176 | 3/1964 | Bale, Jr. et al. | 177/36 |
| 3,148,971 | 9/1964 | MacDonald et al. | 241/15 |
| 3,181,482 | 5/1965 | Heth et al. | 107/4 |
| 3,217,927 | 11/1965 | Bale, Jr. et al. | 222/56 |
| 3,252,530 | 5/1966 | Bale, Jr. | 177/63 |
| 3,255,975 | 6/1966 | Malin et al. | 241/34 |
| 3,260,642 | 7/1966 | Canter, Jr. | 162/252 |
| 3,288,051 | 11/1966 | Dodgen et al. | 99/235 |
| 3,434,556 | 3/1969 | Bale, Jr. | 177/70 |
| 3,495,062 | 2/1970 | Puschner | 219/10.55 |
| 3,582,349 | 6/1971 | Rasmusson | 99/1 |
| 3,614,397 | 10/1971 | Probert et al. | 235/92 WT |
| 3,707,978 | 1/1973 | Volk, Jr. | 137/2 |
| 3,856,214 | 12/1974 | Kaltenbach et al. | 241/34 |
| 3,932,736 | 1/1976 | Zarow et al. | 364/468 |
| 4,028,552 | 6/1977 | Volk, Jr. | 250/570 |
| 4,069,709 | 1/1978 | Volk et al. | 73/228 |
| 4,177,951 | 12/1979 | Makuch | 241/35 |
| 4,183,675 | 1/1980 | Zarow | 99/487 X |
| 4,189,765 | 2/1980 | Kotalik et al. | 364/188 |
| 4,318,177 | 3/1982 | Rapp et al. | 364/468 X |
| 4,327,871 | 5/1982 | Larson | 241/18 |
| 4,340,937 | 6/1982 | Volk, Jr. | 364/468 |
| 4,342,361 | 8/1982 | Volk, Jr. | 165/113 |

FOREIGN PATENT DOCUMENTS

| | | |
|---|---|---|
| 1301405 | 7/1962 | France . |
| 4659232 | 6/1975 | Japan . |
| 0527203 | 7/1977 | U.S.S.R. ............................ 241/35 |

OTHER PUBLICATIONS

Deposition of Niels Skyt Jensen, *Beta Corp. vs. Norvidan Engineering,* U.S. District Court, Eastern District of Missouri, May 1983.

Reynolds, B., "Urea in Pelleting Feed Rations", Brochure published by American Feed Manufacturers Association, Inc.

Automatic Pellet Mill Pneumatic Load Temperature Control, Diagram, B-2100c and B-2100-1c, Sprout-Waldron & Co. Inc.

"Automated Pelleting Now a Reality", reprinted in *Pointers,* Sprout-Waldron & Co. Inc., 1959.

Sanyo Trading Co., Ltd., Letter to Robert Soper of California, Pellet Mill Co., Jan. 1979.

Smith, O. B., "Factors in Conditioning Pellet Mash", Proceedings of the 1959 Midwest Feed Production School, pp. 42-45.

Hastings, Dr. W. H., "How Operating Adjustments Affect Pelleting", *Feed Ape,* vol. 10, No. 4, pp. 45-47, 1960.

"Pellet Mill Operators Manual", American Feed Manufacturers Association, Inc., Feb. 1970.

"Pelleting Animal Feed", American Feed Manufacturers Association.

"Pellet Mill Operators Manual", American Feed Manufacturers Association, Inc., 1969.

Williams, M. H., "Pelleting of Hard Pellets", Proceedings of the 1956 Midwest Feed Production School, 1956, pp. 127-128.

Vaughan, J., "Designing a Pellet Mill Flow", Proceedings of the 1958 Midwest Feed Production School, 1958, p. 198.

Stroup, R. R., "Pelleting Dairy Feeds", Proceedings of the 1959 Midwest Feed Production School, 1959, pp. 24-25 and 30-31.

California Pellet Mill Pal Unit, Reproduction of 3 photographs, California Pellet Mill.

Automatic Control Panel Wiring Diagram, LCL Controls, D-3554-El, D-3554-E3 and D-3554-E2, Feb. 1969.

Lanz, G. T., "Operating Variables of Century Pellet Mill", Supplementary Report #2, Aug. 1962.

Husting, P., Letter Re: Semi Automatic Control of Pellet Mills to J. Speirs, Oct. 19, 1964.

"Production Trends for Pelleted Feed", *Feeds Illustrated*, May 1964, pp. 8-14.
"Operating Procedures and Features of the California Pellet Mill Automatic Load Control", California Pellet Mill Brochure, Feb. 1969.
"Stedilode Automatic Pellet Mill Control Unit: Instructions", Simon-Barron Ltd.
"Pellet Mill Controllers", Brochure, Simon-Barron Ltd.
"Pellet Mill Protection Unit: Instruction Manual", Simon-Barron Ltd.
California Pellet Mill Co., "Pellet Mill Automatic Load Control", drawing C5441, Aug. 1973.
"The Stedilode Pellet Mill Controller Mk. 5", Product Description, Simon-Barron Ltd.
Simon Fielden Stedilode Controller, Reproduction of a Photograph, Henry Simon Ltd.
Stedilode Controller, Advertisement Brochure, Henry Simon Ltd.
"Stedilode Feed Controller: Instructions for Erecting and Operating", Simon-Barron Ltd.
"Automated Pelletting at McMillen Mills", reprinted in *Feedstuffs*. Sprout, Waldron & Co., Jan. 1960.
"Automated Pelletting", brochure published by Sprout, Waldron & Co.
"Automated Motor Load Control", Advertisement Brochure published by Jordon Controls, Inc.
"Automatic Press Control", Brochure published by Simon-Barron Ltd., 1961.

*Primary Examiner*—Gareth D. Shaw
*Assistant Examiner*—Ronni S. Malamud
*Attorney, Agent, or Firm*—Rogers, Eilers & Howell

[57] ABSTRACT

A microprocessor based pellet mill controller provides fully automatic, programmed operation of a pellet mill with operator selection from among several operating system parameters to control a pellet run. The controller comprises an operator's console having a plurality of switches to permit operator selected between manual or automatic control of individual equipment in the mill; a plurality of switches to permit operator selection of a pellet formulation and mill load; a plurality of digital displays to monitor the status of ingredient input rates and total, and system operating parameters and totals; and a plurality of display lights to cue the operator and indicate equipment status. A software package is disclosed for achieving fully automatic operation, the microprocessor being capable to re-programming to alter its mode of operation.

29 Claims, 61 Drawing Figures

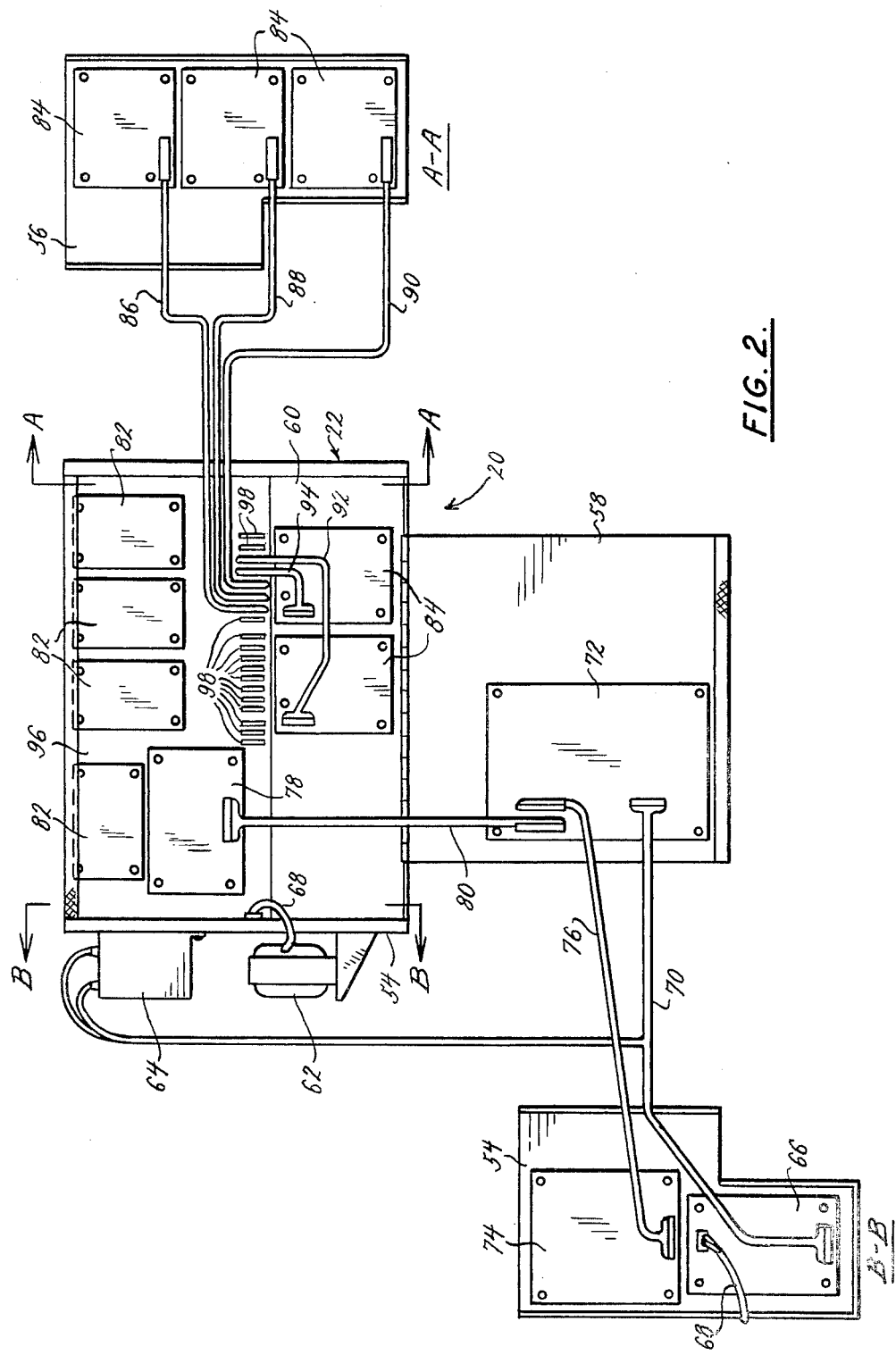

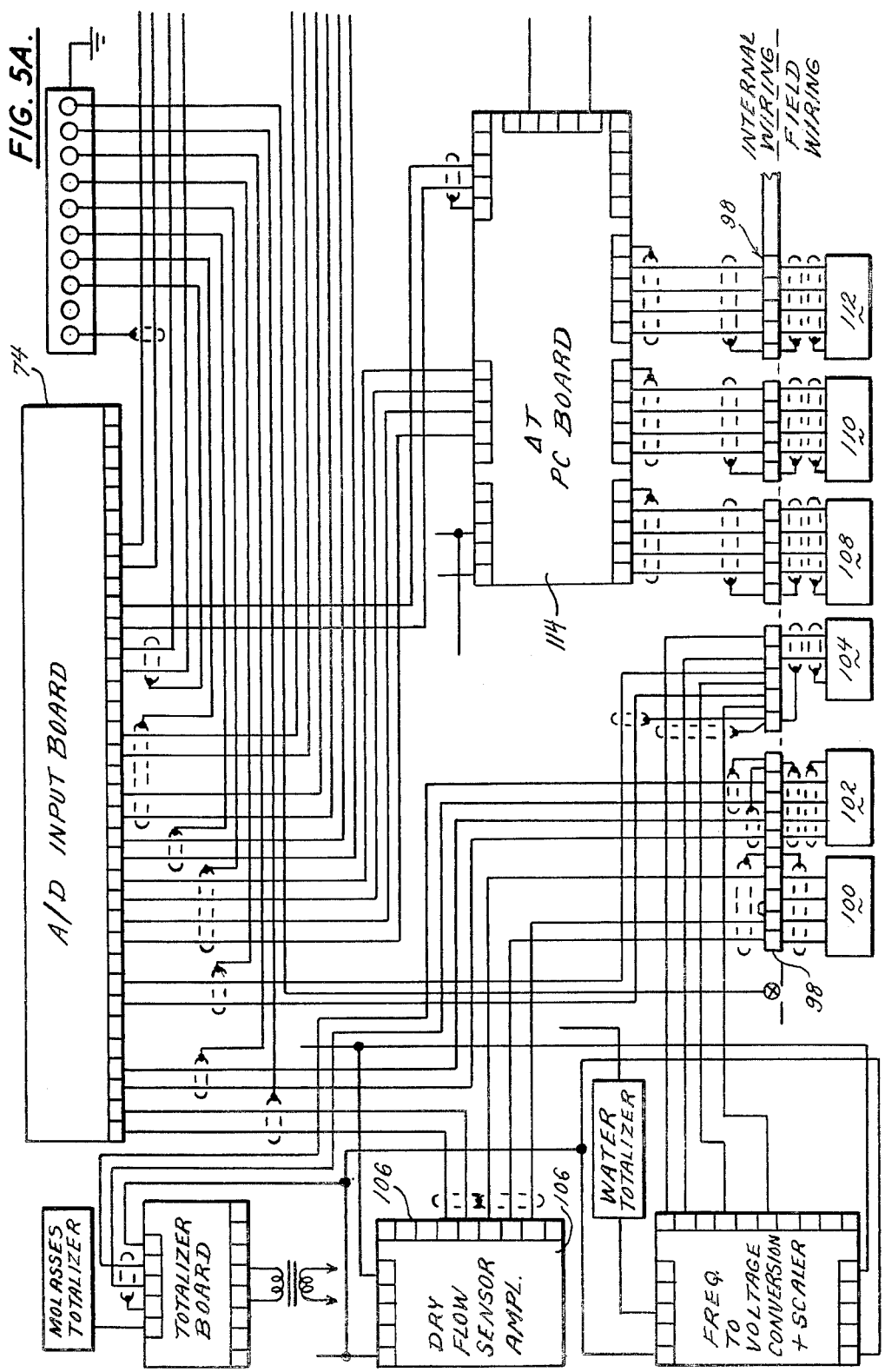

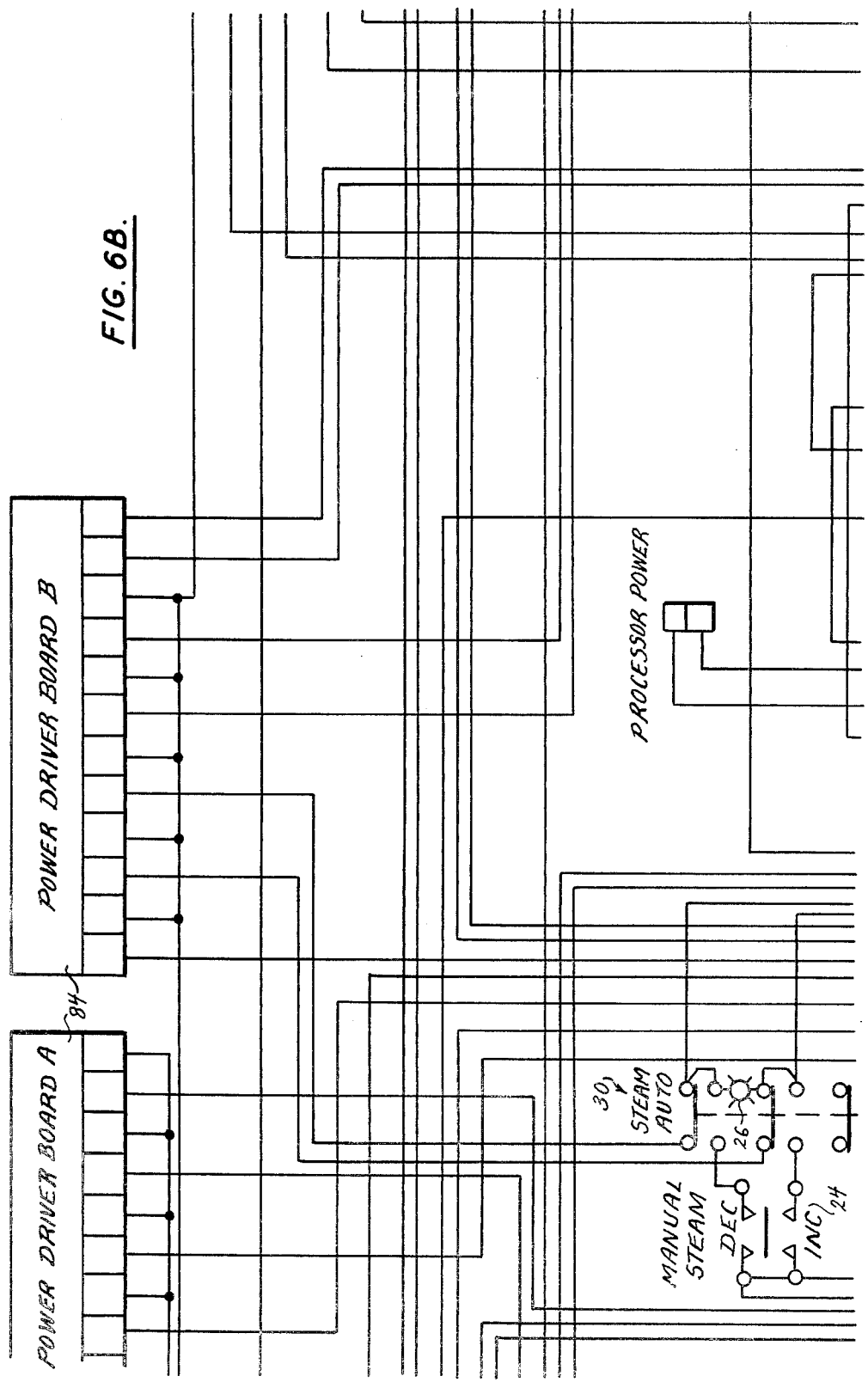

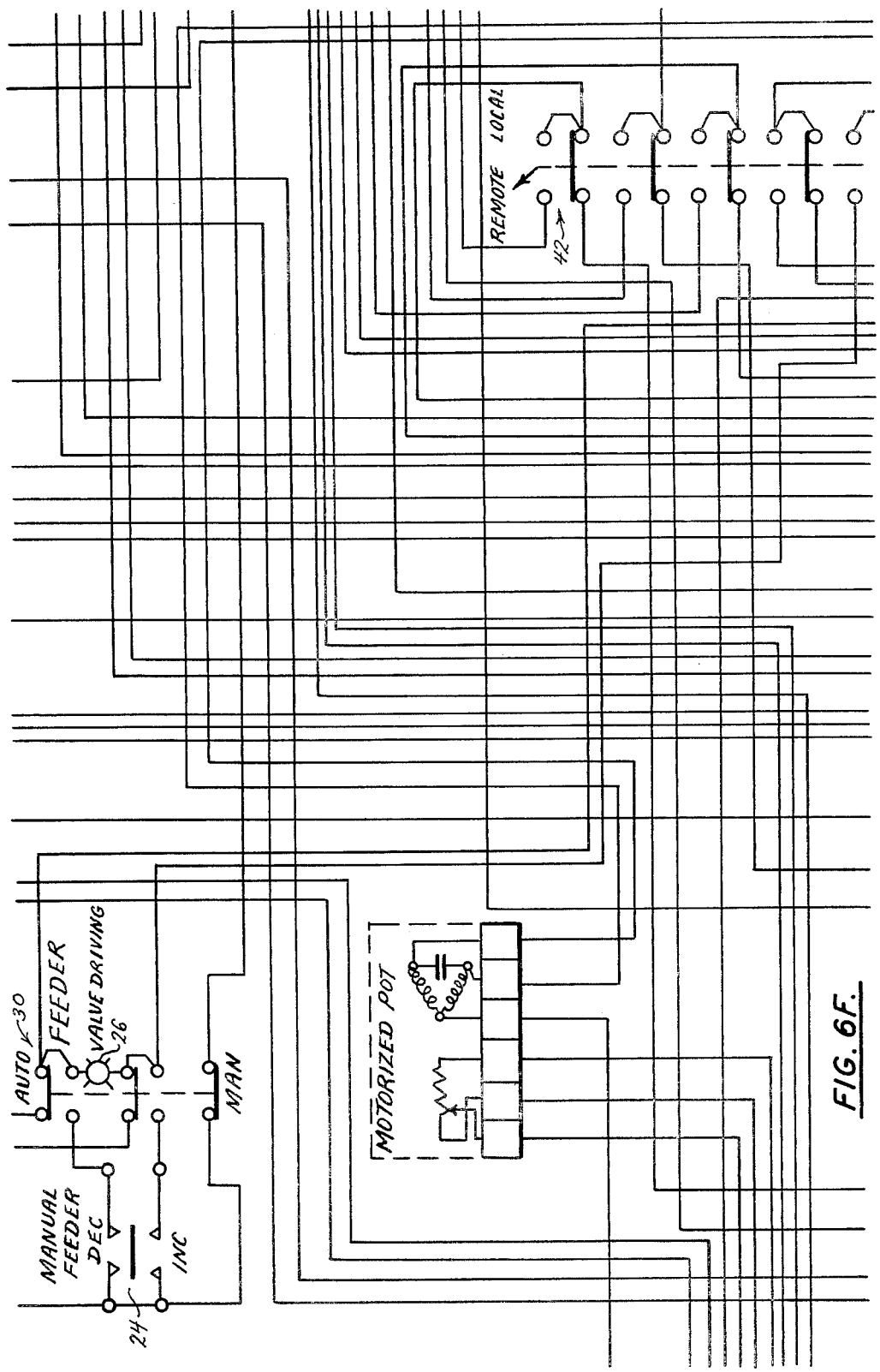

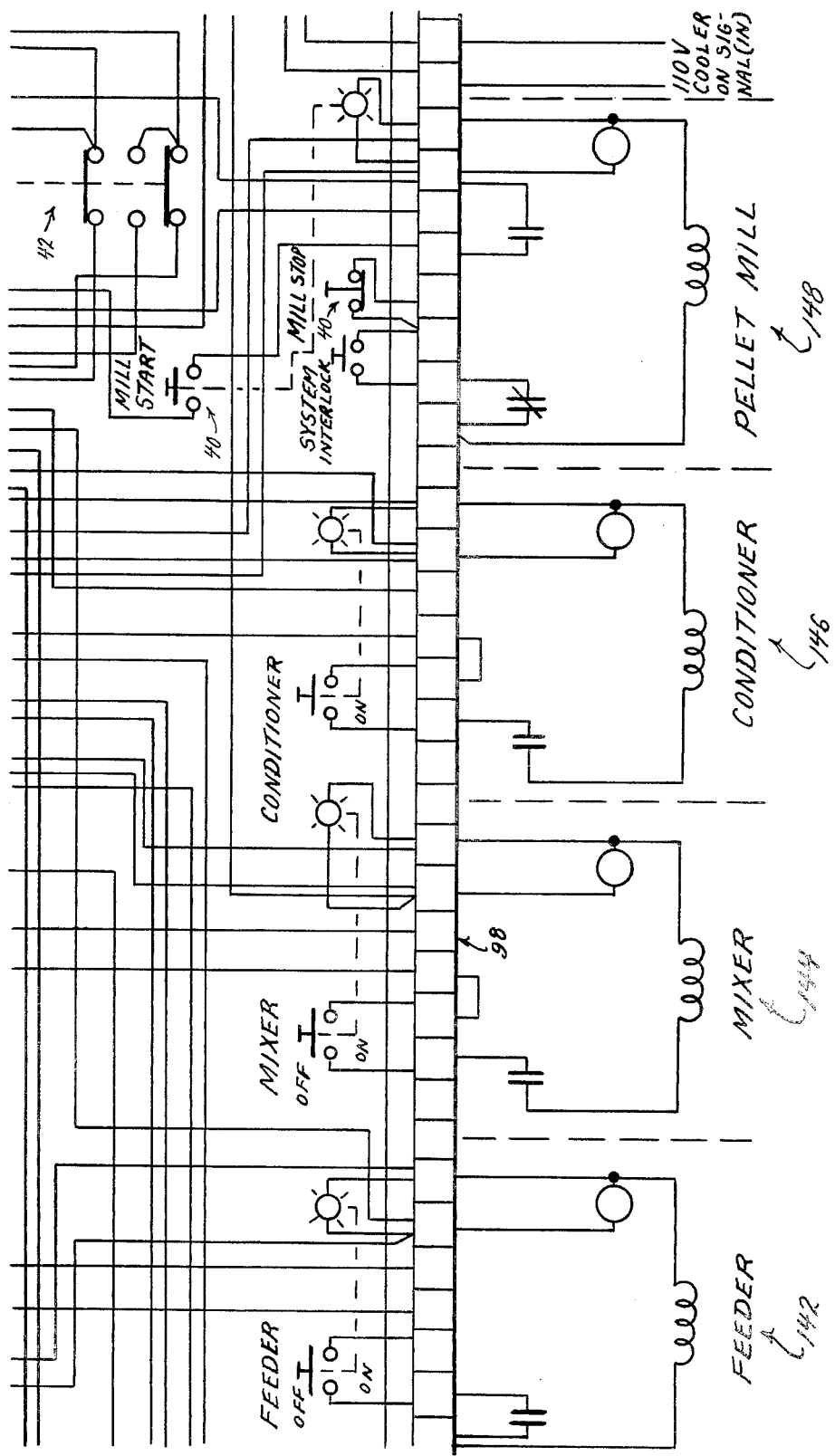

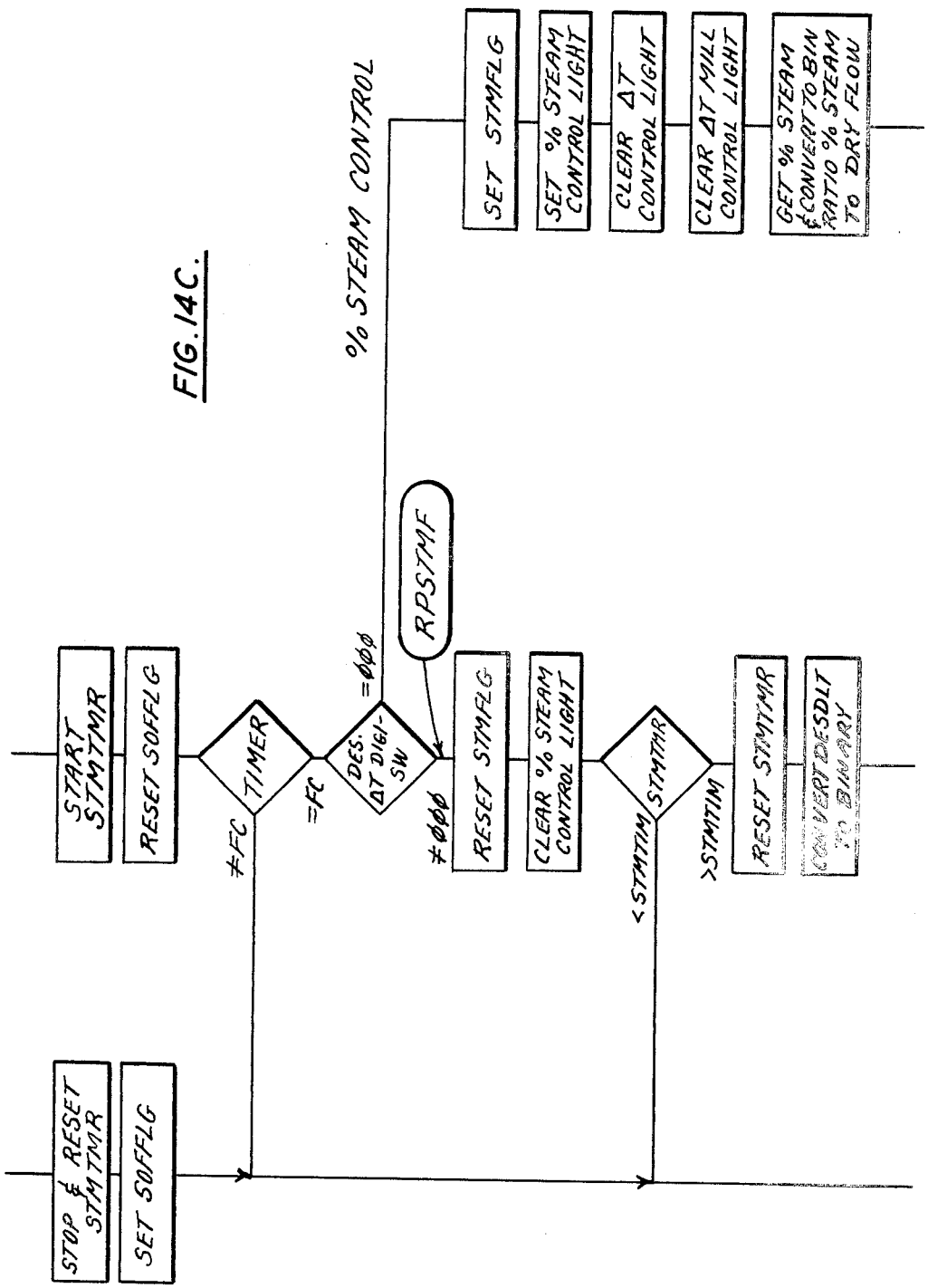

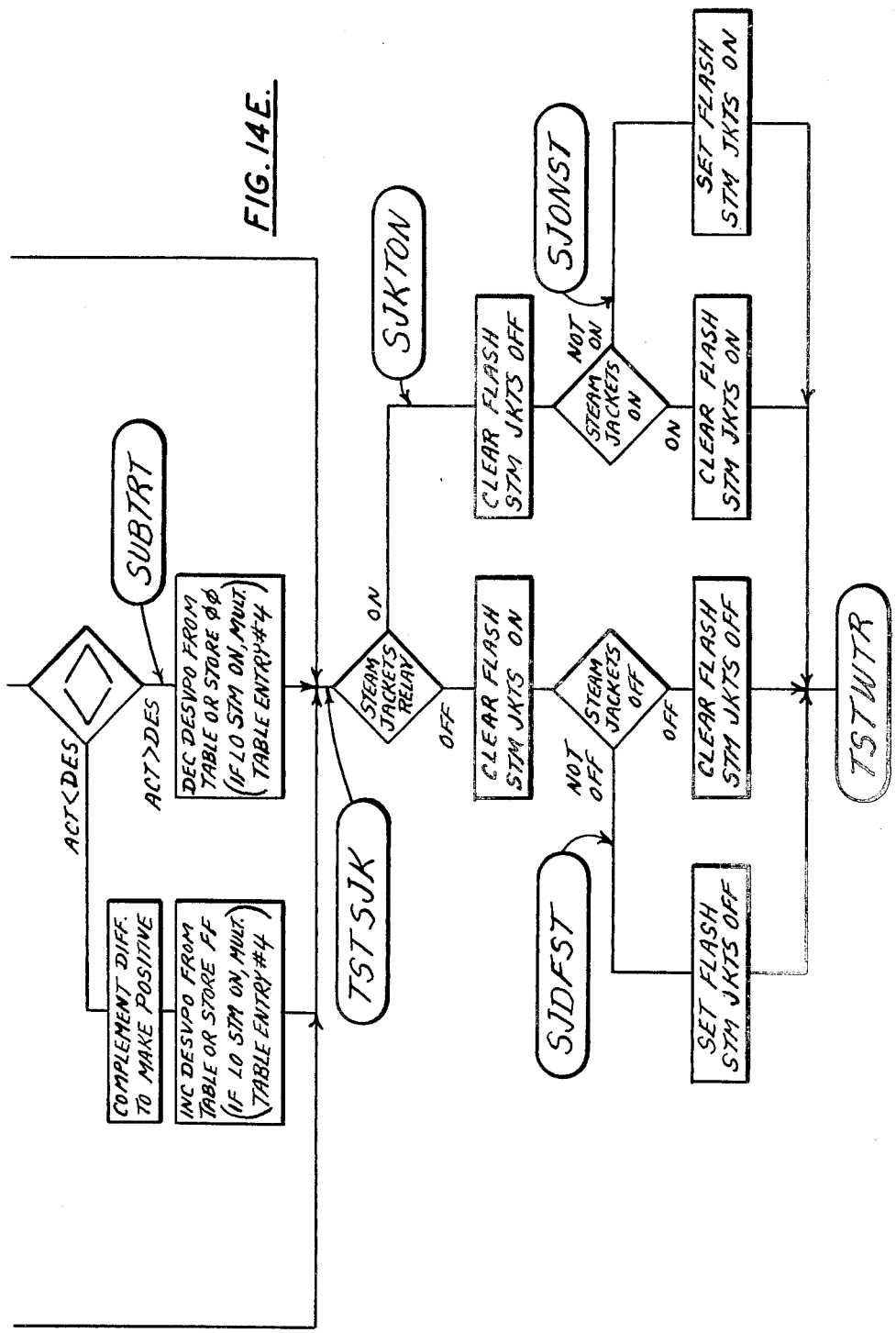

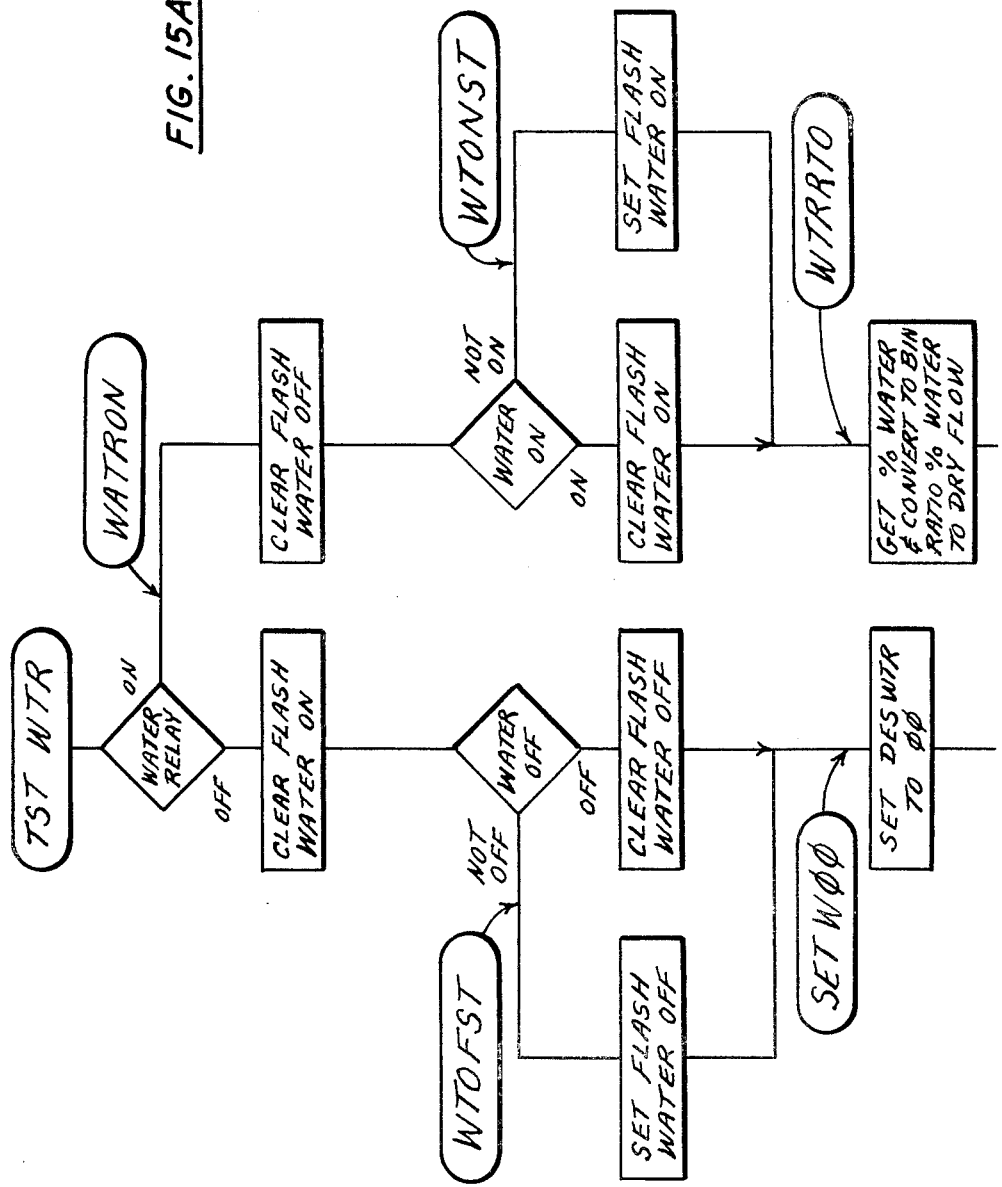

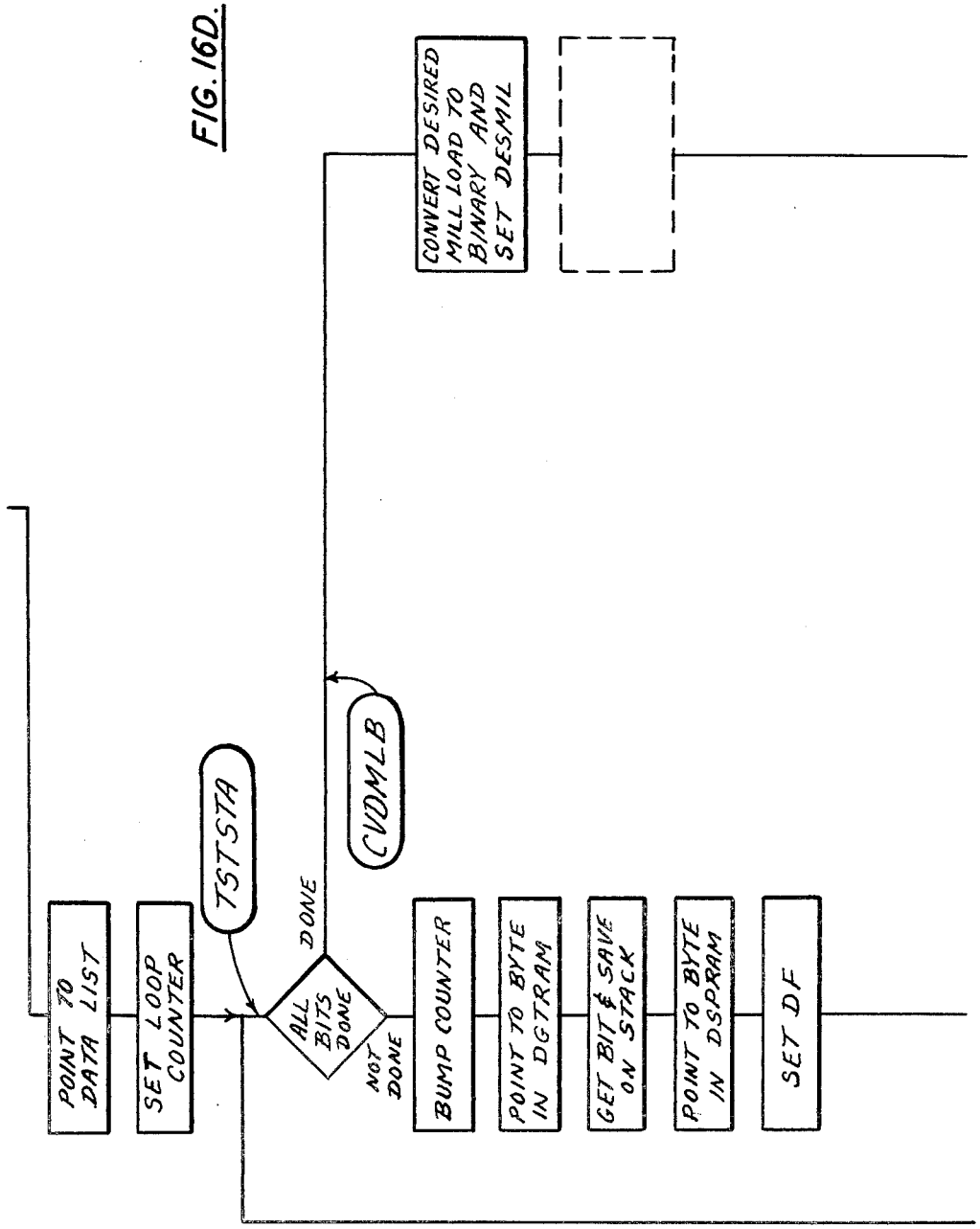

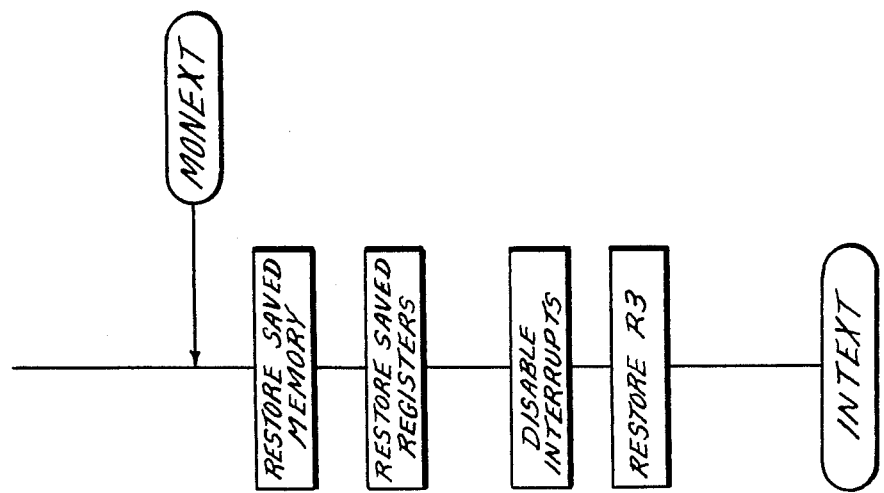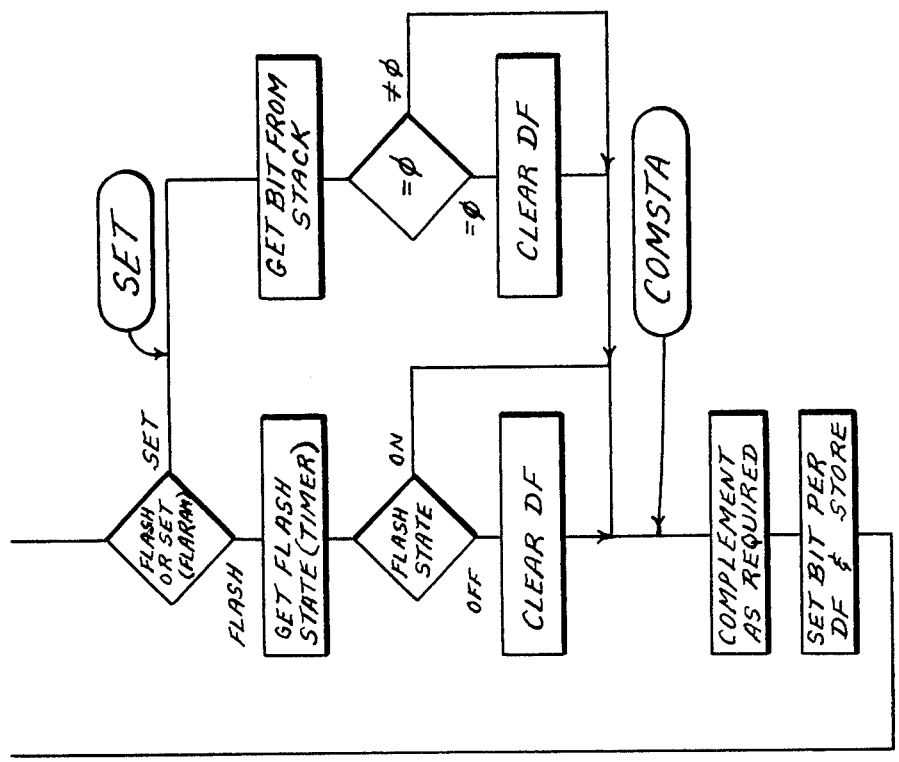
FIG. 16E.

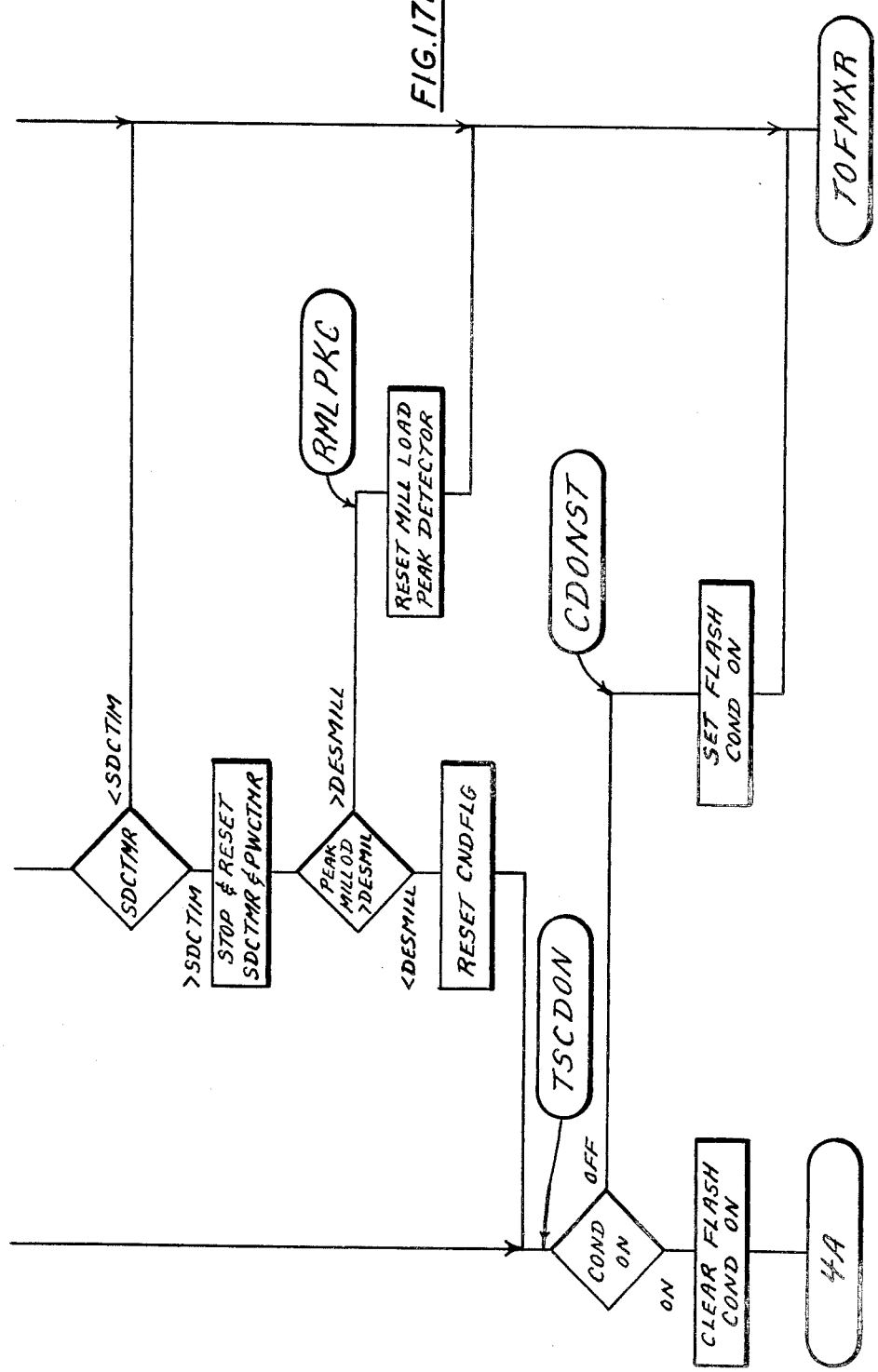

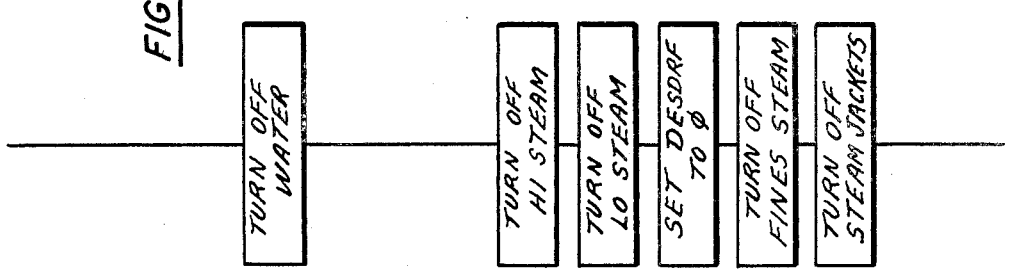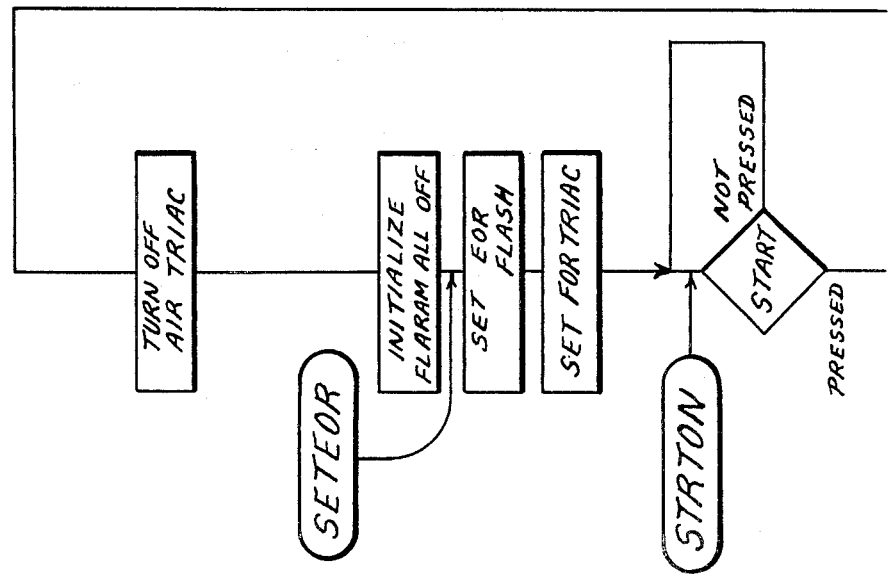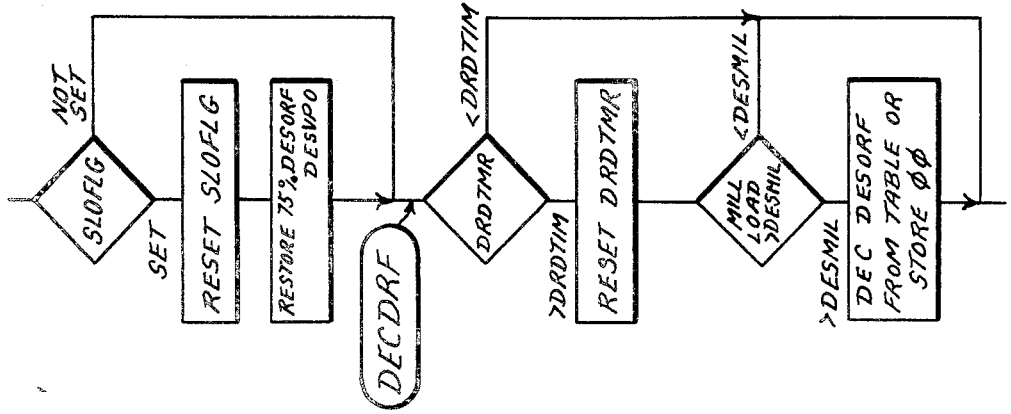
FIG.18C.

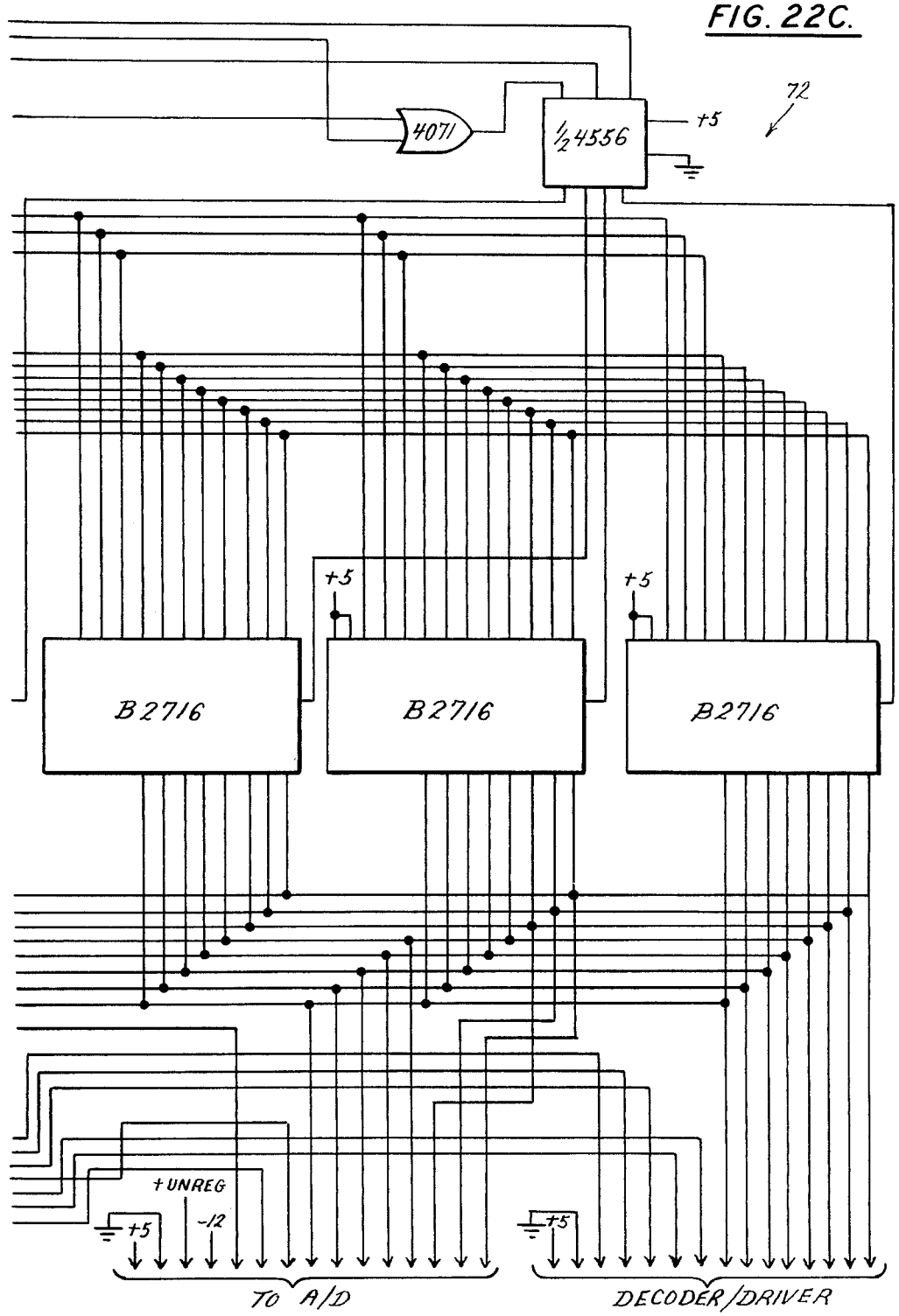

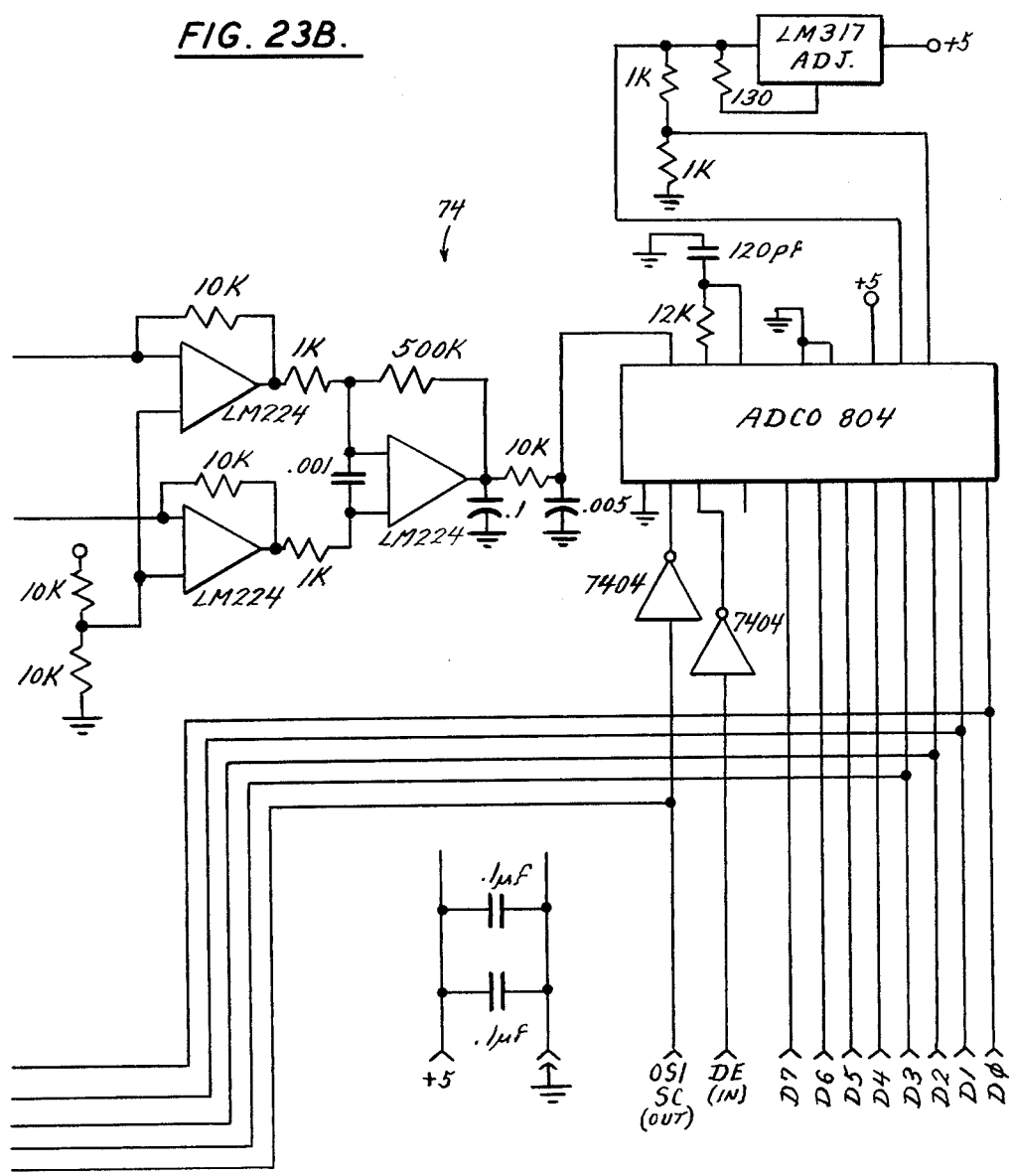

MICROPROCESSOR BASED PELLET MILL CONTROL

BACKGROUND AND SUMMARY

This invention is an improvement of the automatic pellet producing system of U.S. Pat. No. 3,932,736 owned by the same assignee, the disclosure of which is incorporated herein by reference. As explained more fully in the prior patent, feed pellet producing systems generally include a bin for containing a source of dry feed or other material from which the pellets are to be made, a mixer/conditioner where selected amounts of heat and moisture are added to the material as it is fed from the bin, and a roll and die into which the material is fed from the mixer/conditioner where it is pressed through holes in the die sidewall by the roll and cut off by a knife to form pellets. The formulation for most feed pellets includes not only the dry feed, but moisture in the form of water or steam, and molasses. The rate of input of these various ingredients determines not only the formulation of the finished pellets but also the temperature of the mix as it is processed and the load on the electric motor which is generally used to drive the die and roller. Of course, each of the ingredients affects the load in a different way with temperature and moisture content being found to be of critical importance for high quality and quantity production of pellets.

In the prior patent, an automatic system is disclosed and claimed for measuring a $\Delta T$ parameter defined as the temperature difference of the material as it moves into and out of the mixer/conditioner. This $\Delta T$ parameter is used to control the operation of the pellet mill within a specified normal operating load range by controlling the flow of steam into the mixer/conditioner. As a temperature increase or decrease may be achieved by varying the amount of steam, the change in temperature is also related to the change in moisture present in the mixture. Thus, the patent discloses and claims a system for controlling pellet mill operation in response to the moisture level of the mixture by monitoring the temperature change of the material as it flows through the mixer/conditioner. The invention disclosed and claimed in the patent is a very valuable and useful invention which represents a significant improvement over the prior art available at the time of invention in controlling pelleting operations. The controller includes various other features, such as overload protection, provision for automatic start-up after overload, automatic advancement of the feed rate and steam after overload, and other features which were theretofore unavailable in the prior art.

The assignee herein is also the owner of application Ser. No. 139,841 filed Apr. 14, 1980, now U.S. Pat. No. 4,340,937, which represents an improvement over the patented system disclosed and claimed in U.S. Pat. No. 3,932,736. The disclosure of application Ser. No. 139,841, now U.S. Pat. No. 4,340,937, is incorporated herein by reference. In that application, a control system is disclosed wherein a temperature difference or $\Delta T$ is taken across the mill itself ($\Delta T$ mill) and the rate of input of moisture related ingredients (such as steam) is controlled to maintain $\Delta T$ mill within a prescribed range; the range depending on pellet formulation. The advantages in using $\Delta T$ mill instead of $\Delta T$ are more completely explained in the application, but the concept is that $\Delta T$ mill is a more direct measure of the work done by the mill during pelleting. For a given pellet formulation, it is thought that optimum pelleting is achieved by maintaining a certain work level in the mill, and then running mill load up near maximum to achieve maximum throughput. The $\Delta T$ mill parameter may be fairly well controlled by adjusting the rate of input of moisture related ingredients; an increase in moisture lowering friction in the die and $\Delta T$ mill.

Although both of these inventions represent patentable improvements over the prior art, work continues in understanding the pelleting process and automating pellet mills to achieve maximum production of the highest quality durable pellets with the least amount of energy, equipment wear, and human intervention. As pelleting is generally considered to be an art at this stage of its development and not a science, it is believed that the final solution for automatically controlling a pelleting operation to achieve optimum results for all formulations has not been found. For the time being, it may be that certain formulations utilizing different kinds of dry feed may be processed with greater efficiency in certain mills using $\Delta T$ as the controlling parameter, $\Delta T$ mill in others, and possibly some other parameter or combination of parameters in others. With the present state of the art, it would be desirable to have a controller which permitted operator selection of $\Delta T$, or $\Delta T$ mill or some other system operating parameter as a controlled variable not only to match the particular idiosyncracies of a pellet mill, but also to adapt to different formulations in the same mill. It would also be desirable to have the capability to add other system operating parameters as controlled variables, or combine them in some way without making extensive changes to the control hardware. Also, a controller should be "human engineered" to guide an operator through a pelleting run by telling him what to do and when to do it, display needed information to assure the operator of proper mill operation, and warn him should equipment malfunction. A manual mode should also be available to accommodate special pelleting runs, to permit equipment testing, and operation of the mill under full operator control.

To solve these and other problems, applicant has succeeded in developing a microprocessor based pellet mill control which is programmable to define the relationship between any one or combination of system operating parameters and control the rate of input of any one or more ingredients to produce pellets having the desired formulation at a desired load. As the microprocessor is easily re-programmed by substituting one or more "chips", the controller may be easily modified to permit different modes of operation as the art of pelleting develops into a science. This virtually eliminates the worry of equipment obsolescence inherent with prior art controls. An operator's control panel contains the entire controller, with all the switch inputs, digital displays, and indicating lights being built right into the front thereof.

As his best mode, applicant has developed a software package which permits operator selection of either $\Delta T$, $\Delta T$ mill or mill load control by simply dialing in the desired temperature differential or zero. This software package provides other unique features such as preset load test points which enable or disable input of certain ingredients and a built in time delay before a sensed change in the operating parameter results in an adjustment in ingredient input.

In a typical automatic run with the software package herein, applicant's controller will check that all necessary equipment is electrically enabled and that there is feed in the input bin. It then starts a gradual flow of feed through the system until a minimum mill load is achieved. At that point, and as the system load stabilizes, the controller will automatically enable the input of liquids and ratio them in proper proportions to match the formulation as selected by the operator. Depending on the mode of control selected, the controller will continually adjust the flow rate of liquids as required to maintain the desired temperature differential and formulation dialed in by the operator and continually increase the flow of dry feed to bring the mill load up to the value preselected by the operator. The controller will decrease or completely stop the flow of dry feed as required if the mill overloads, the rolls slip, or any of the other vital equipment becomes non-functional. If the controller senses a stoppage in flow, or the mill is stopped by the controller, the liquids are automatically disabled. At the end of the run, conditions suitable for repelleting of the "fines" are provided and after the fines are re-pelleted, the system shuts down automatically and waits for the next run to be set up by the operator.

Virtually instantaneous monitoring and control of ingredient input enable applicant's microprocessor based controller to operate the mill at levels much nearer optimum than in a manual mode relying on human attentiveness and much slower reaction times. It is believed that maximum throughput is generally attained at conditions near plugging, where the mass of material would otherwise clog the mill causing overload of the mill drive motor. If plugging occurs, the mill must be shut down, cleaned out, and restarted which results in an expensive waste of material and a great loss of time. No human can approach a microprocessor in speed and attention span. Thus, with applicant's controller, safe and efficient operation at levels much closer to optimum are feasible, resulting in greater throughput with less energy, time, and equipment wear.

Some of the benefits and features of applicant's invention have been described. A fuller understanding thereof may be attained by referring to the drawings and description of the preferred embodiment which folows.

BRIEF DESCRIPTION OF THE DRAWINGS

FIG. 2 is a full view of the rear of the operator's console showing the PC board layout and cabling connections therebetween;

FIGS. 6A-K is a schematic diagram showing the connection points for outputs controlled by applicant's microprocessor controller, and the wiring for manual and automatic control, with cable connections shown to power driver output PC boards switching 120 volt AC control voltages and isolation PC boards sensing 120 volts AC control voltages;

FIGS. 14A-E is a flow chart of the first portion of the test monitor equipment subroutine;

FIGS. 15A-C is a flow chart of the test water portion of the test monitor equipment subroutine;

FIGS. 16A-E is a flow chart of the display update portion of the test monitor equipment subroutine;

FIGS. 17A-D is a flow chart of the first half of the main equipment monitor subroutine along with the test start subroutine;

FIGS. 18A-D is a flow chart of the second half of the main equipment monitor subroutine and test start subroutine;

DETAILED DESCRIPTION OF THE PREFERRED EMBODIMENT

Figure 1:
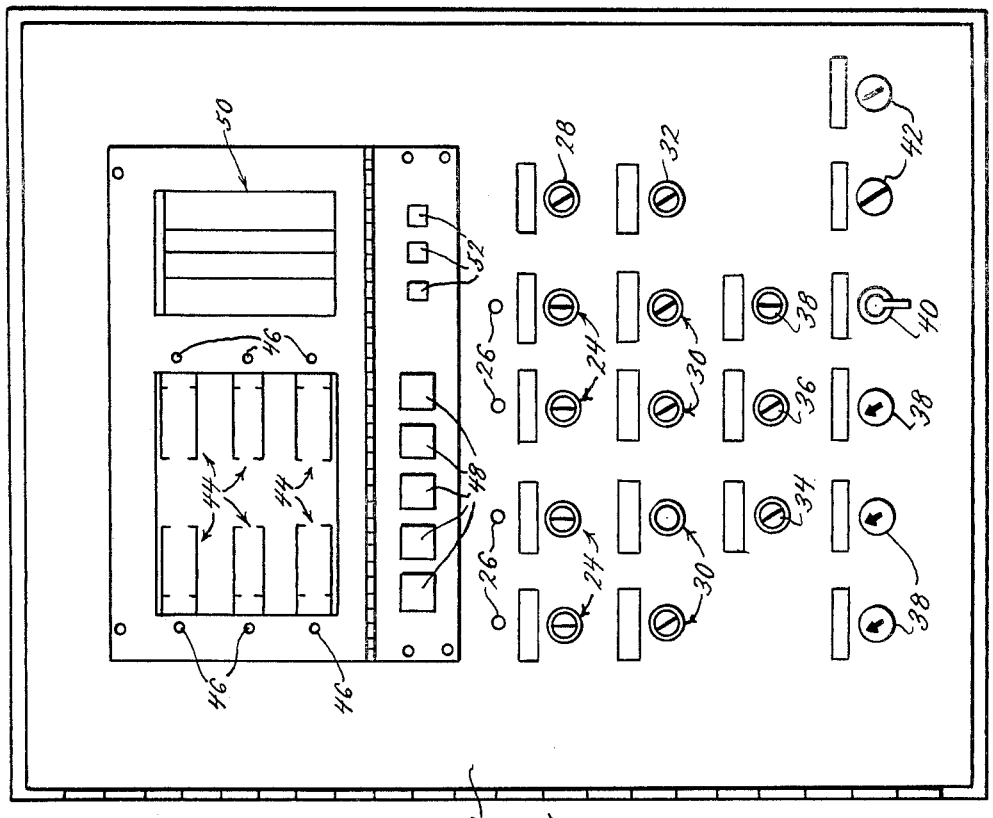
FIG. 1 is a front view of the operator's console showing the displays, digi-switch inputs, and selector switches for manual control.

Applicant's microprocessor based pellet mill controller 20 may be housed in a suitable enclosure 22 for either surface or flush mounting, with the operator's controls and readouts mounted in the front panel of the enclosure 22, as shown in FIG. 1. As shown therein, a first row of controls includes four spring return, three position selector switches 24, one each for the ingredients of dry feed, molasses, water, and steam. In manual control, the operator turns the desired selector switch 24 momentarily to the left to decrease the rate of input, and momentarily to the right to increase the rate of input. A small indicating lamp 26 is immediately above each of these ingredient selector switches 24 and momentarily flashes when its associated ingredient is either incremented or decremented. A fifth selector switch 28 is the on-off control for the fines steam. Immediately below selector switches 24 are four more two position selector switches 30 which selects either manual or automatic control for each of the four ingredients: dry feed, molasses, water, and steam. The fifth selector switch 32 in the second row of controls provides for turning on the steam jacket rotary valve. In a next row of selector switches, a first two position selector switch 34 provides selection of molasses bypass or molasses line to control the input of molasses, another two position selector switch 36 provides on-off control for water, and a third selector switch 38 provides operator selection of low pressure, high pressure, or no steam. In the next row, the first three selector switches 38 are two position selector switches and provide on-off control for the feeder, mixer, and conditioner, respectively. The bat handle type selector switch 40 is a three position spring return to center start-stop selector switch for the mill motor. The last two two position selector switches 42 provide for local or remote control, and a system interlock, respectively.

Figure 3:
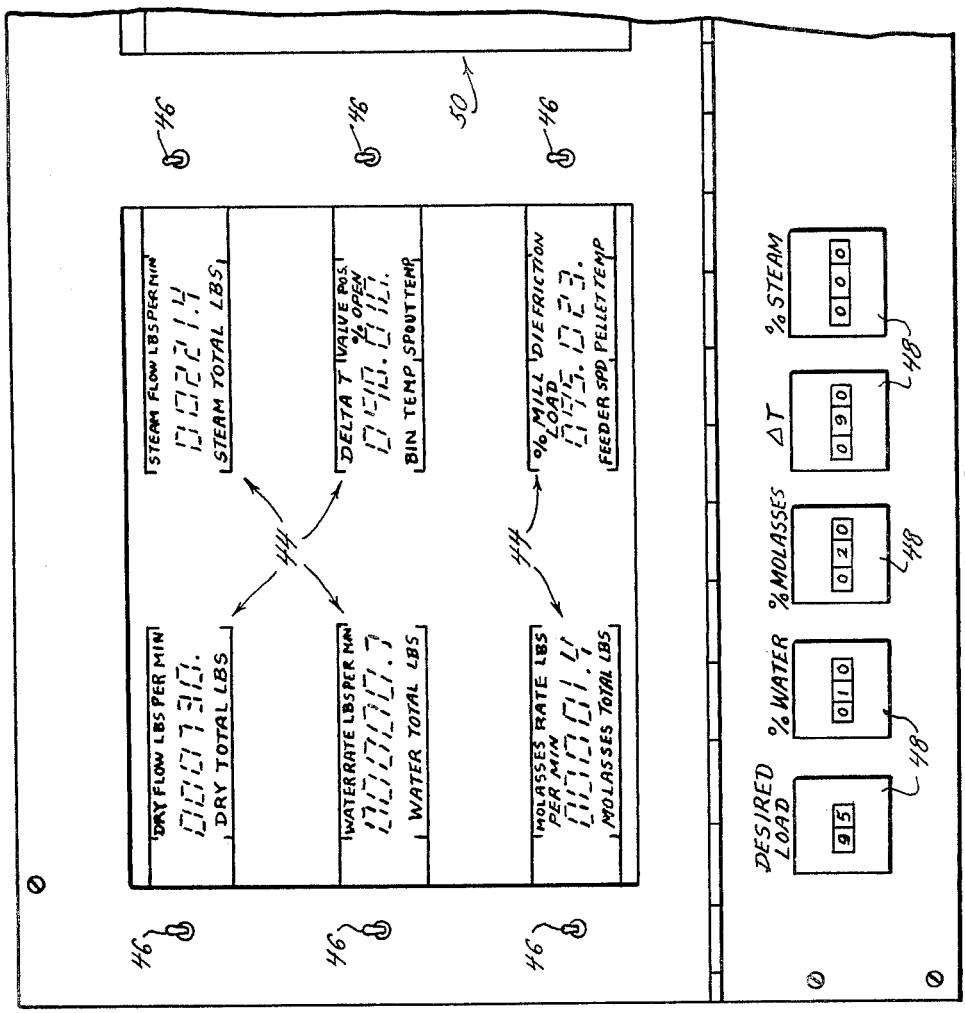
FIG. 3 is a partial view of the operator's console of FIG. 1 showing the displays and digi-switches along with their legends in greater detail.
Figure 6K:
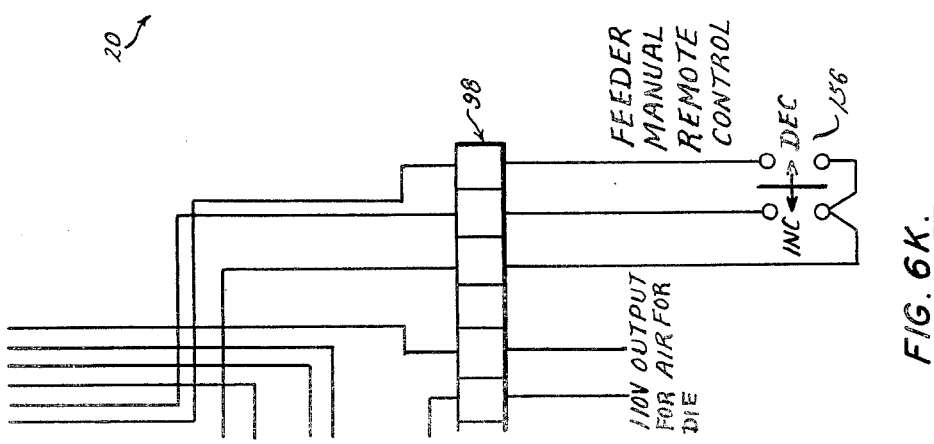
Figure 4:
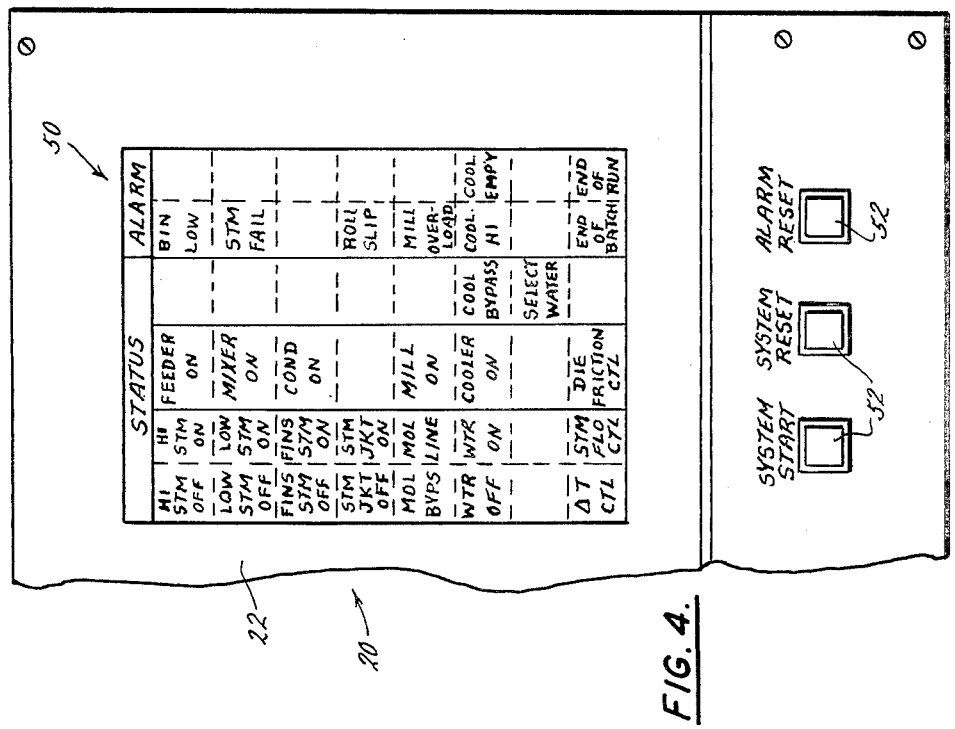
FIG. 4 is a partial view of the operator's console as shown in FIG. 1 showing in greater detail the indicator lights and system start, reset, and alarm reset pushbuttons along with their legends.
Figure 6G:
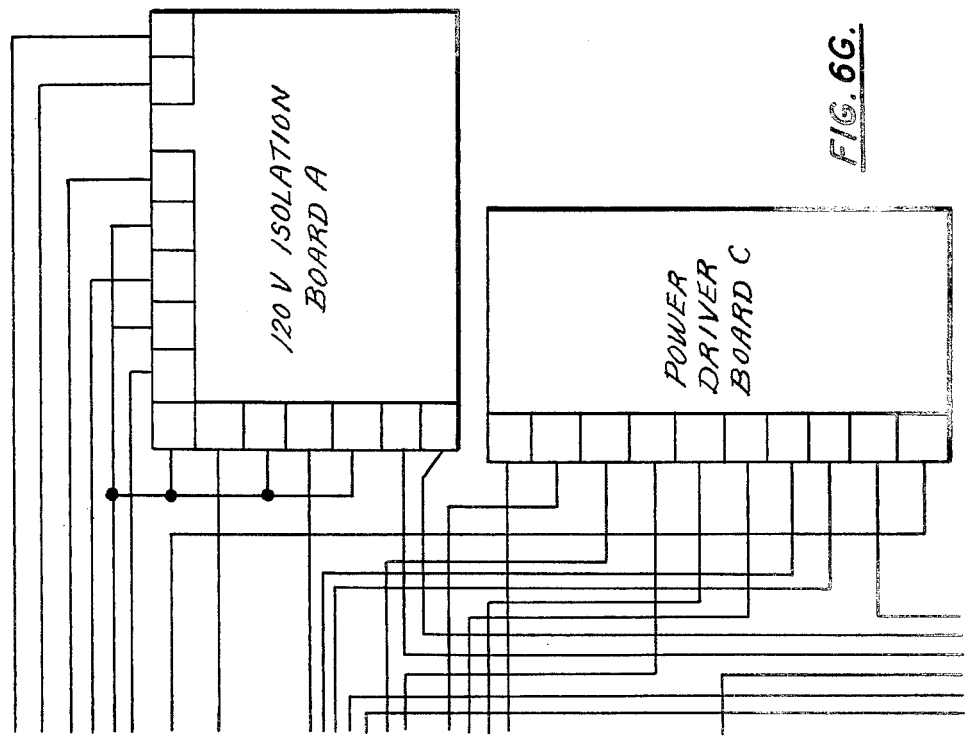
Figure 6A:
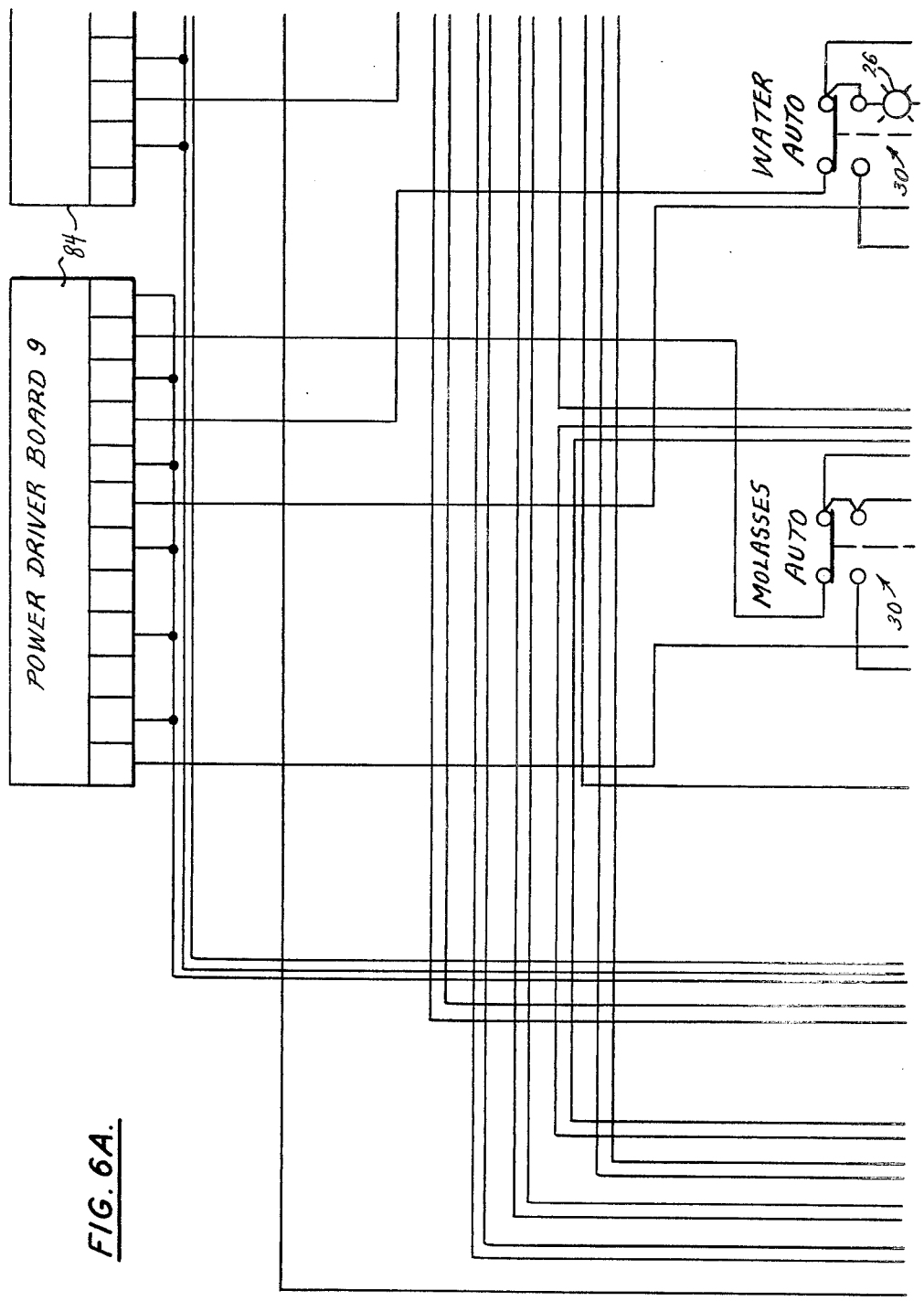
Figure 6C:
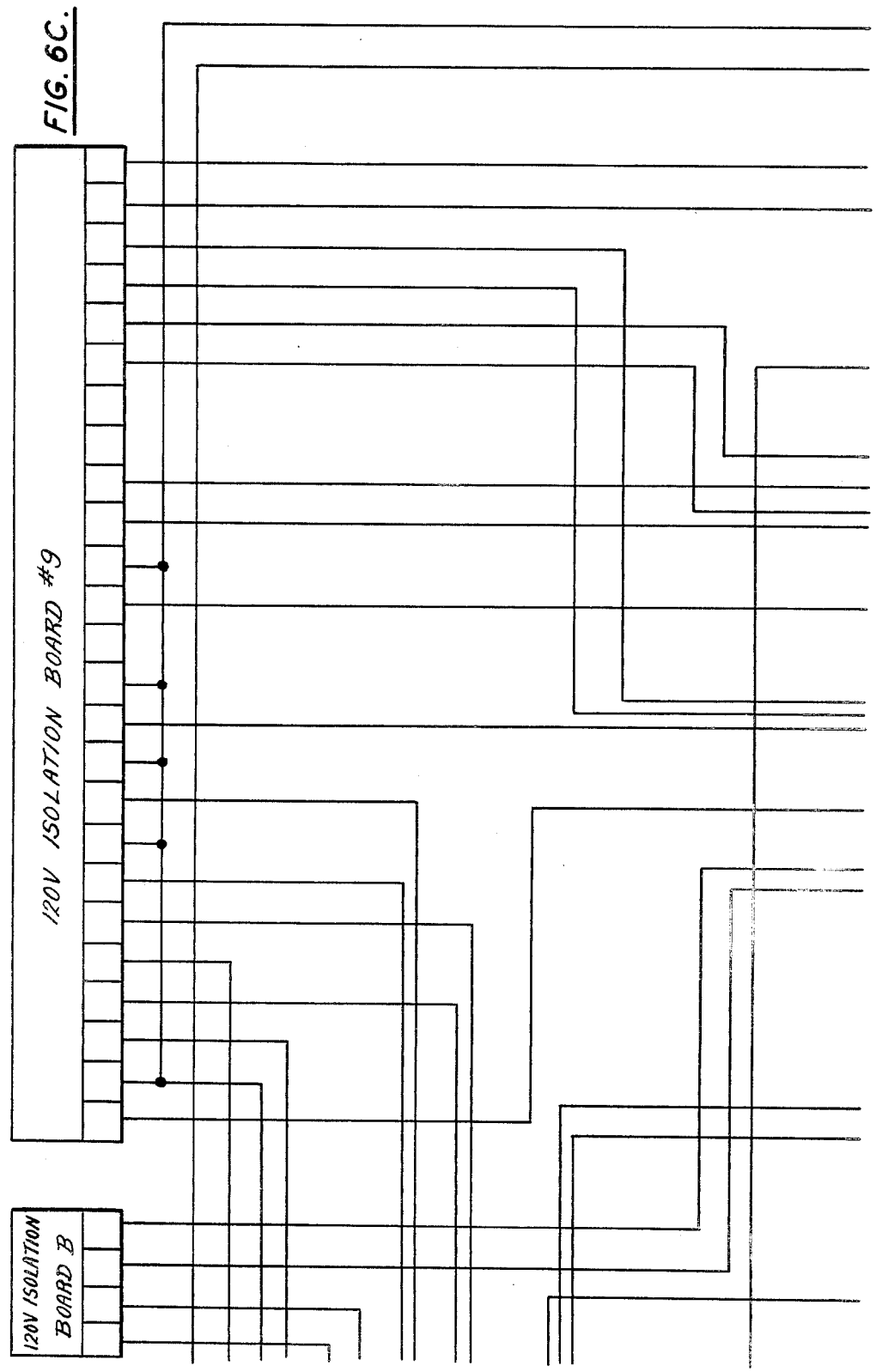
Figure 6D:
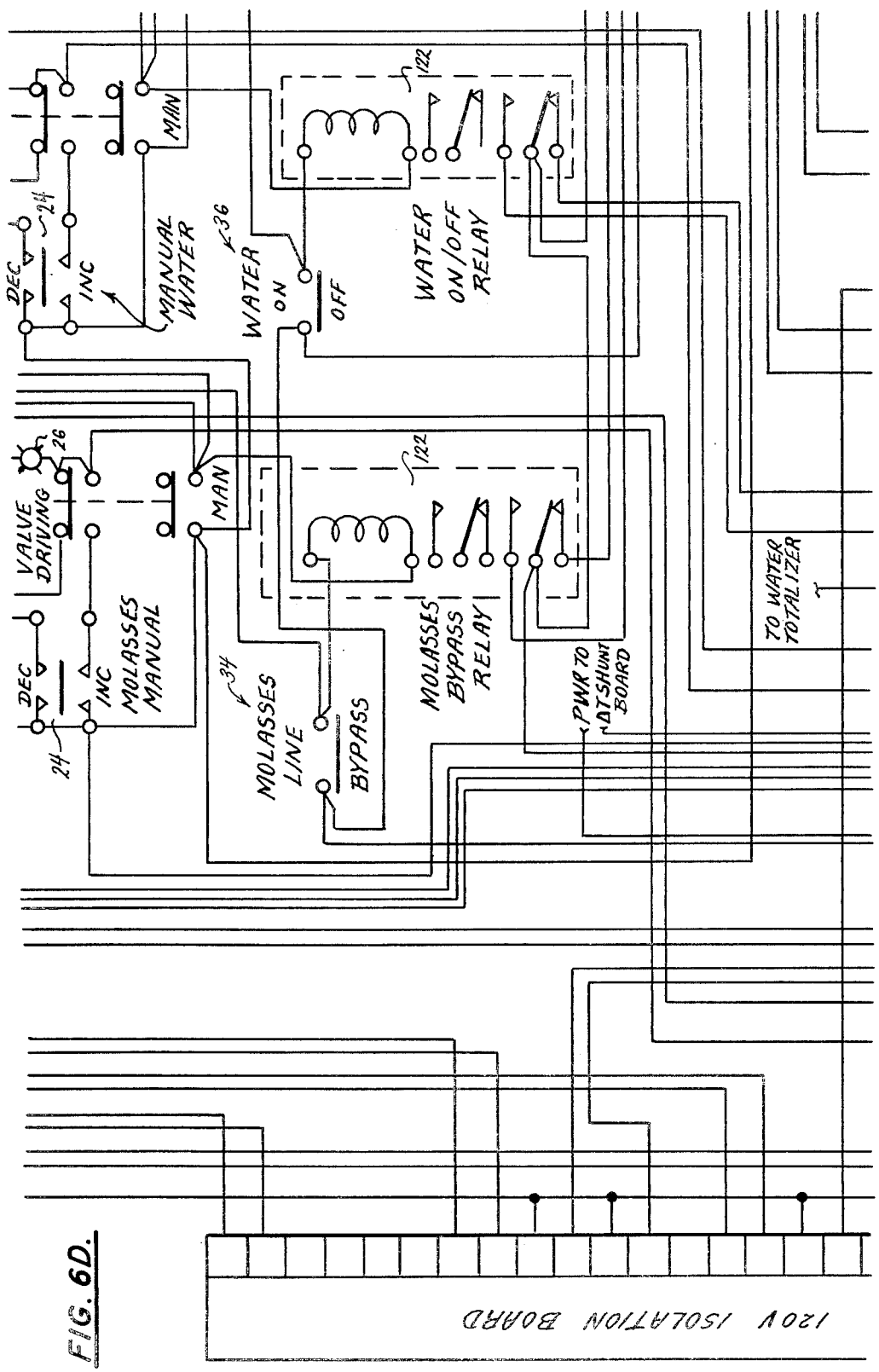
Figure 6E:
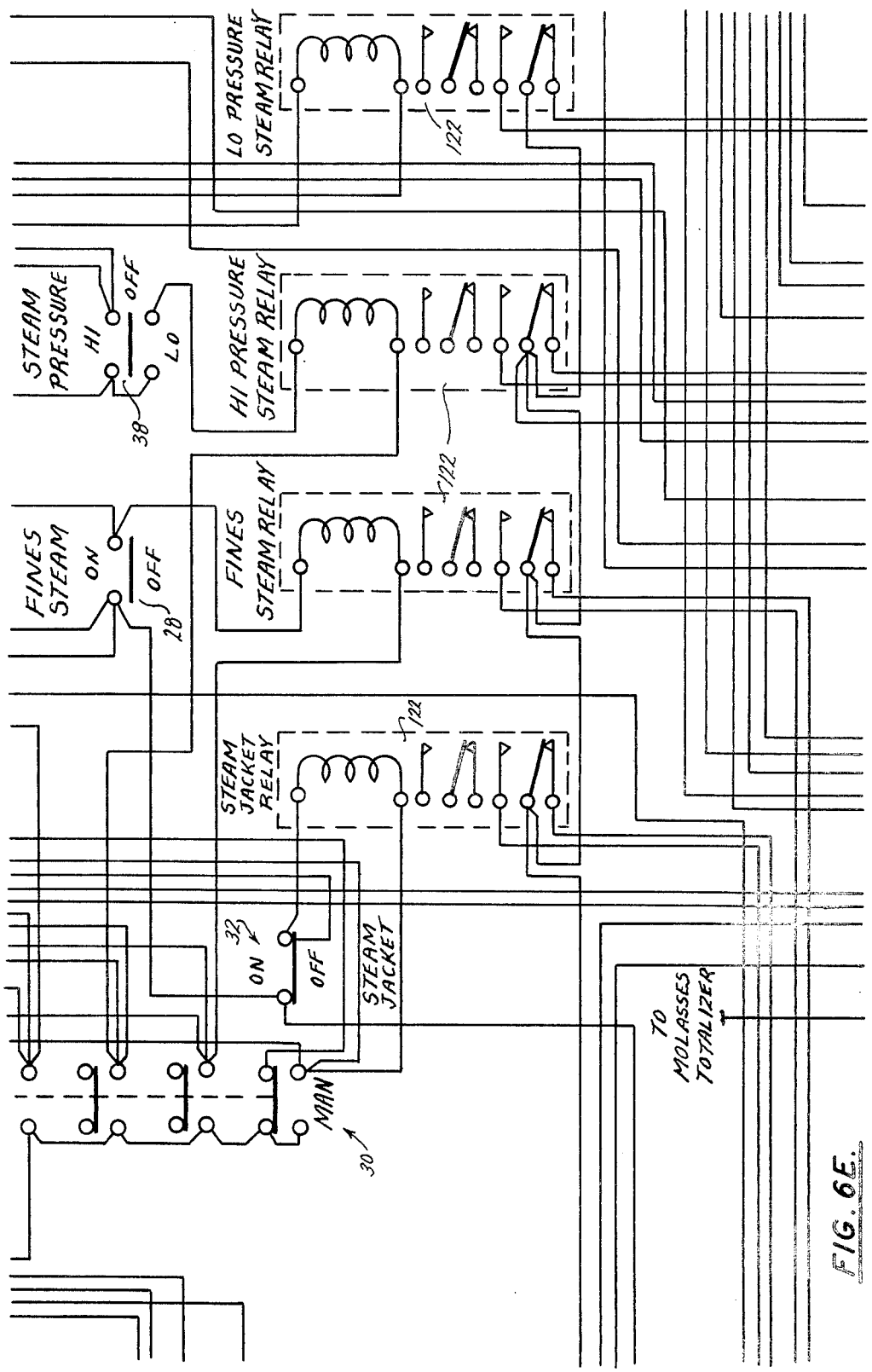
Figure 6H:
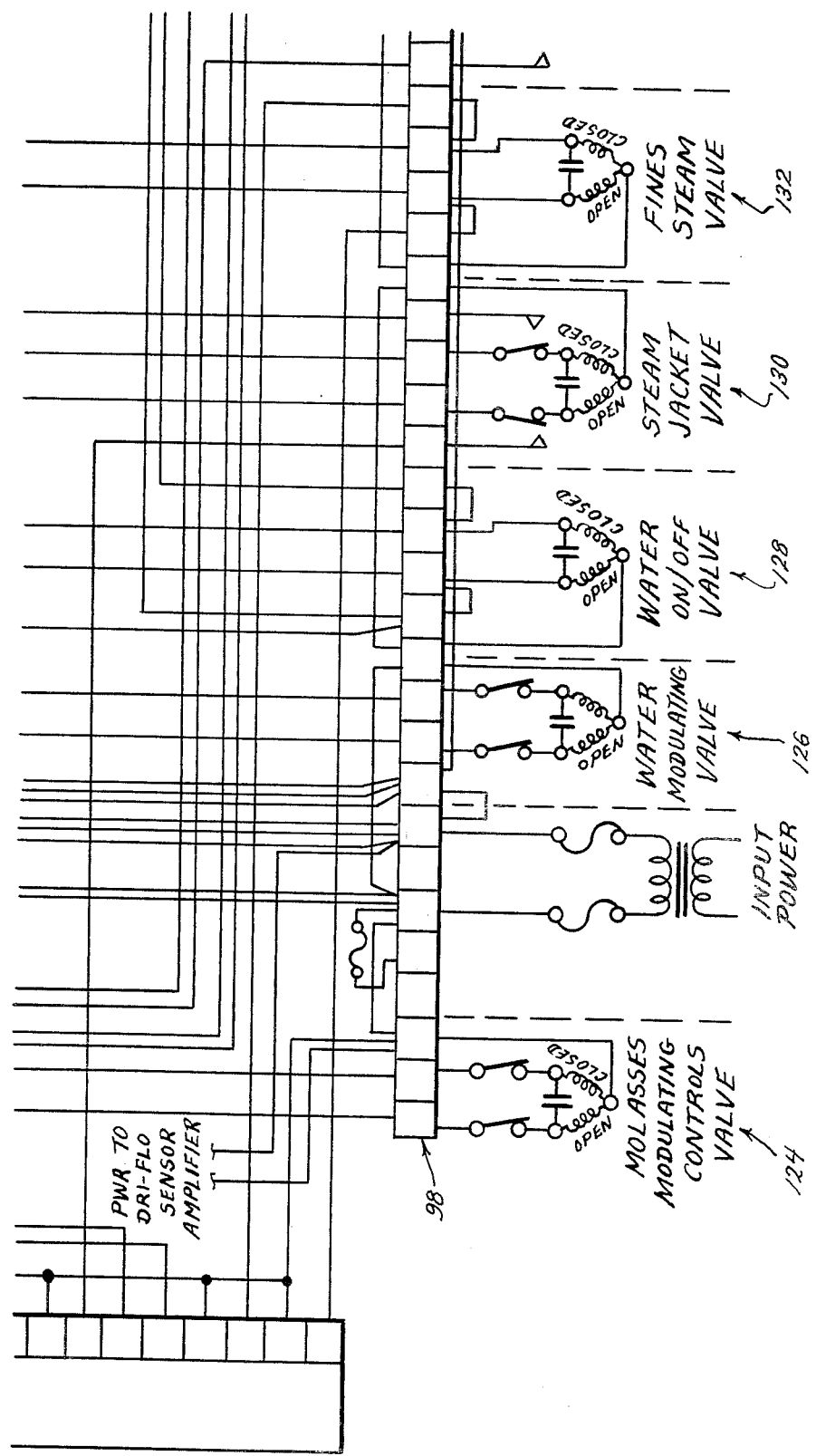
Figure 61:
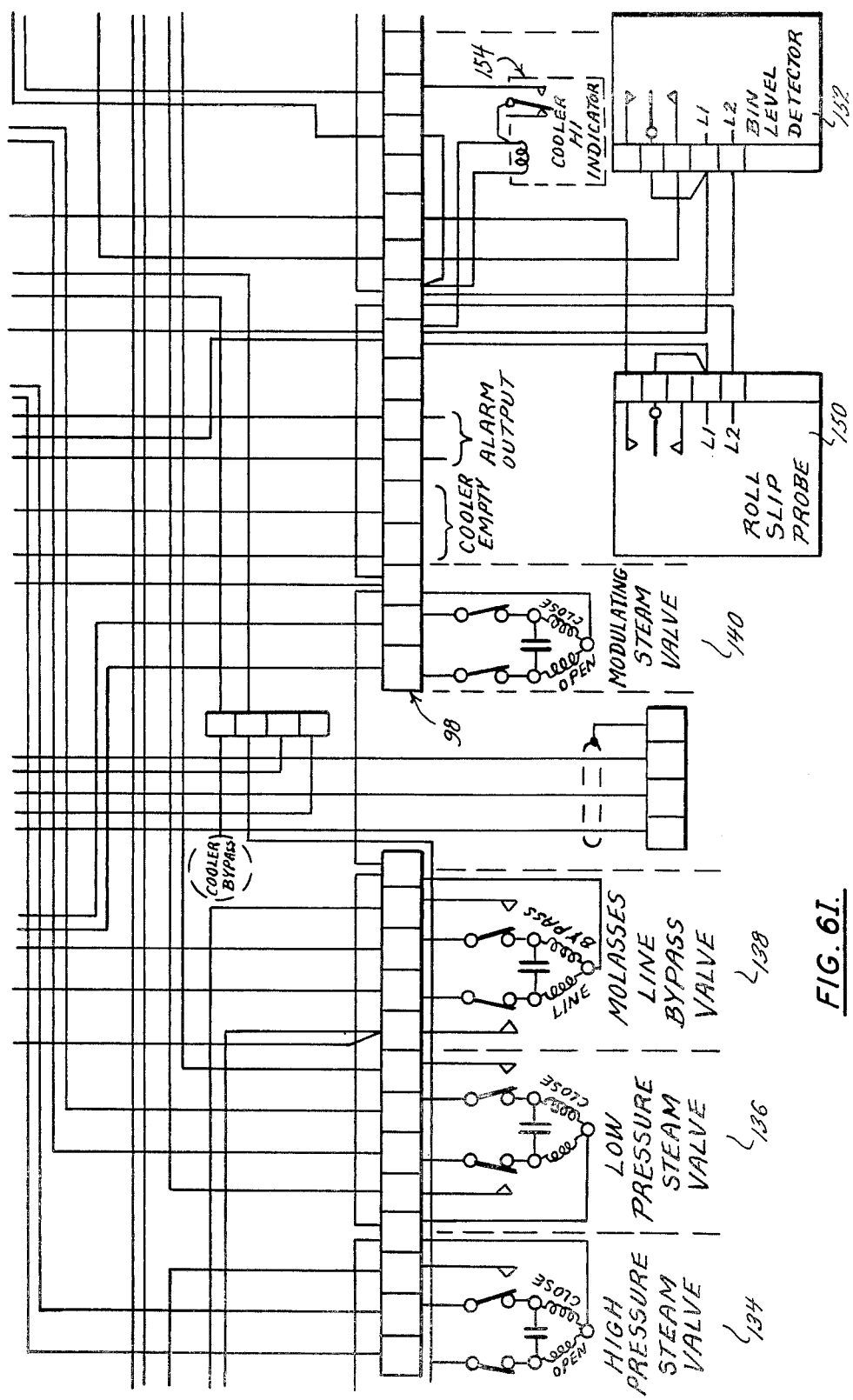

The upper portion of the controller 20 is shown in greater detail in FIGS. 3 and 4, with the individual legends marked on the respective displays and controls. As shown in FIG. 3, six displays 44 each provide six digit readouts for parameters being monitored by the controller 20. Adjacent each display 44 is a toggle switch 46 to permit operator selection of the parameter or parameters to be displayed. For example, the upper left display 44 will indicate the dry flow in pounds per minute when the toggle switch 46 adjacent that display 44 is in the "up" position. When in the "down" position, the same display will instead show the total of dry flow in pounds during a pellet run. For the middle display on the left, water rate in pounds per minute or the total water in pounds is displayed. For the lower left hand display 44, the molasses rate in pounds per minute or the total molasses in pounds is displayed. For the upper right hand display 44, the steam flow in pounds per minute is shown or the total steam in pounds may be selected. For the last two displays 44, each is divided such that two parameters are shown simultaneously. In the "up" position of toggle switch 46, $\Delta T$ and valve position (percent open) is shown. In the "down" position, bin temperature and spout temperature are shown. Of course, the resolution for each of these parameters is three digits as the display 44 is divided between those parameters. The lower right hand display 44 shows the percent mill load and die friction, or the feeder speed and pellet temperature.

There are five digi-switches 48 below displays 44 that permit operator input of various parameters to be used by controller 20 to control pellet mill operation. The leftmost digi-switch 48 permits operator input of the desired load. Although this might normally be set somewhere near 99, there are some formulations which may optimally "pellet" at somewhat lower mill loads. The next digi-switch 48 permits operator selection of the percentage of water to be used in the formulation; the next digi-switch 48 permits selection of the percentage of molasses to be used in the formulation; the next digi-switch 48 permits operator input of a $\Delta T$ parameter, which determines the mode of control during the pelleting process, and the last digi-switch 48 permits operator selection of the percentage of steam to be used in the formulation. As is explained in more detail in the software operation section, if the operator dials in zeroes in the $\Delta T$ digi-switch 48, then the controller 20 will operate in a straight ratioing mode of control. If the operator instead dials in a number greater than 0 but less than 800, then the controller 20 will operate in a manner to optimize $\Delta T$. If the operator instead dials in a number greater than or equal to 800, then the controller 20 will operate in a $\Delta T$ mill control mode. Thus, controller 20 permits operator selection of the particular parameter to be optimized during pellet mill operation while maintaining the correct formulation of dry feed, moisture, and molasses at load levels near the desired load. These different modes of control are discussed more fully in the software section.

The right hand side of the controller 20 is shown in more detail in FIG. 4 with a status and alarm indicating light panel 50 sectioned off in a matrix to cue the operator and provide him information during a pellet mill run. For example, in the first row of the matrix, the first two legends correspond to high steam off and high steam on. Obviously, one or the other of these two lights is on to indicate to the operator that he has selected high pressure steam for use during this particular run. The next light, if illuminated, indicates that the operator has turned on the feeder. The next four lines corresponding to this first line are similar in nature. The last line in this matrix indicates to the operator whether he selected $\Delta T$, steam ratio, or $\Delta T$ mill (die friction) mode of control. The last two columns of lights are alarm indications to tell the operator of an abnormal condition, or as a cue during the end of the pelleting run. In addition to illuminating each of these lights on the status and alarm panel 50, these may also be intermittently flashed to cue the operator and instruct him to turn on a piece of equipment, or to require him to acknowledge an alarm and serve as a visual reminder until he has attended to a problem encountered during the run. Three master control buttons 52 are directly below the status and alarm panel 50 and permit system start, system reset, and alarm reset. Thus, all of the operator's controls, including system readouts, status light indicators, alarm indicators, and everything required for control of the pellet mill in either the automatic or manual mode is provided on a single control enclosure 22 in a compact orientation.

Figures 21, 25:
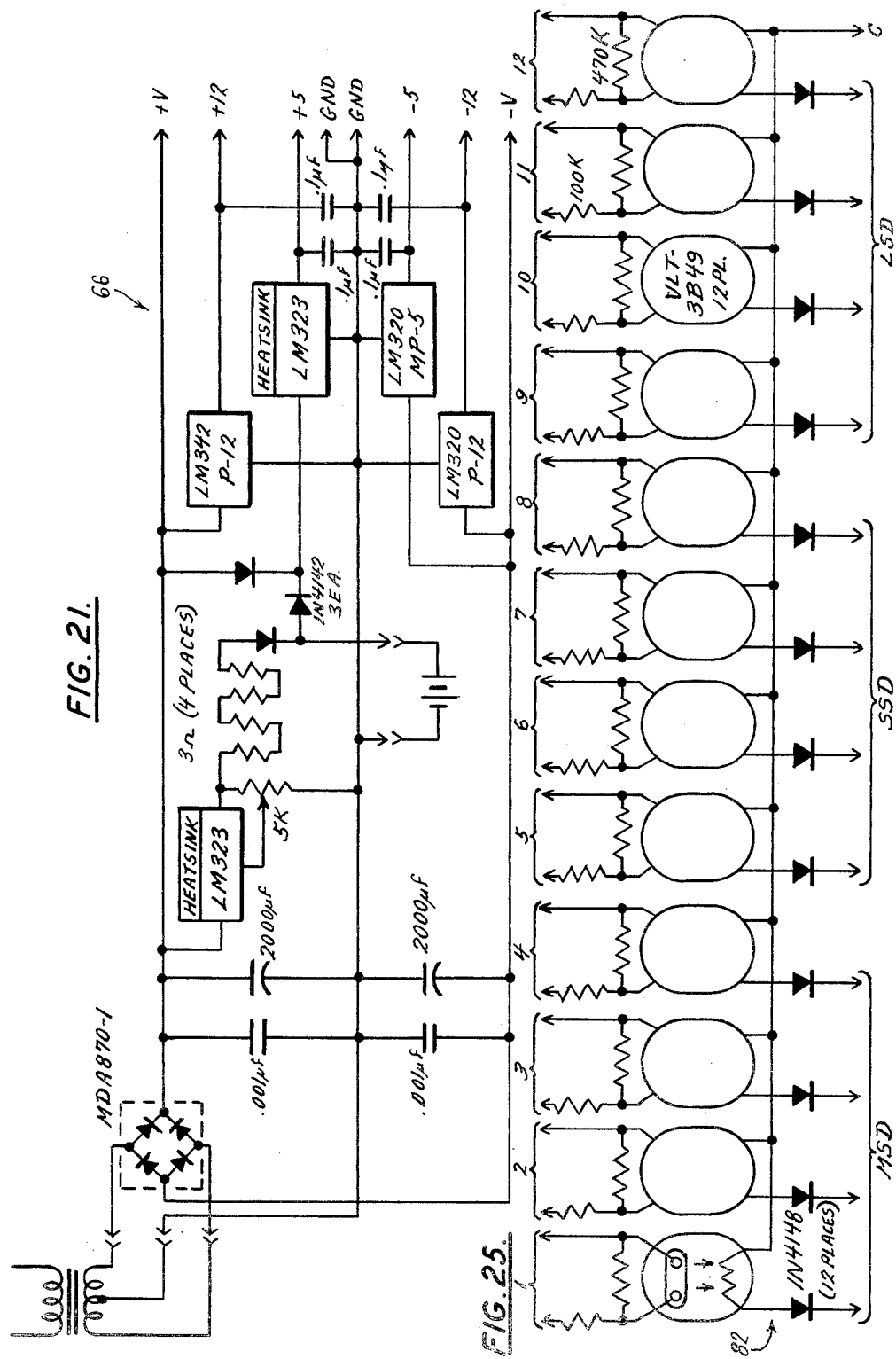
FIG. 21 is an electrical schematic of the main power supply PC board.
FIG. 25 is an electrical schematic of the input isolation PC board.
Figure 22A:
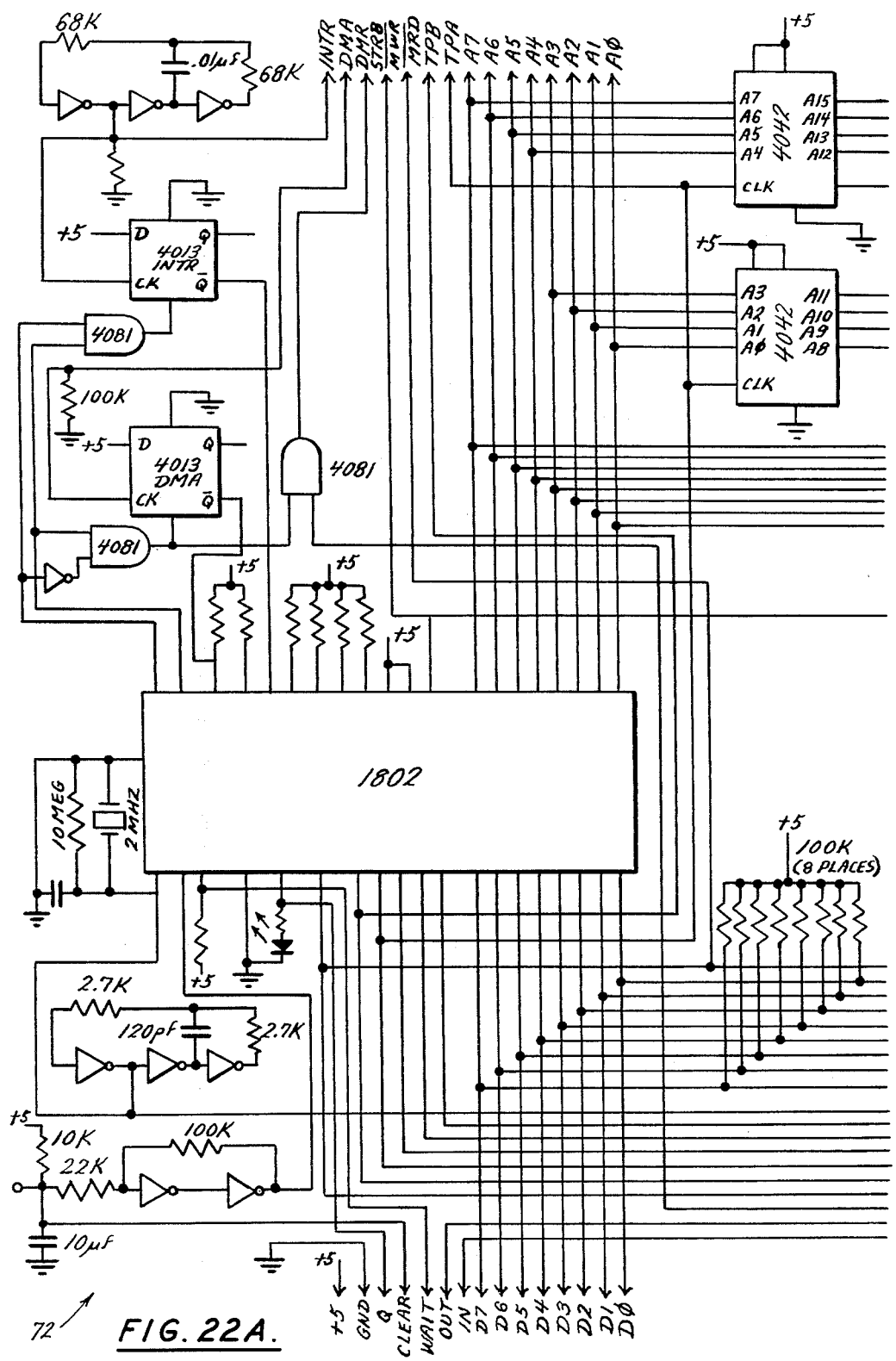
FIG. 22 is an electrical schematic of the main CPU PC board.
Figure 22B:
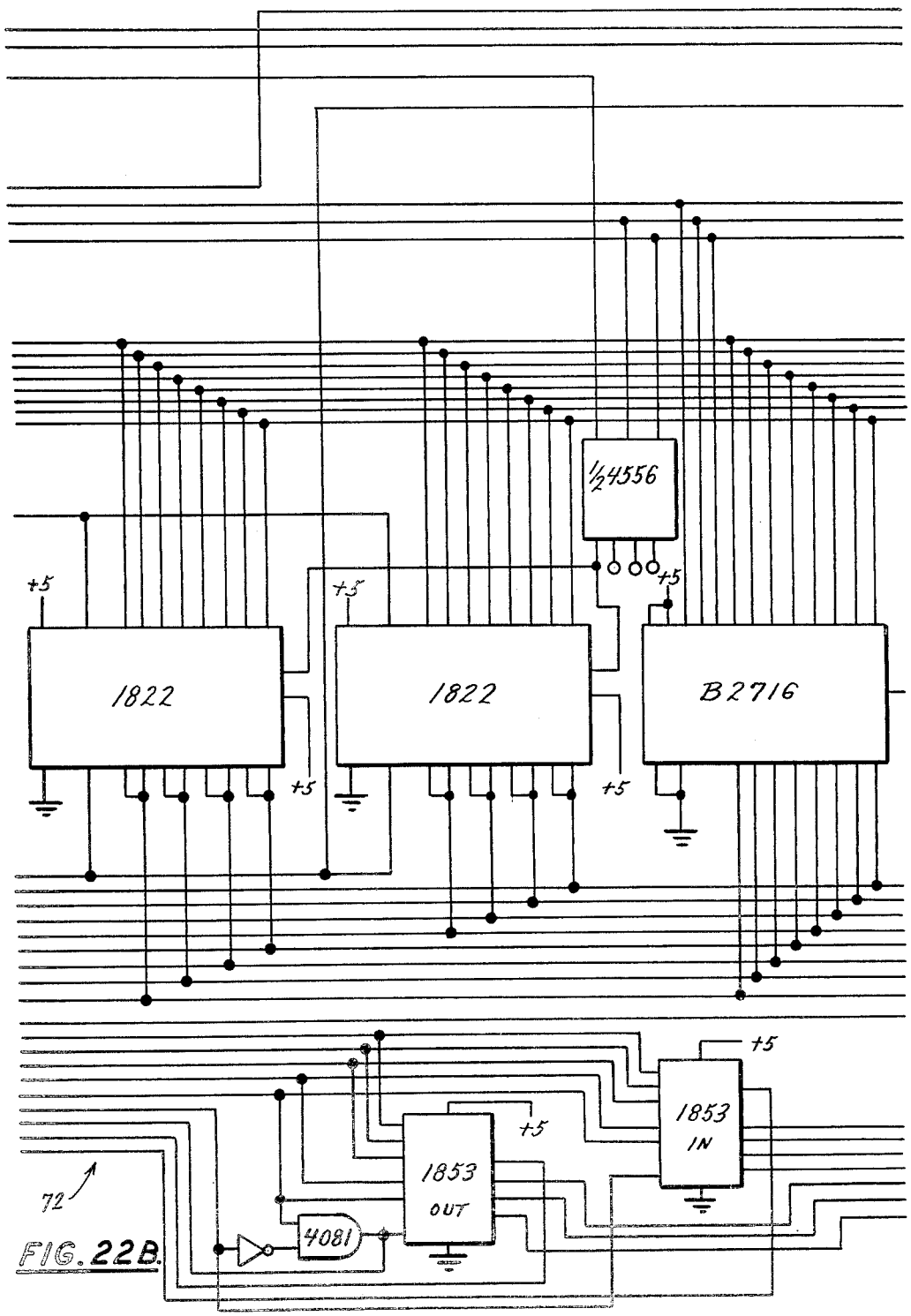
Figure 23A:
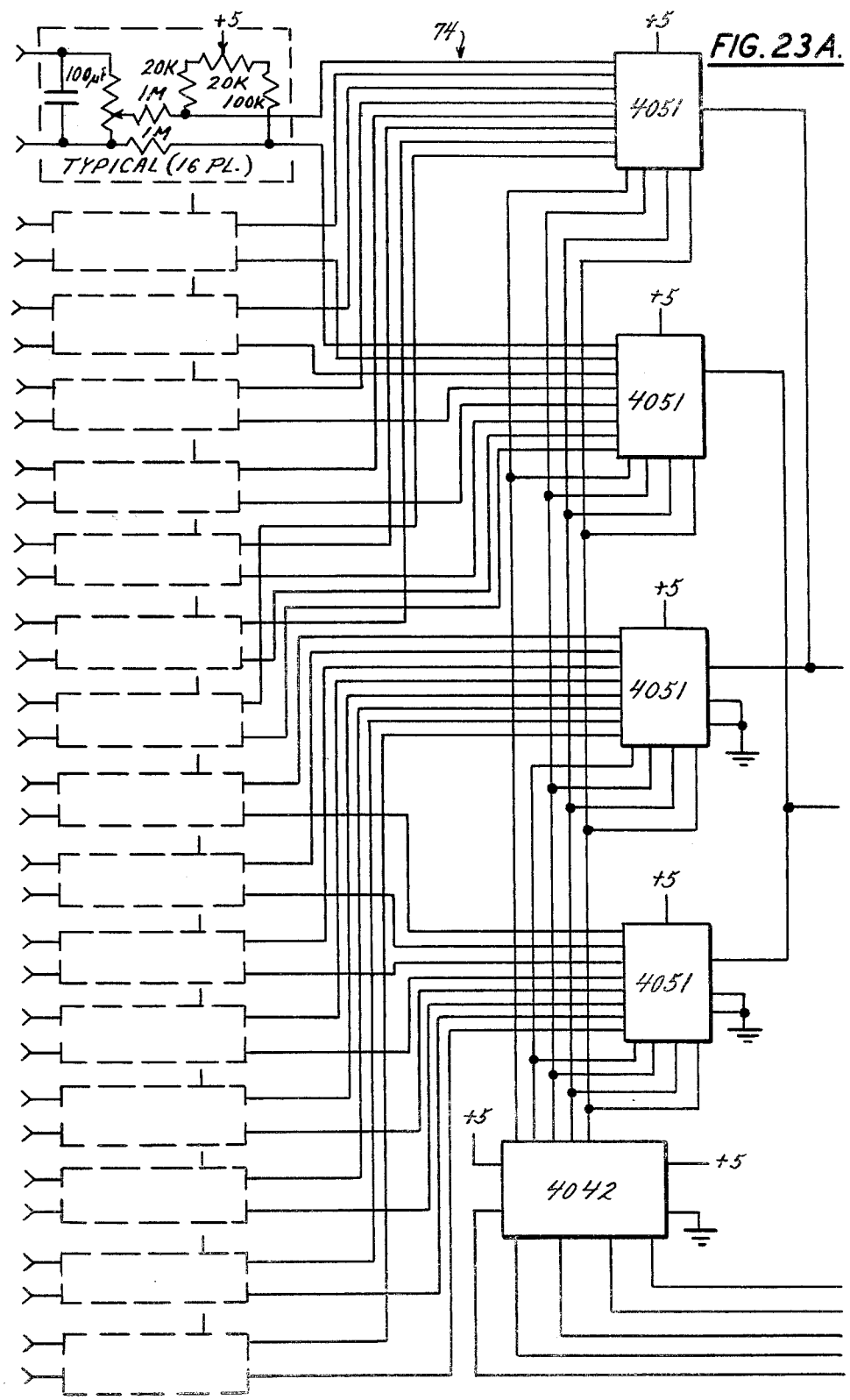
FIG. 23 is an electrical schematic of the A/D PC board.
Figure 24:
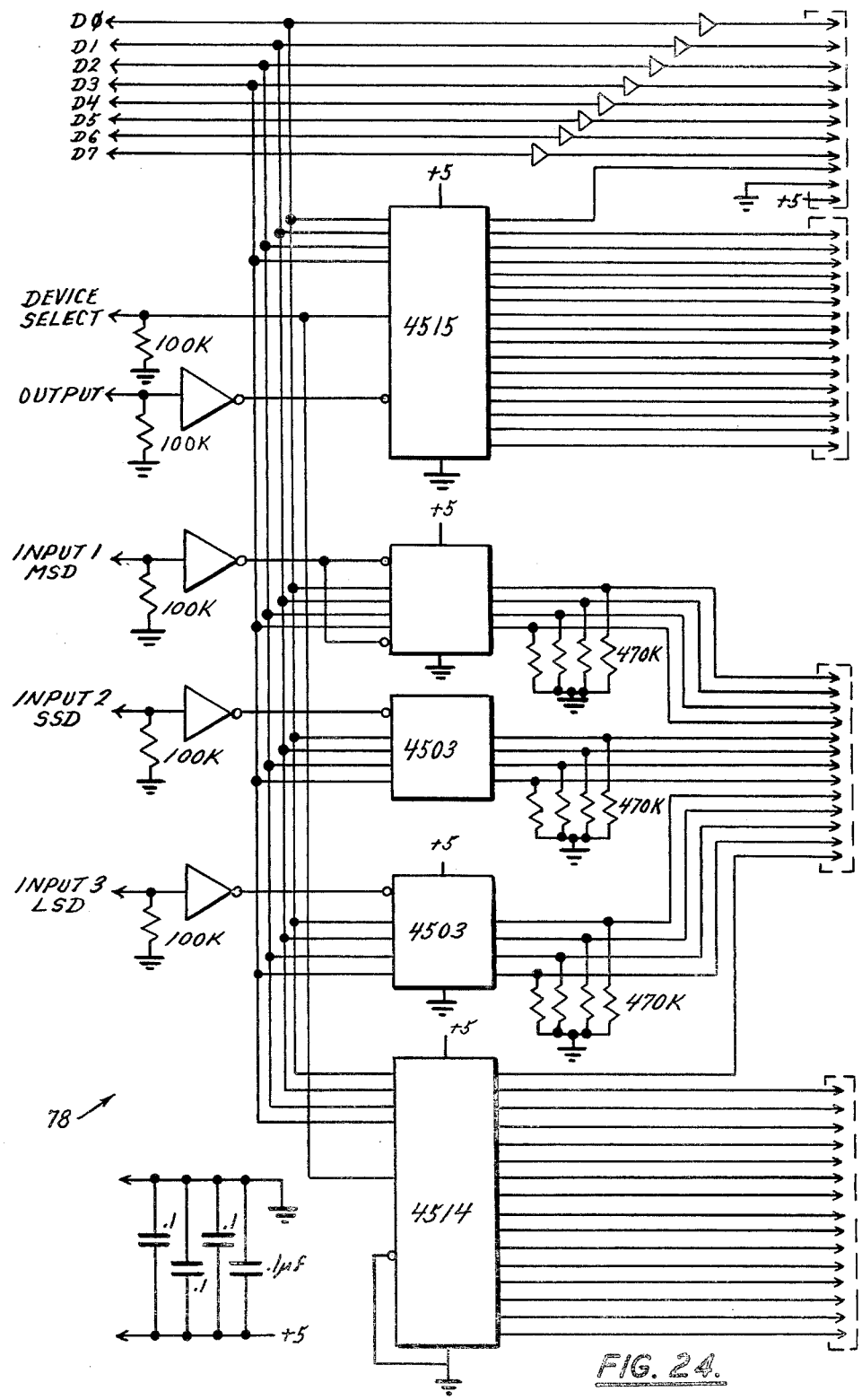
FIG. 24 is an electrical schematic of the two level decoder driver PC board.
Figure 26:
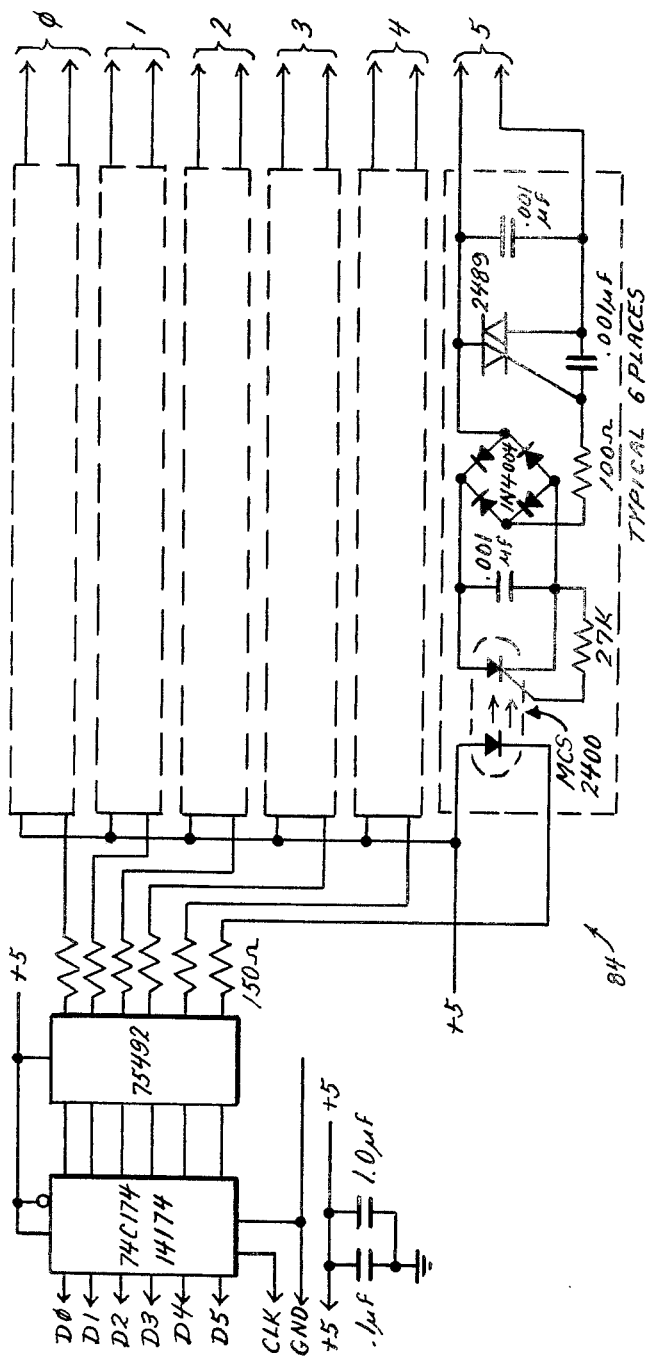
FIG. 26 is an electrical schematic of the output power driver PC board.
Figure 28:
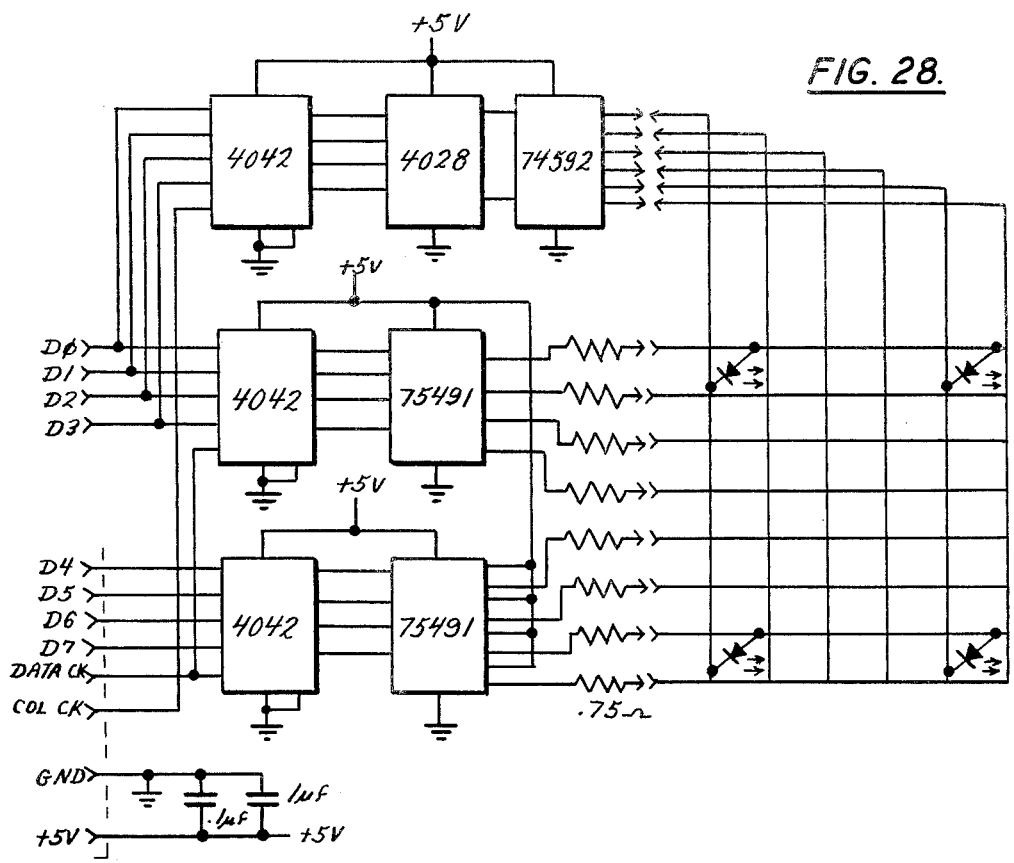
FIG. 28 is an electrical schematic of the annunciator LED and driver PC board.
Figure 27:
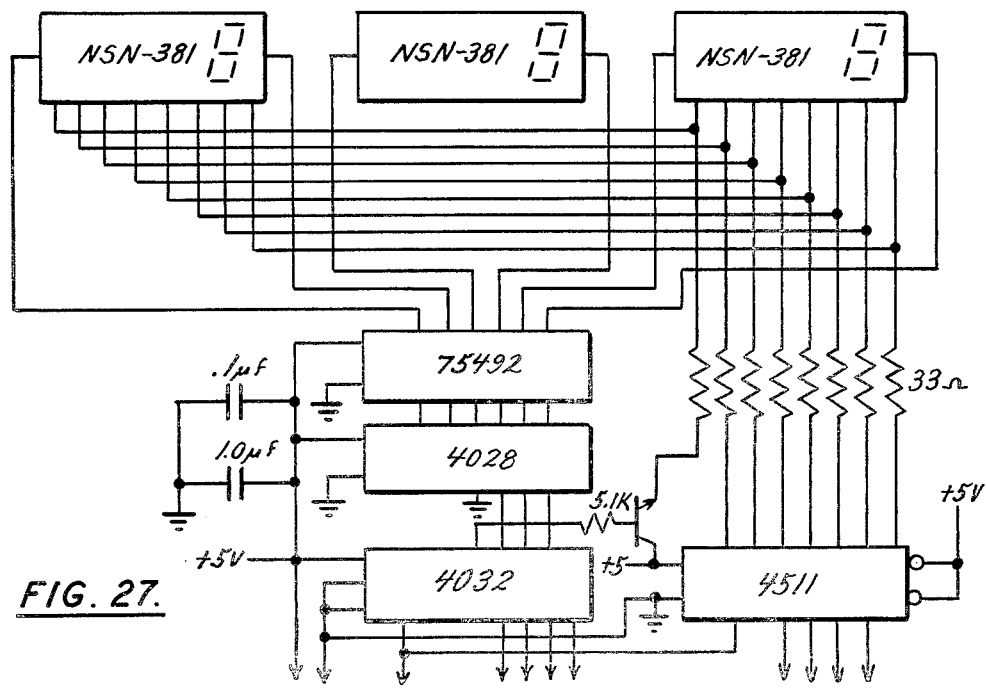
FIG. 27 is an electrical schematic of the display PC board.

As shown in FIG. 2, the back of the enclosure 22 has a side panel 54 on the left side, and a side panel 56 on the right side, and a third panel 58 connected to the bottom of the main panel 60. FIG. 2 shows the physical location and cabling between the various PC boards and other components of applicant's controller 20. Mounted to the outside of the left panel 54 is a power transformer 62 and a back-up battery 64. A main power supply PC board 66 (schematic shown in FIG. 21) is connected by cable 68 to power transformer 62, with cable 70 extending to back-up battery 64 and the main CPU PC board 72 (schematic shown in FIG. 22). A sixteen channel A/D PC board 74 (schematic shown in FIG. 23) is also mounted on panel 54 with cable 76 extending to the microprocessor CPU board 72. A two level decoder driver PC board 78 (schematic shown in FIG. 24) is connected to the microprocessor CPU board 72 by cable 80 and facilitates addressing of the input and output channels. Along the top of panel 60 are four input isolation PC boards 82 (schematic shown in FIG. 25). Three output power driver PC boards 84 are mounted on the right panel 56 and another two output power driver PC boards 84 (schematic shown in FIG. 26) are shown mounted to the main panel 60. Cables 86 through 94 connect each of these output boards 84 to connectors (not shown) on the mother PC board 96. A display PC board (schematic shown in FIG. 27) and an annunciator LED and driver PC board (schematic shown in FIG.

28) are not physically shown in FIG. 2 as they are hidden from view. The schematic wiring connections for each of the above PC boards is separately shown, as indicated, and it is believed that these drawings are self explanatory such that one of ordinary skill in the art would be able to construct each board and connect it in accordance with its respective drawing. Therefore, for purposes of brevity, applicant will not go through a detailed explanation of each schematic for each PC board. A plurality of connectors 98 are provided for connection of various inputs and outputs to be controlled or monitored by applicant's microprocessor controller 20, as is shown in greater detail in FIGS. 5 and 6.

Figure 5B:
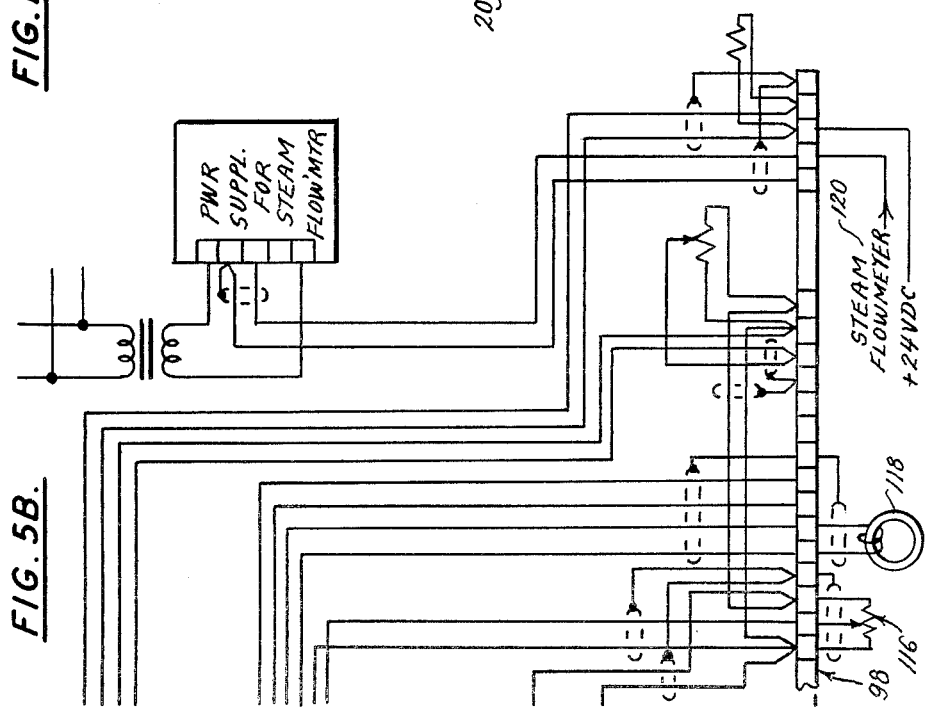
FIGS. 5A and B is a schematic diagram showing the field connections for various equipment monitoring devices in the pellet mill, and the cable interconnections between those inputs and various PC boards in the controller.

FIGS. 5A and B depict the schematic for connections between the A/D input circuit board 74 and the various sensors and probes used to monitor the various parameters of the pellet mill. These include a dry flow sensor 100 which monitors the rate of input of dry feed, a molasses flow meter 102 which monitors the rate of input of molasses, and a water flow meter 104 which monitors the rate of input of water. Internal wiring connections are shown between connectors 98 and various additional PC boards which function as indicated by the legend contained therein. For example, the dry flow sensor amplifier 106 interfaces between the dry flow sensor 100 and A/D input board 74, to condition the signal and make it compatible with other system signal levels.

The next set of monitoring devices includes a $\Delta T$ bin probe 108, a $\Delta T$ spout probe 110, and a $\Delta T$ pellet probe 112. The input from these monitoring devices is connected to connectors 98 and from there is wired to a $\Delta T$ printed circuit board 114. The $\Delta T$ PC board 114 conditions these inputs, after which they are fed to the A/D input PC board 74, as shown on the drawing. Other inputs include a steam valve position feedback potentiometer 116, a mill load input provided by a current transformer 118, and a stream flow meter input 120. It should be noted that other parameters could be monitored and input into applicant's controller 20 using circuitry similar to that disclosed in FIGS. 5A and B.

FIGS. 6A-K assemble to correspond to a D-sized drawing by arranging 6A-C in a top row, 6D-G in a middle row, and 6H-K in a bottom row. This drawing corresponds to the 120 volt AC input and output side of applicant's controller, showing the output power driver PC boards 84 along the top of the drawing, the connector 98 shown along the bottom of the drawing, and the various output devices controlled by the controller 20 being connected to the connector 98. Between the output power driver boards 84 and connectors 98 are shown the selector switches 28-42 previously described in connection with FIG. 1 along with a plurality of relays 122 which are used to operate the various output devices when any of the selector switches 28-42 are in the manual mode. The outputs connected to and controlled by applicant's automatic controller 20 include a molasses modulating control valve 124, a water modulating valve 126, a water on-off valve 128, a steam jacket valve 130, a fines steam valve 132, a high pressure steam valve 134, a low pressure steam valve 136, a molasses line/bypass valve 138, a modulating steam valve 140, a feeder 142, a mixer 144, a conditioner 146, and a pellet mill main drive motor 148. Additional inputs, including a roll slip probe 150, a bin level detector 152, a cooler high indicator 154, and a remote manual feeder control 156 are also shown. As shown in this drawing, various outputs may be connected to and driven by applicant's controller 20 in either the automatic or manual mode, with the automatic mode of operation being determined by the particular software package loaded into the controller 20. Applicant will now explain in greater detail one such software package which is his best mode and which may be used to successfully control the automatic operation of a pellet mill using the hardware disclosed herein.

DESCRIPTION OF THE PREFERRED EMBODIMENT (SOFTWARE)

As explained above, applicant's microprocessor based controller may be easily programmed and reprogrammed as necessary or desired to achieve different modes of operation and emphasize different control variables to monitor and control the operation of the pellet mill. Applicant is disclosing in FIGS. 7-20 a flow chart for a program which will give the operator the opportunity to preselect any one of several system operating parameters to be used to control the operation of the pellet mill. This program can be easily modified by one of ordinary skill in the art to emphasize any one parameter over another, to input some other parameter, or to create a multiple dependent control system, as desired.

The flow chart is laid out in a straight-forward manner, and from FIG. 7 through FIG. 20 is listed in order of priority for execution by the machine. The general format of the program is that execution is controlled by machine interrupts which occur 600 times per second, with those portions of the program requiring execution more frequently being listed earlier in the flow chart. For example, the input and storage of operating parameter values, calculation and execution of output commands, along with refreshing of the displays is near the front of the program, the initial equipment start up and equipment end of run shut down is near the end of the program, and control panel equipment monitoring routines and updating display information routines are positioned in the middle.

Figure 7:
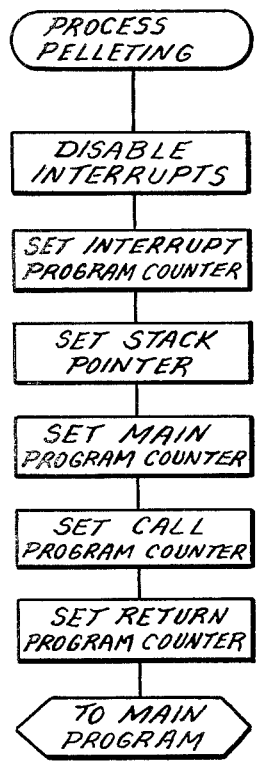
FIG. 7 is a flow chart of the initial subroutine of applicant's software.
Figure 8:
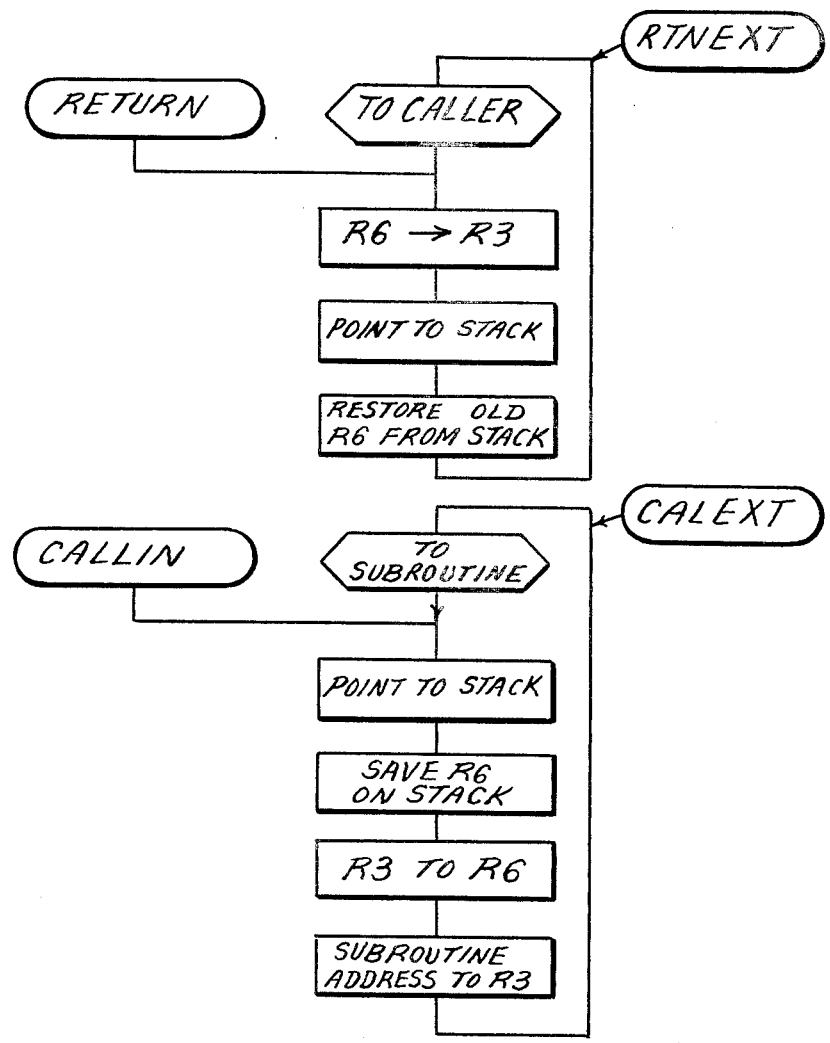
FIG. 8 is a flow chart of machine required software.
Figure 9A:
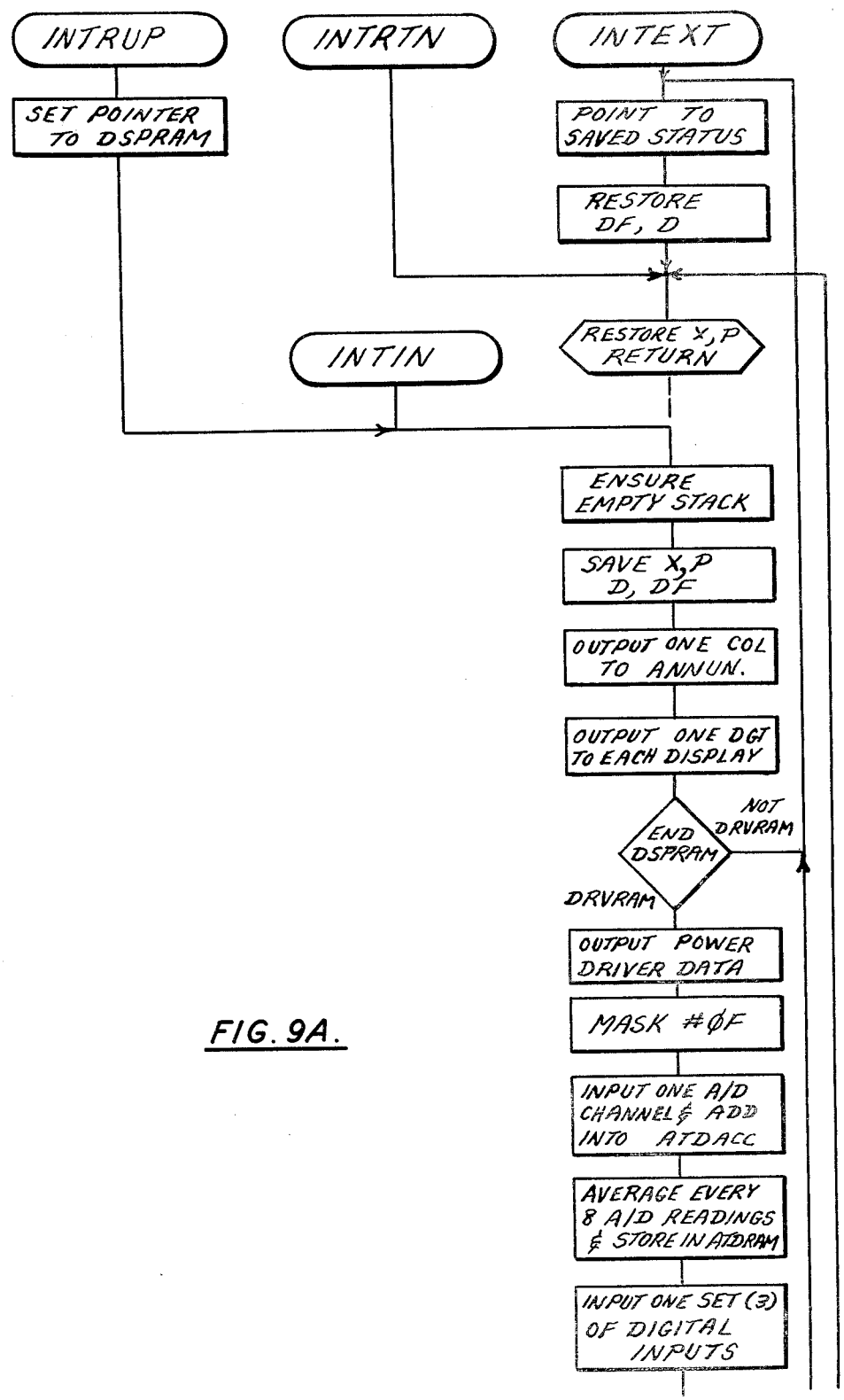
FIGS. 9A and B is a flow chart of the main I/O handler subroutine.
Figure 9B:
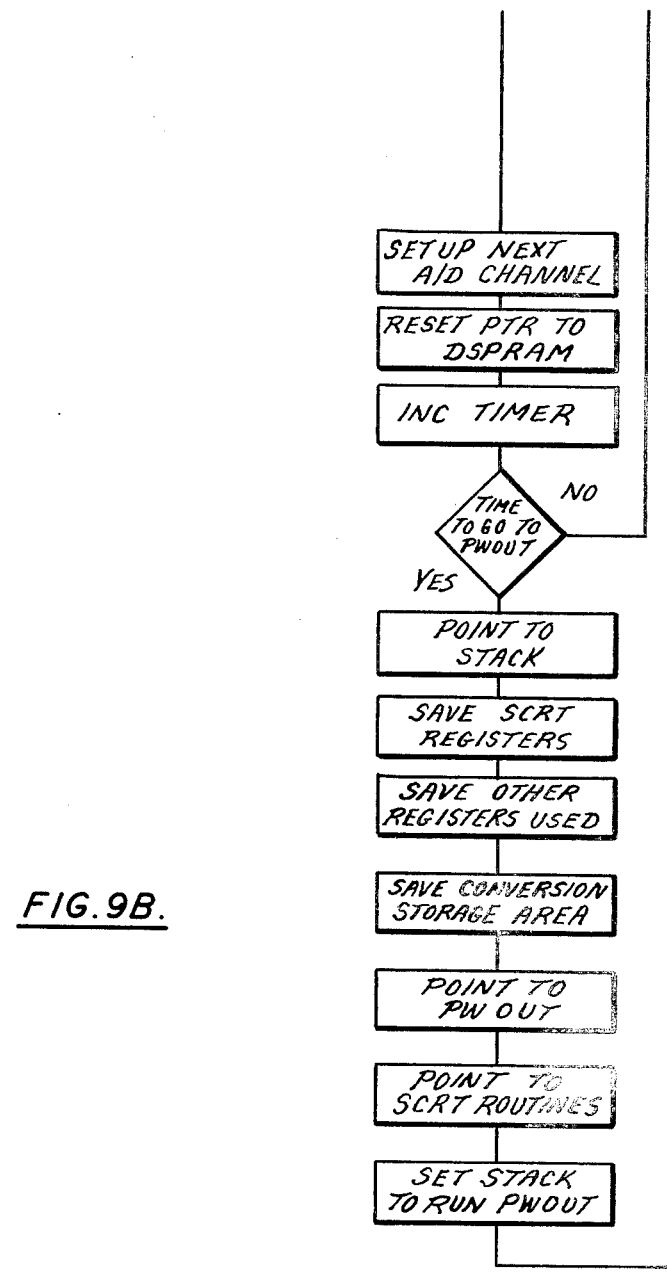
Figure 10:
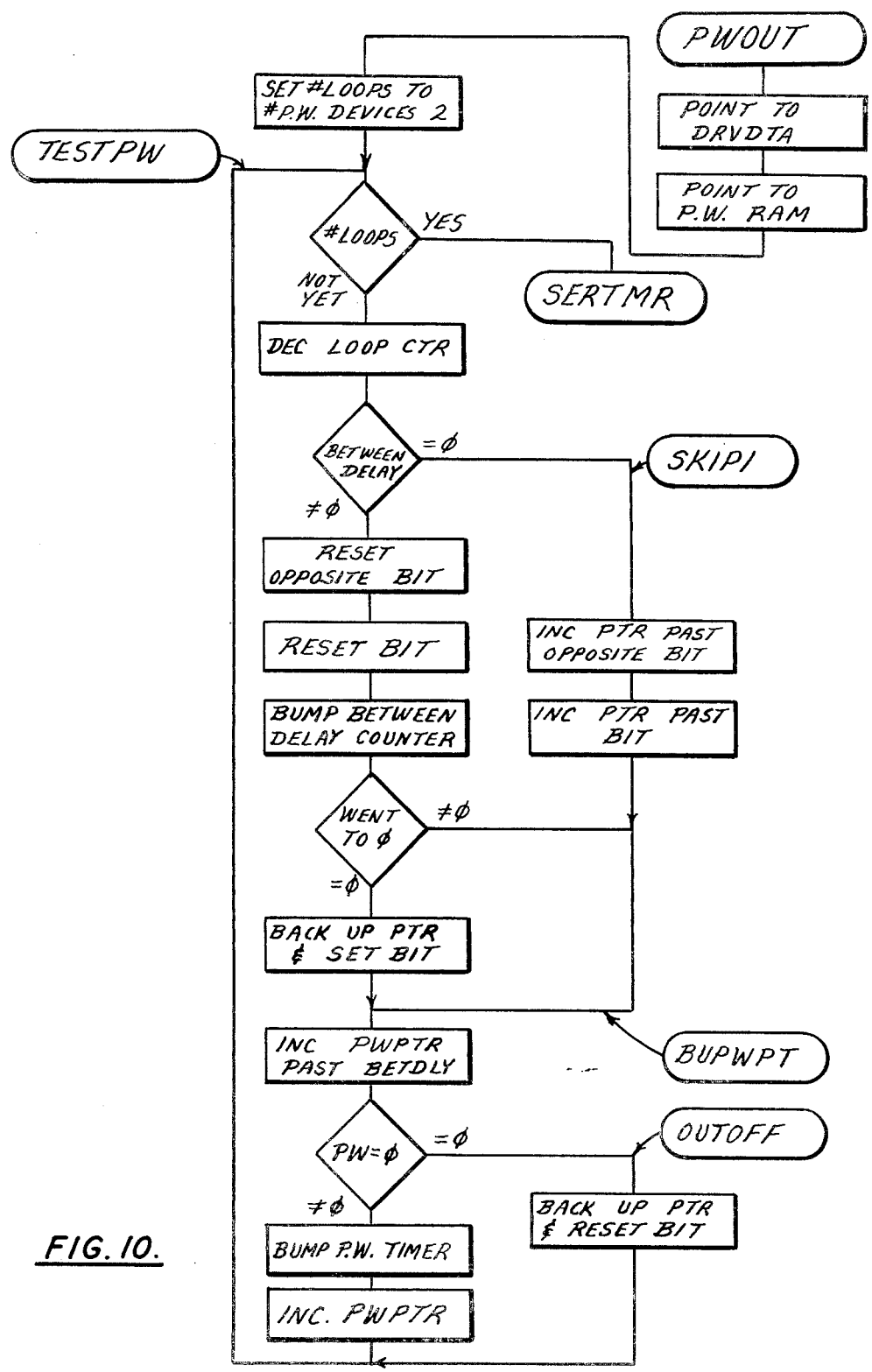
FIG. 10 is a flow chart of the pulse width out subroutine.

The several subroutines which comprise the program are individually listed in a separate figure and can be briefly described as follows. FIG. 7 charts the beginning of the program where the program counters and stack pointer are initialized with a branch to the main program shown in FIG. 20. The routines shown in FIG. 8 are required by the particular microprocessor being utilized in applicant's controller and can be found in the programming manual for that device. FIG. 9A and B is the subroutine which is executed upon the occurrence of a machine interrupt. At every machine interrupt, other than the first which branches in a INTRUP, the machine branches to INTIN which saves its position in the subroutine being executed, updates one digit of each display and then tests at END DSPRAM to see if the last digit in each display has been updated. If it has been, then the program goes through an output/input routine which reads and stores the various parameters being monitored, and also drives the various outputs that are latched on. The program next tests if it is time to go to the PULSE WIDTH OUT (PWOUT) routine. This software timer permits branching to the PWOUT routine 100 times per second. If it is not time to branch to PWOUT, then just as if the last digit of the display has not been updated, the subroutine returns to its place in that subroutine which was being executed at the time that the machine interrupt occurred. If it is time to branch to PWOUT, then various registers and data is stored, pointers are set up to branch to PWOUT, and the subroutine branches to PWOUT as shown in FIG. 10. Thus, by relying upon the 600 cycles per second machine interrupt, the displays in the control panel are refreshed very frequently, with the input and output data being handled slightly less frequently, and a program branch to other subroutines being built in to ensure execution of other parts of the program in a regular and routine manner.

The PWOUT routine shown in FIG. 10 sets up the triacs for that period of time required to correct the desired value of an input from its actual or sensed value. The symbol DRVDTA indicates the power driver data, or data stored in a RAM indicating the duration of time (or pulse width) that a particular valve should be opened or closed to adjust the flow of that input into the mill. The between delay portion of the routine ensures that a triac has sufficient time to reset before being told to change its state, as the triac latches on for a half cycle and cannot change its state as quickly as this routine can be executed. Thus, this subroutine times the adjustment to be made in each proportional valve position to control the flow of input into the pellet mill and branches to SERTMR after all pulse widths have been stored.

Figure 11:
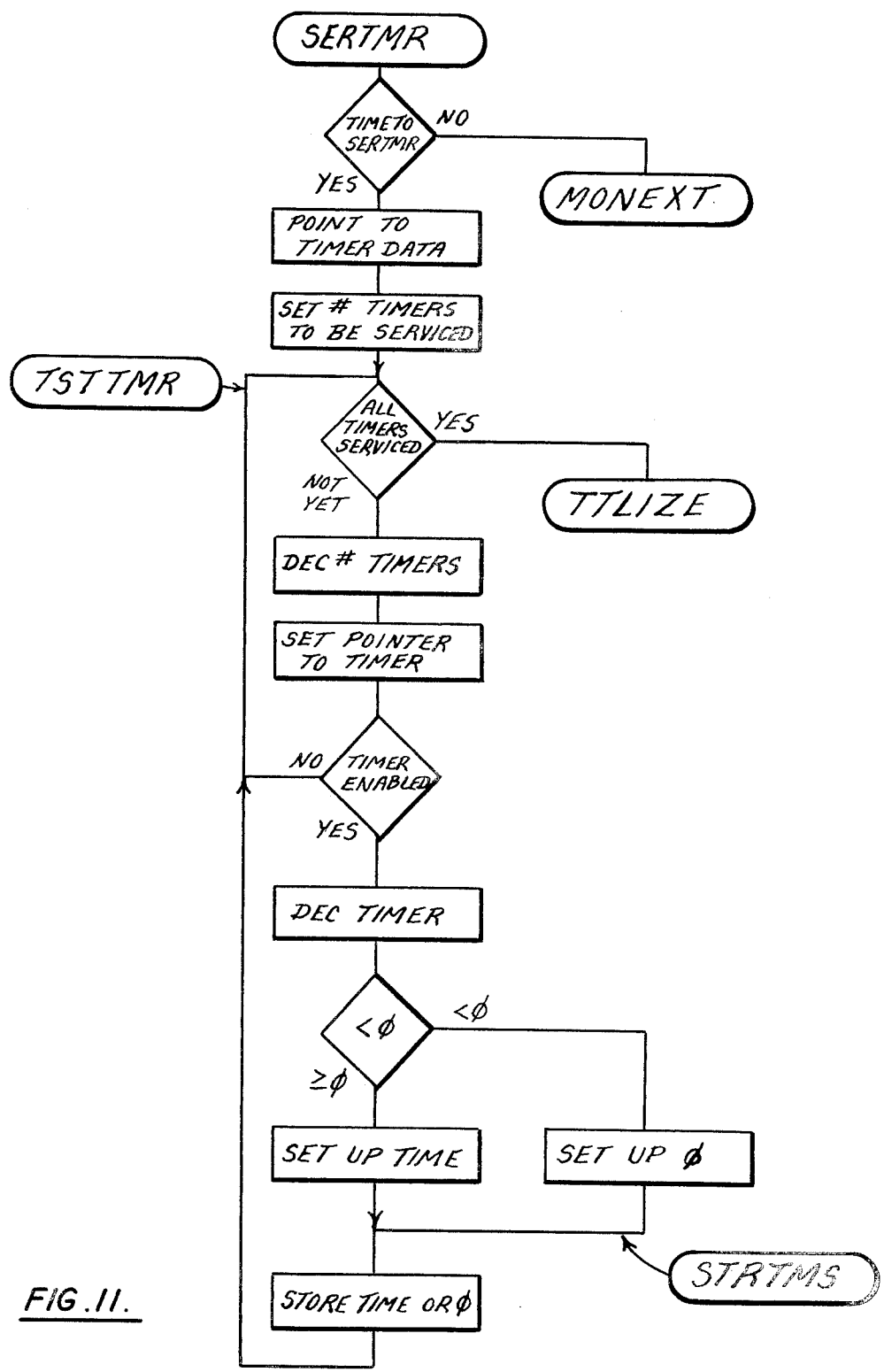
FIG. 11 is a flow chart of the service timer subroutine.

The subroutine shown in FIG. 11 and labeled SERTMR is the service timer subroutine. This subroutine merely updates all of the programmed timers used in various different parts of the program to determine when a period of time has lapsed before a decision can be made. After all the timers have been serviced, this subroutine branches to the TTLIZE subroutine shown in FIG. 12.

Figure 12:
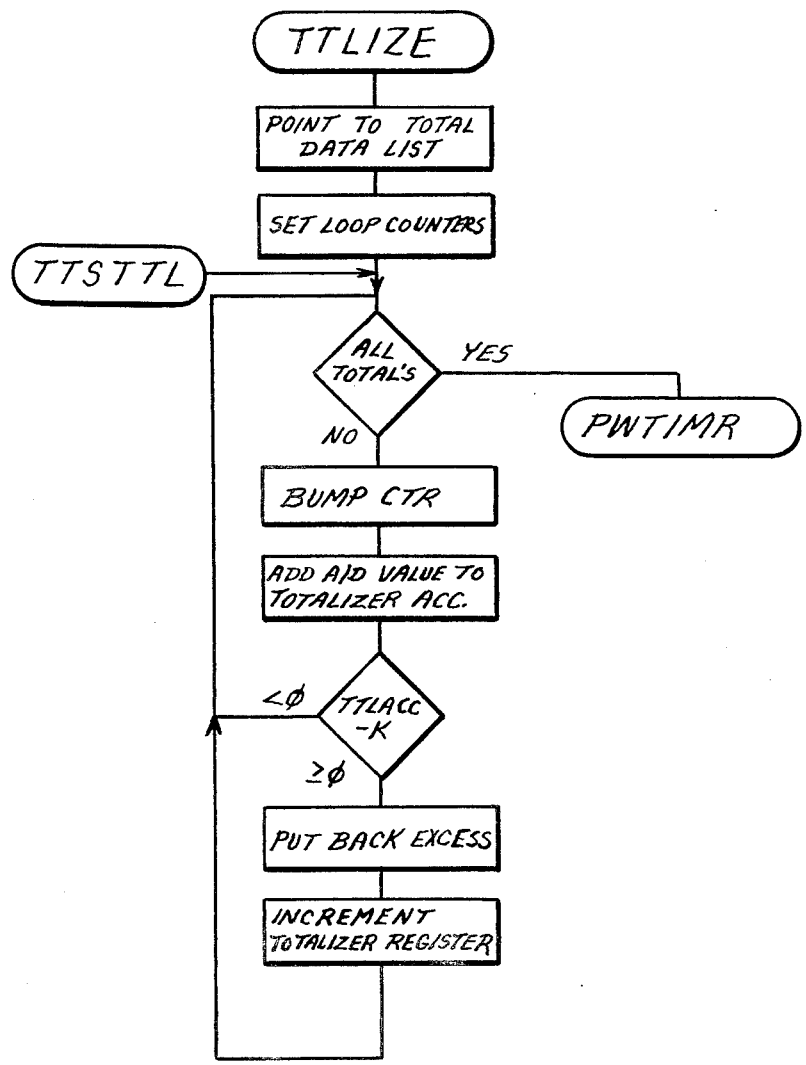
FIG. 12 is a flow chart of the totalizing subroutine.
Figure 13A:
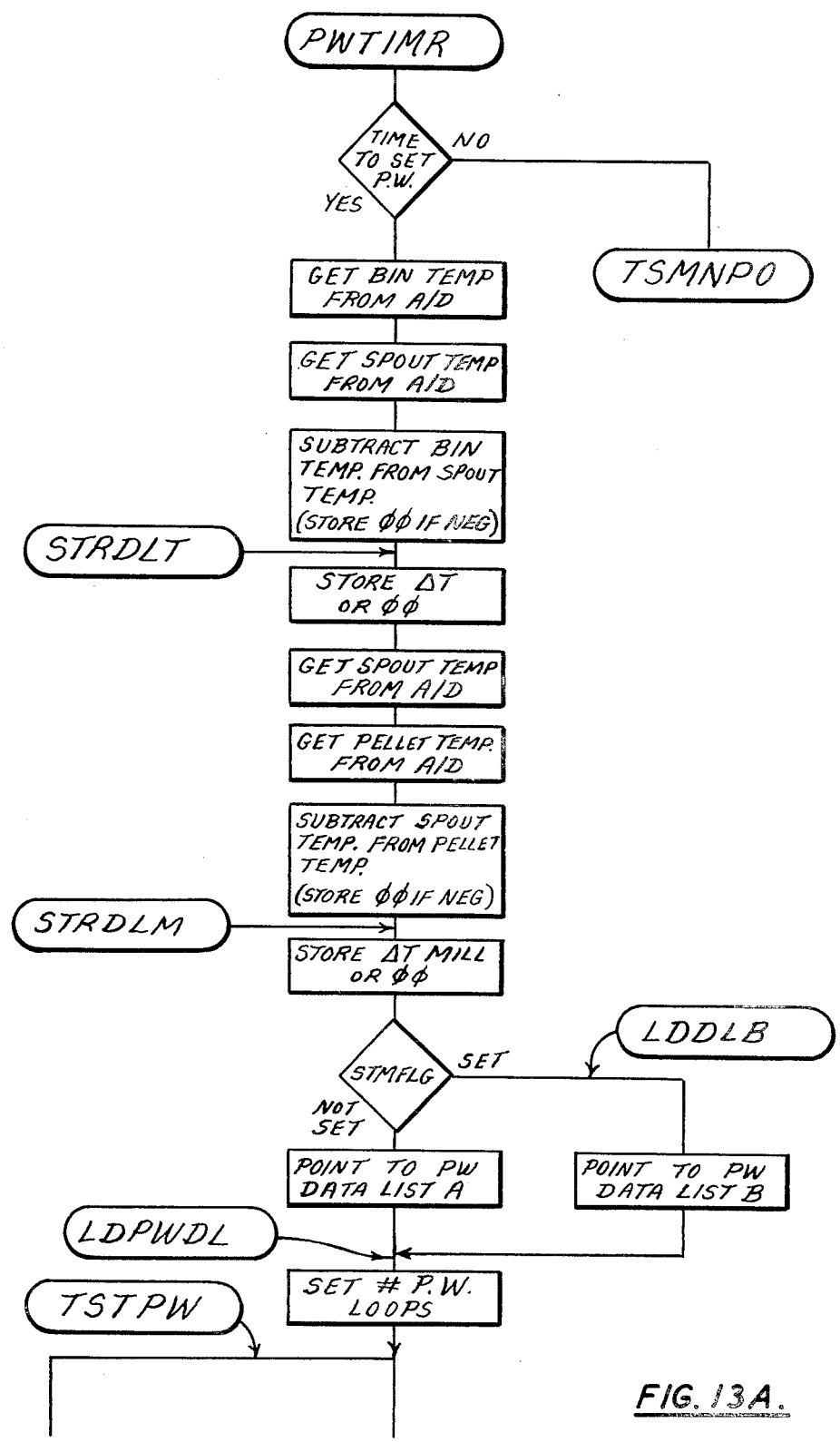
FIGS. 13A and B is a flow chart of the pulse width timer subroutine.
Figure 13B:
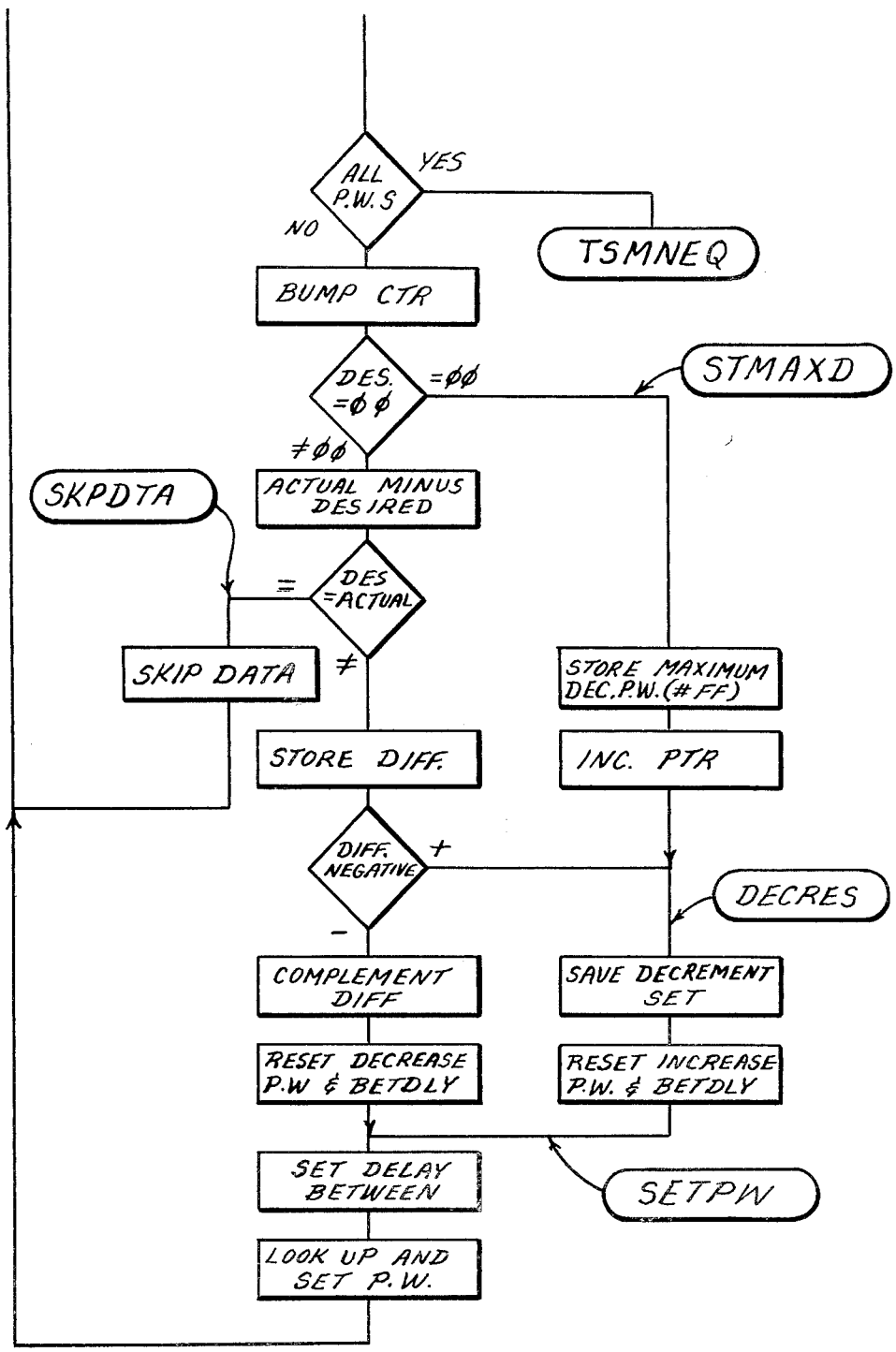
Figure 14A:
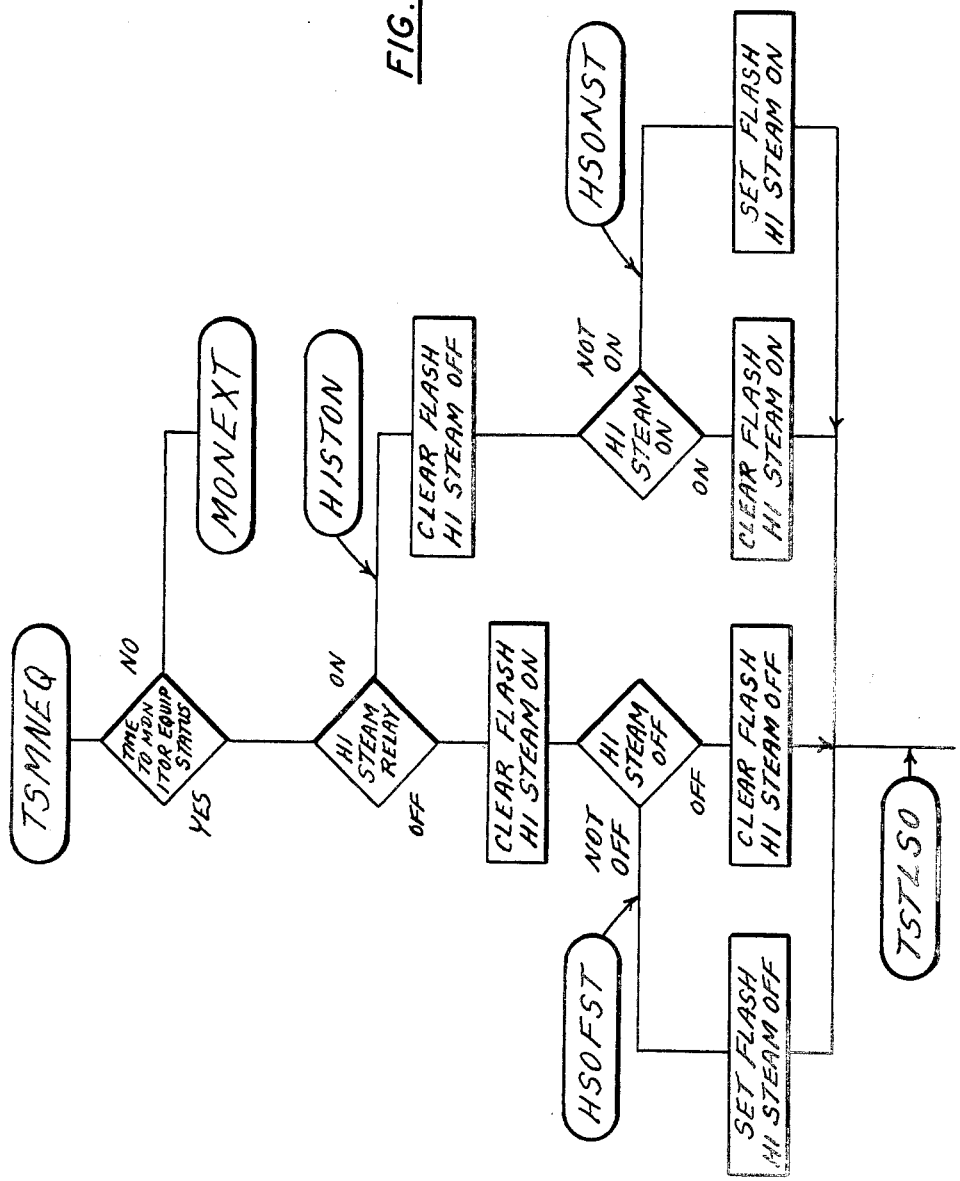
Figure 14B:
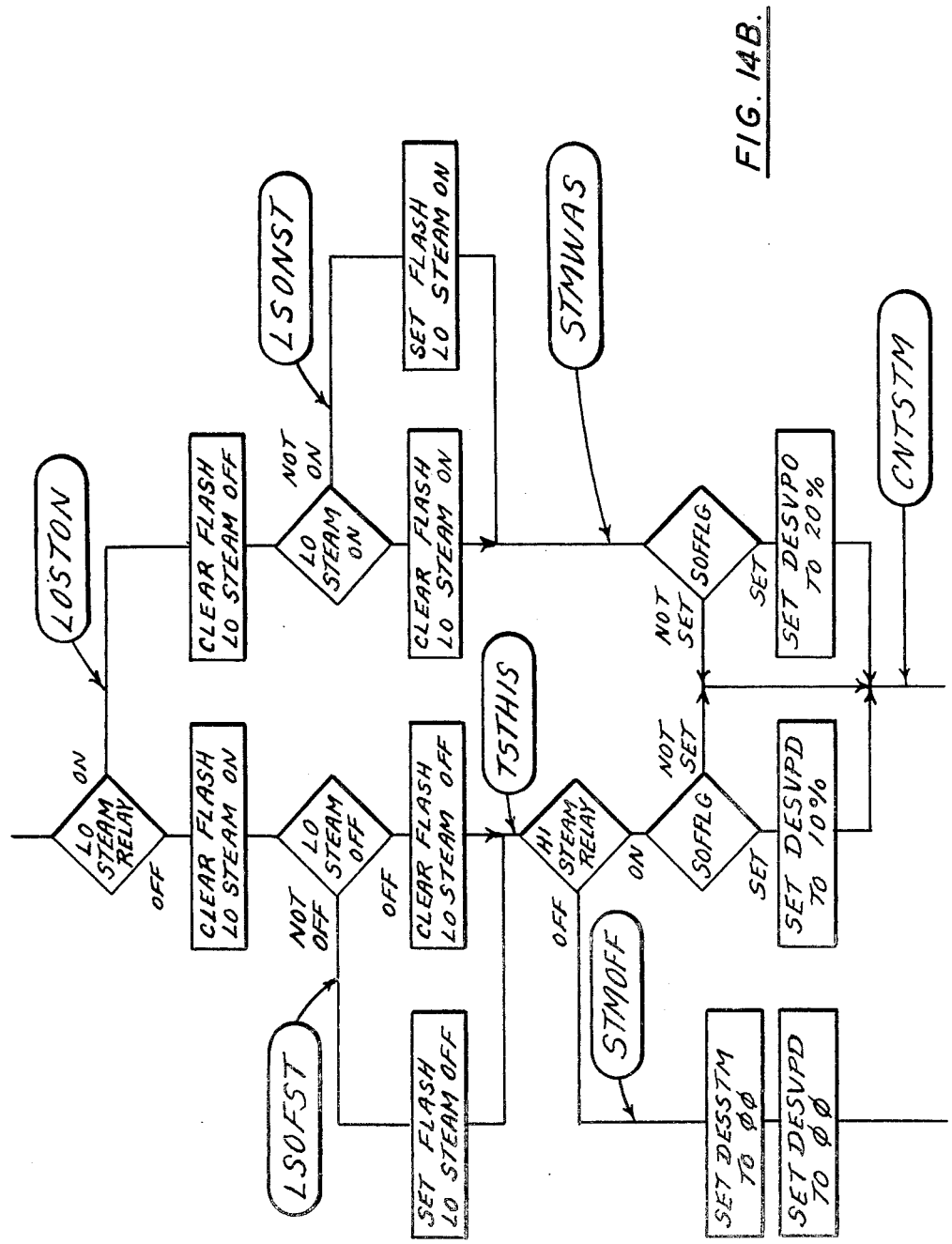
Figure 14D:
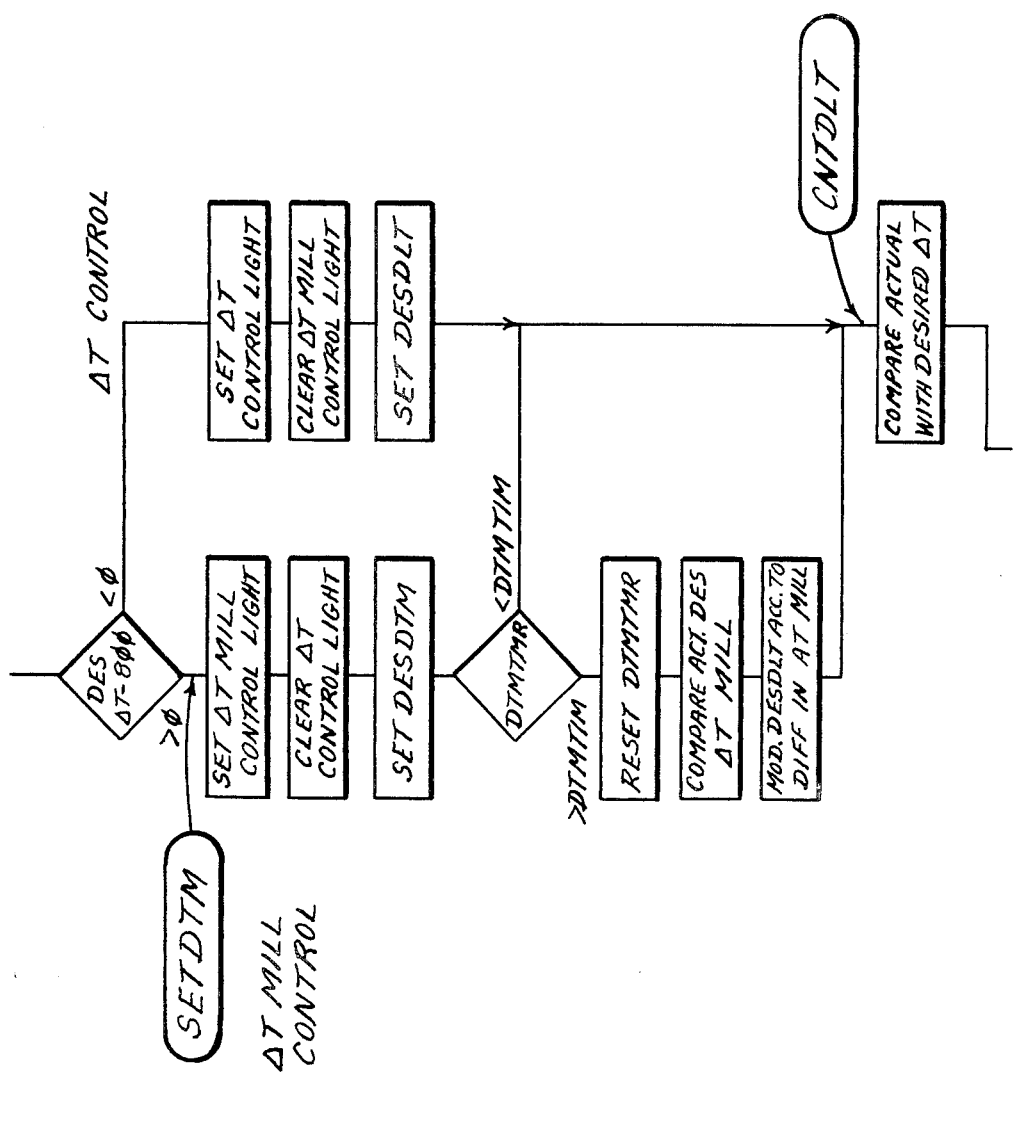

The TTLIZE or totalize subroutine shown in FIG. 12 merely updates the totals of various values being monitored by the machine for display and control purposes. After all totals have been updated, this subroutine branches to the PWTIMR or pulse width timer routine shown in FIG. 13A and B.

The PWTIMR or pulse width timer routine first tests to see if it is time to set the pulse widths. If it is, then there is a portion of the program which is unrelated to the pulse width, and merely updates the temperature values to be used in a later portion of the program. The temperature values at the bin, spout, and pellet temperature are obtained from the A/D converter circuitry, and compared to generate a value for $\Delta T$ which is stored, or a value for $\Delta T$ Mill which is also stored. The subroutine next checks to see if the steam flag is set, indicating that the steam is to be ratioed by percentage and depending upon its condition, the pointer is set to the list of data to be updated. The next portion of the subroutine compares a desired rate of input flow with the actual input flow as measured by a flow meter and stored in a RAM location, and then stores the difference between desired and actual for that particular ingredient or input for execution by the PWOUT subroutine, as described above. Each ingredient is compared and a pulse width calculation made for each loop through this portion of the subroutine. After all pulse widths have been calculated and stored, the subroutine branches to TSMNEQ shown in FIG. 14A-E.

The test monitor equipment subroutine is shown in FIG. 14A through E, FIG. 15A through C, and FIG. 16A through E and generally monitors the operator switch inputs, compares the switch input with equipment status, provides display information to indicate the actual condition of equipment including what is on and what should be on, and selects the mode of control and executes same. More specifically, at the beginning of the subroutine a software timer is used to test whether this subroutine has been executed recently enough that it can be skipped. If so, a branch is indicated to monitor exit or MONEXT shown in FIG. 16E. If it is time to execute, then the subroutine next tests if the high steam relay is on, indicating that high steam is being input. If it is on, then a display light on the panel which might otherwise be flashing to tell the operator that the high steam valve is cleared, and the subroutine tests to see if the high steam valve is open. If the valve is not open, then the display light for high steam on is set so that it will flash, thereby indicating to the operator that it has not come on, possibly indicating a valve or other failure. Similarly, other logical sequences through this particular portion of the subroutine monitor the condition of the high steam relay, the condition of the steam valve, and control the flashing of display lights to tell the operator when a valve is in an improper position. Similary, the next portion of this subroutine goes through the same sequence for the low pressure steam, but has additional branch points which branch around the control portion of this subroutine if both the high pressure steam and low pressure steam are off. If the high pressure or low pressure steam is on, then an initial desired valve position or DESVPO is set and after a sufficient time delay for reaction, the subroutine gets into the control portion of this subroutine.

As explained before, this particular software package offers three modes of control; $\Delta T$ mill control, $\Delta T$ control, and straight ratio of percentage steam control. The particular mode of control is determined by the operator by setting the $\Delta T$ digi-switch to the correct number. If the $\Delta T$ digi-switch is set at 0, straight ratioing or percentage steam control is selected. To achieve this, the first test is made to see if the desired $\Delta T$ digi-switch is set at 0 or not 0. If it is set at 0, then the subroutine executes the branch to the right to set the steam flag or STMFLG indicating that steam is to be controlled by percentage ratio, the percentage steam mode of control light is told to turn on, the $\Delta T$ mode of control light is told to turn off, as well as the $\Delta T$ mill control light, and the next step in the logic sequence actually performs the ratioing of percentage steam to the rate of dry flow (dry feed input rate) and stores the correct information for desired valve position into memory for execution by the pulse width out and pulse width timer routines previously discussed.

If the desired $\Delta T$ digi-switch is not equal to 0, the steam flag is reset, the percentage steam mode of control light is cleared, and a software timer tests to see if it is time to update the valve positions. If it is, then the software timer is reset (STMTMR), the desired $\Delta T$ (DESDLT) is converted to binary, and the desired $\Delta T$ digi-switch is tested to see if it is greater than or less than 800. If it is less than 800, the operator has selected $\Delta T$ control and the logical steps performed are as follows. The $\Delta T$ control light is told to turn on, the $\Delta T$ mill control light is told to turn off, and the desired $\Delta T$ (DESDLT) is stored in memory. If the desired $\Delta T$ digi-switch is set above 800, the operator has selected $\Delta T$ mill control and a similar logical sequence is performed, with a timer (DTMTMR) testing to see if it is time to update the desired $\Delta T$ mill stored in memory. If it is time, the timer (DTMTMR) is reset, and the actual and desired $\Delta T$ mill are compared with the desired $\Delta T$ (DESDLT) modified according to the difference between its value and the ΔT mill value selected by the operator. As both ΔT mill and ΔT modes control the input of steam, both modes are summed and proceed through one logical sequence, starting with comparing the actual with desired ΔT (desired ΔT having been modified if ΔT mill control was selected). If the actual is less than desired, then the desired value position (DESVPO) is incremented in memory or remains at maximum, with a multiplier being used if low pressure steam has been selected. If the actual is greater than desired, then the reverse takes place, i.e., desired valve position (DESVPO) is decremented in memory or the minimum value of 00 stored with suitable multiplication to compensate for low pressure steam. The steam jackets are next monitored in much the same manner as described in connection with the high pressure steam equipment.

Figure 15B:
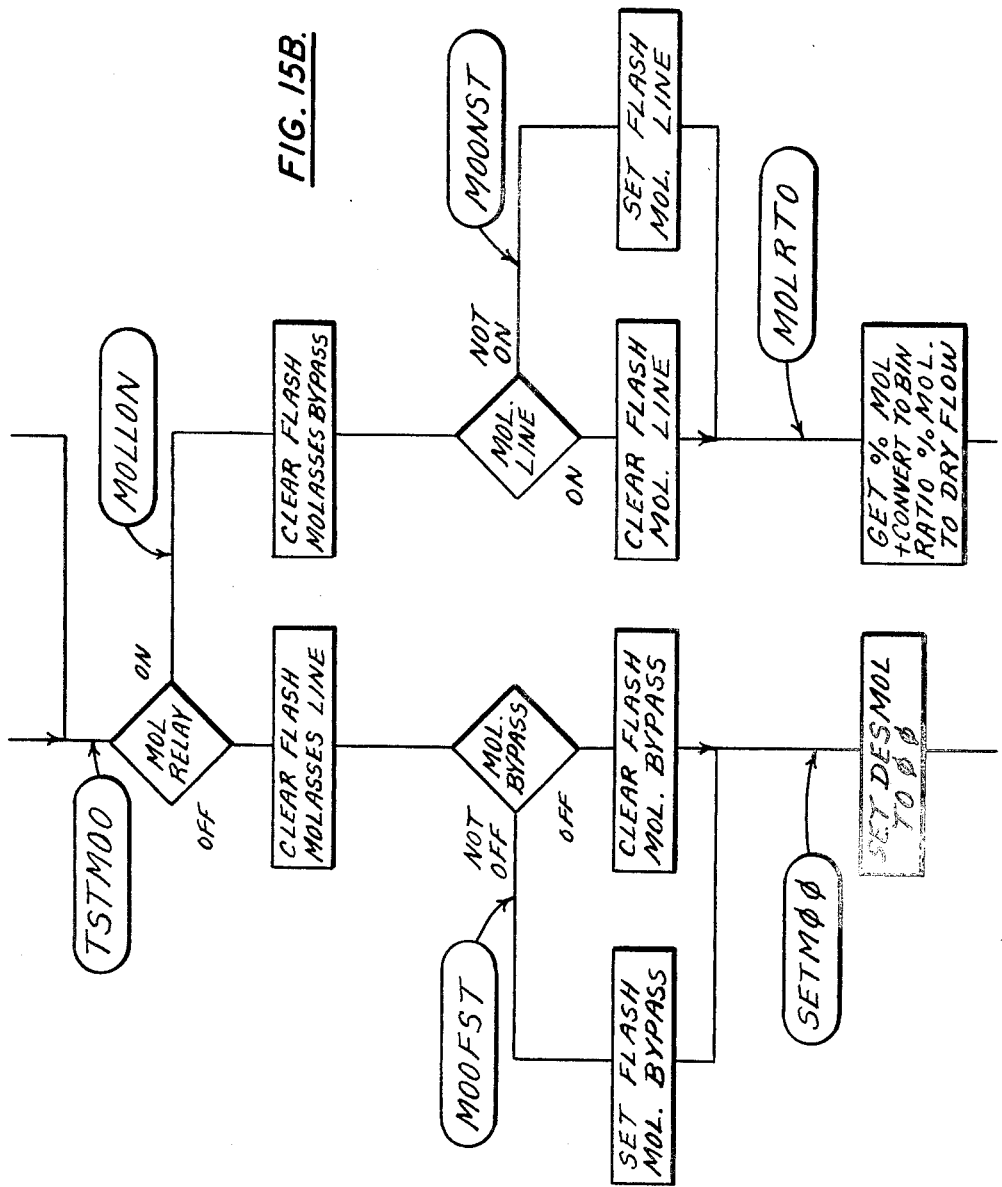
Figure 15C:
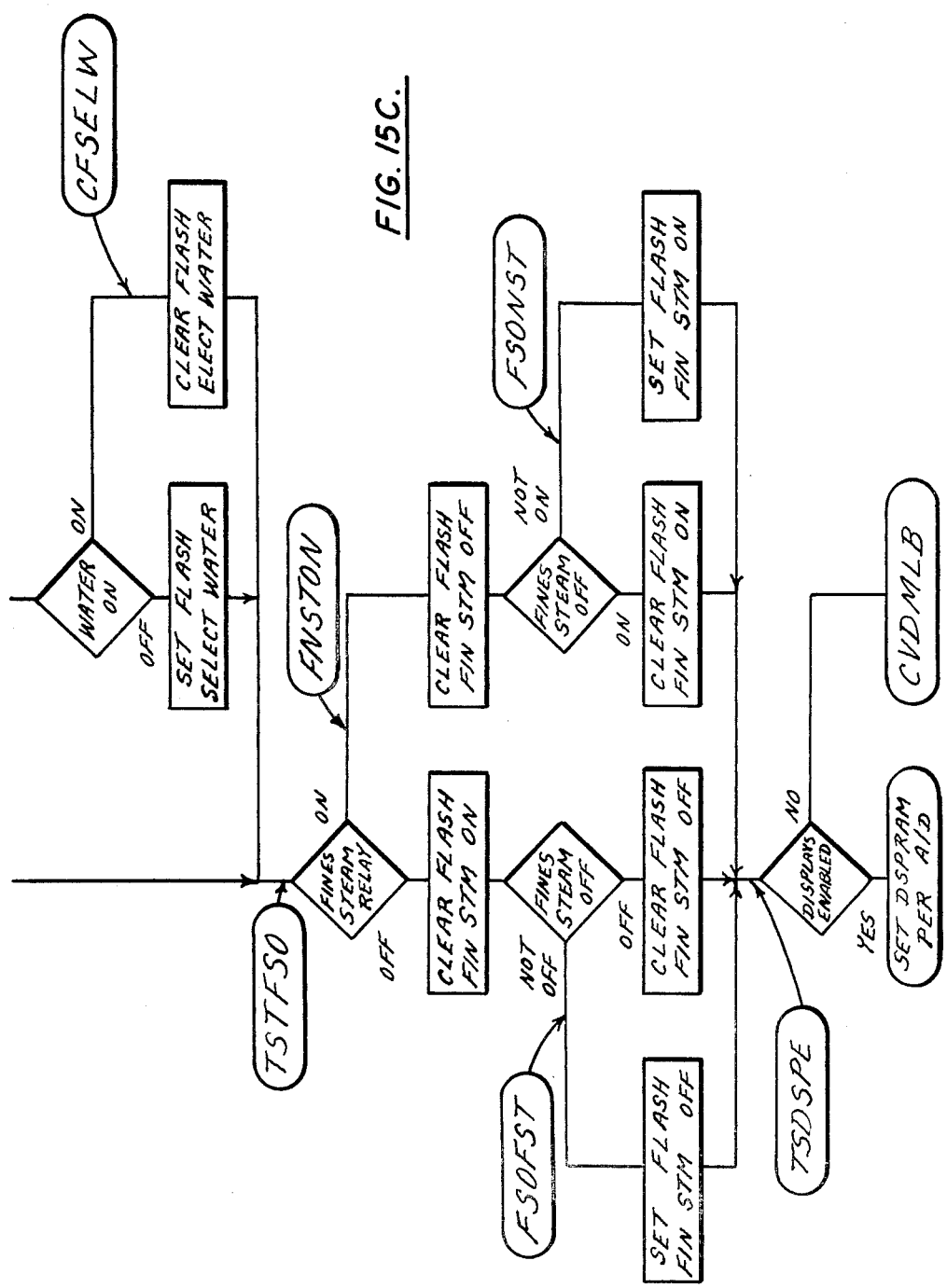
Figure 16A:
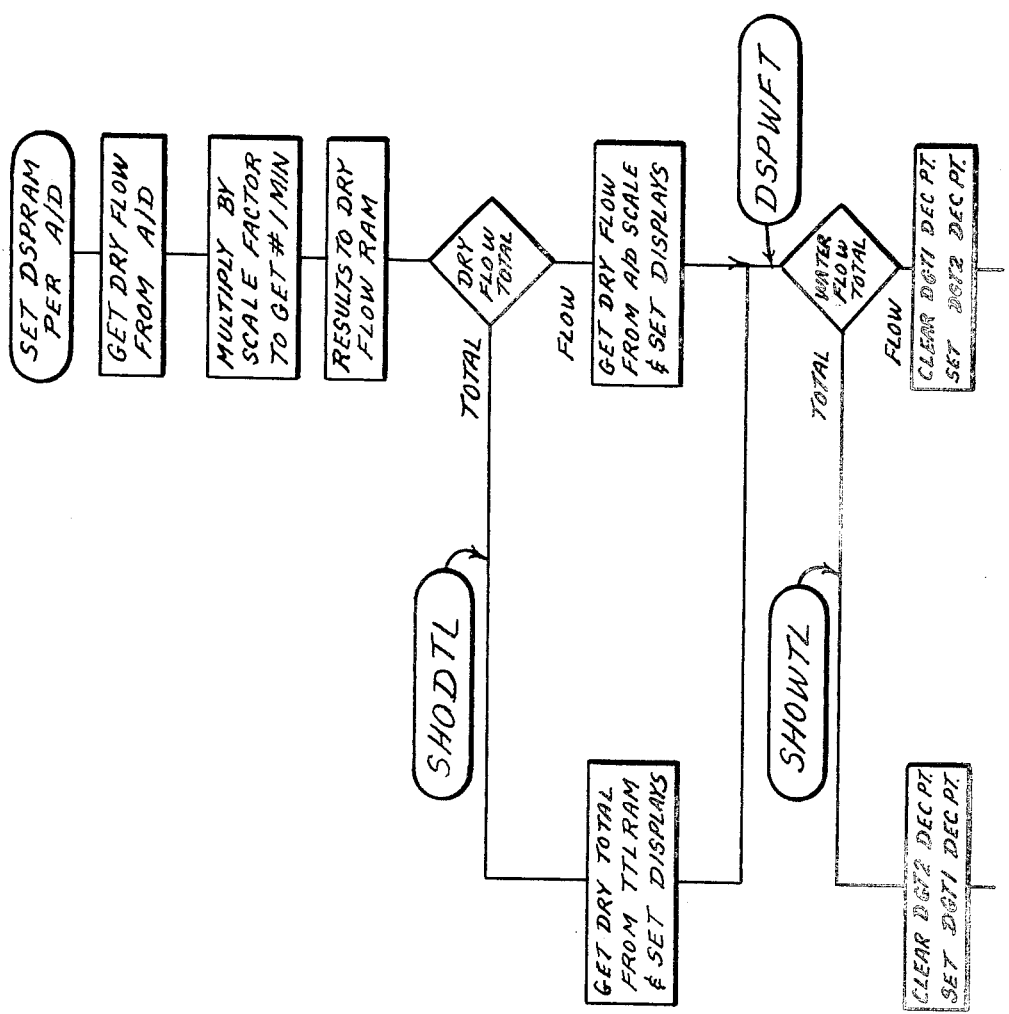
Figure 16B:
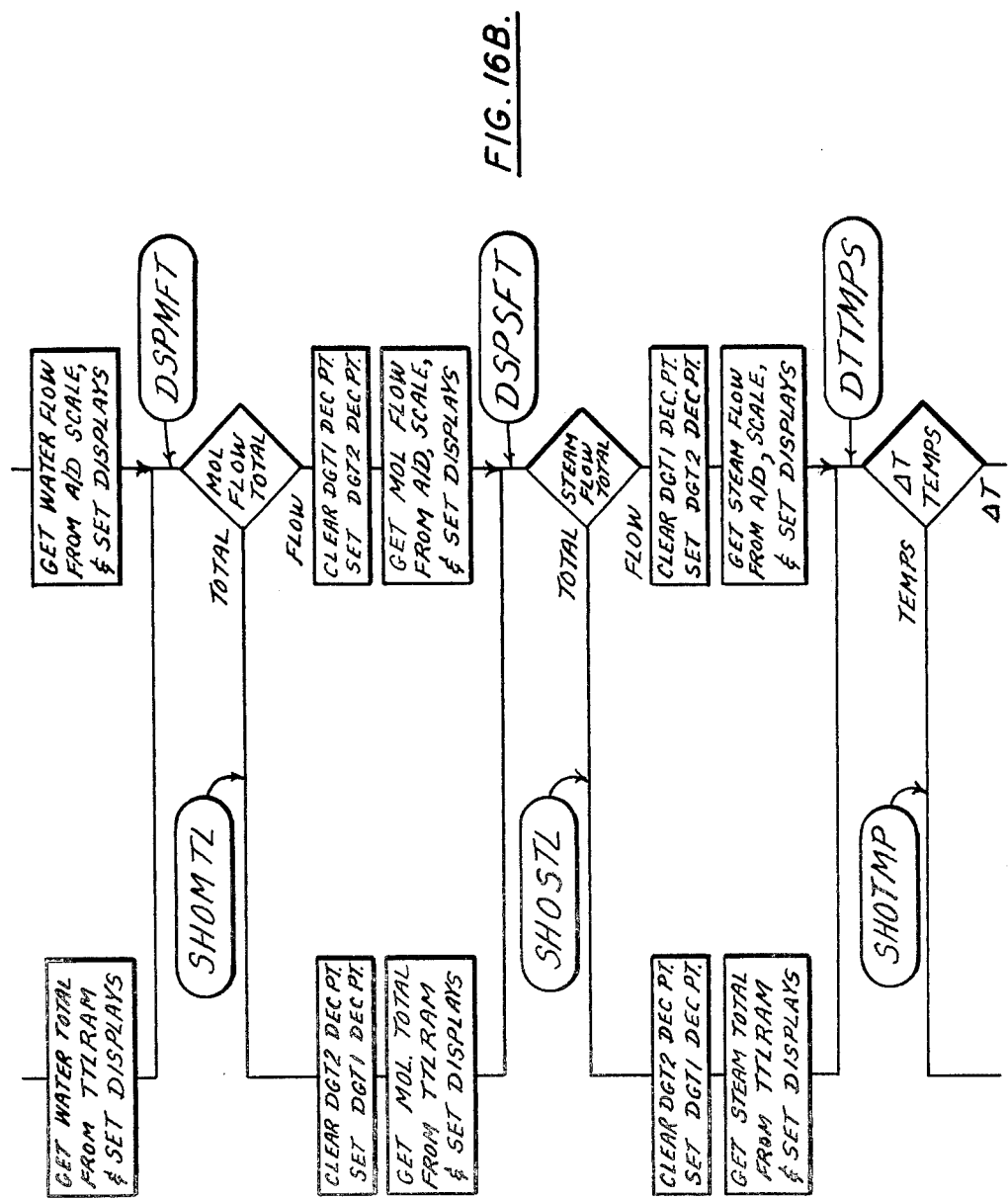
Figure 16C:
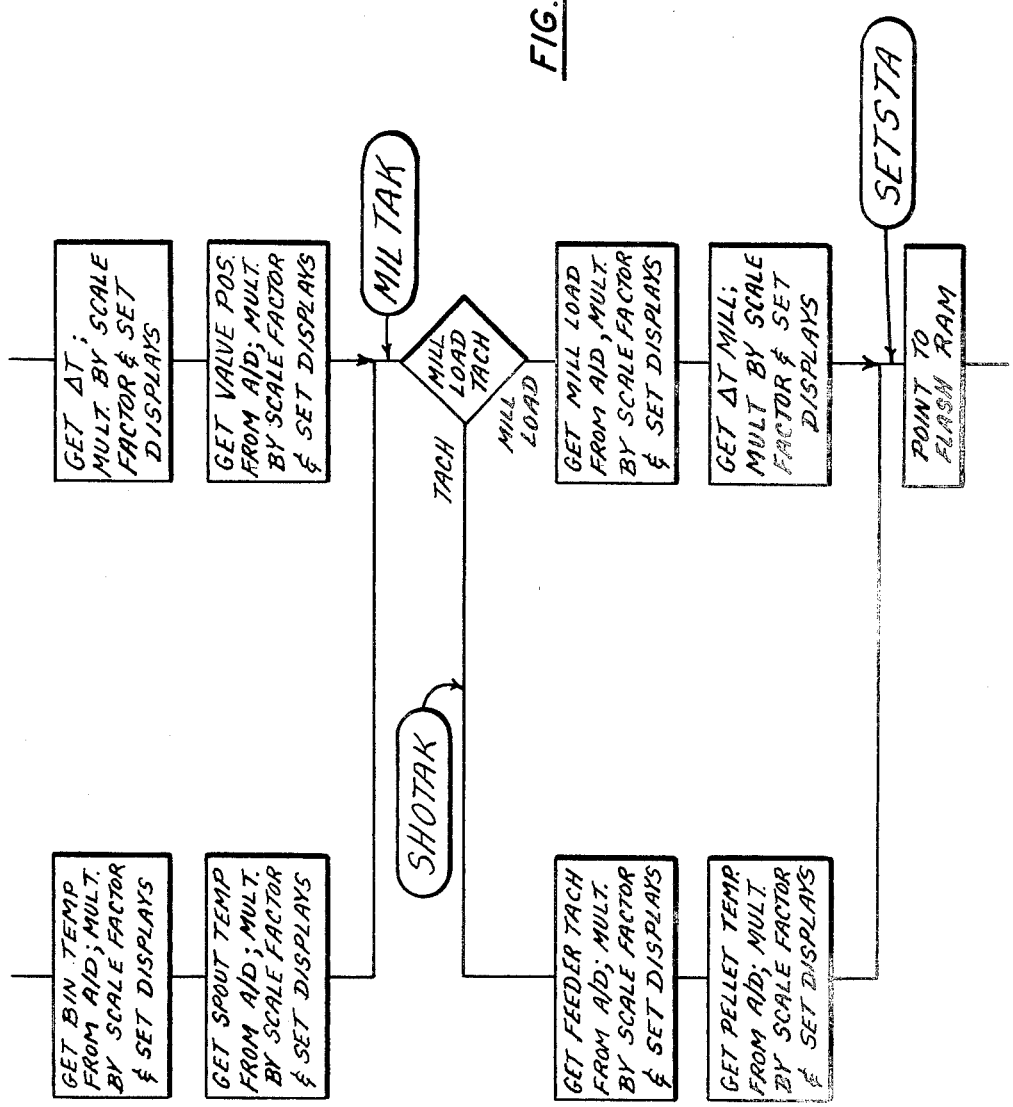
Figure 17A:
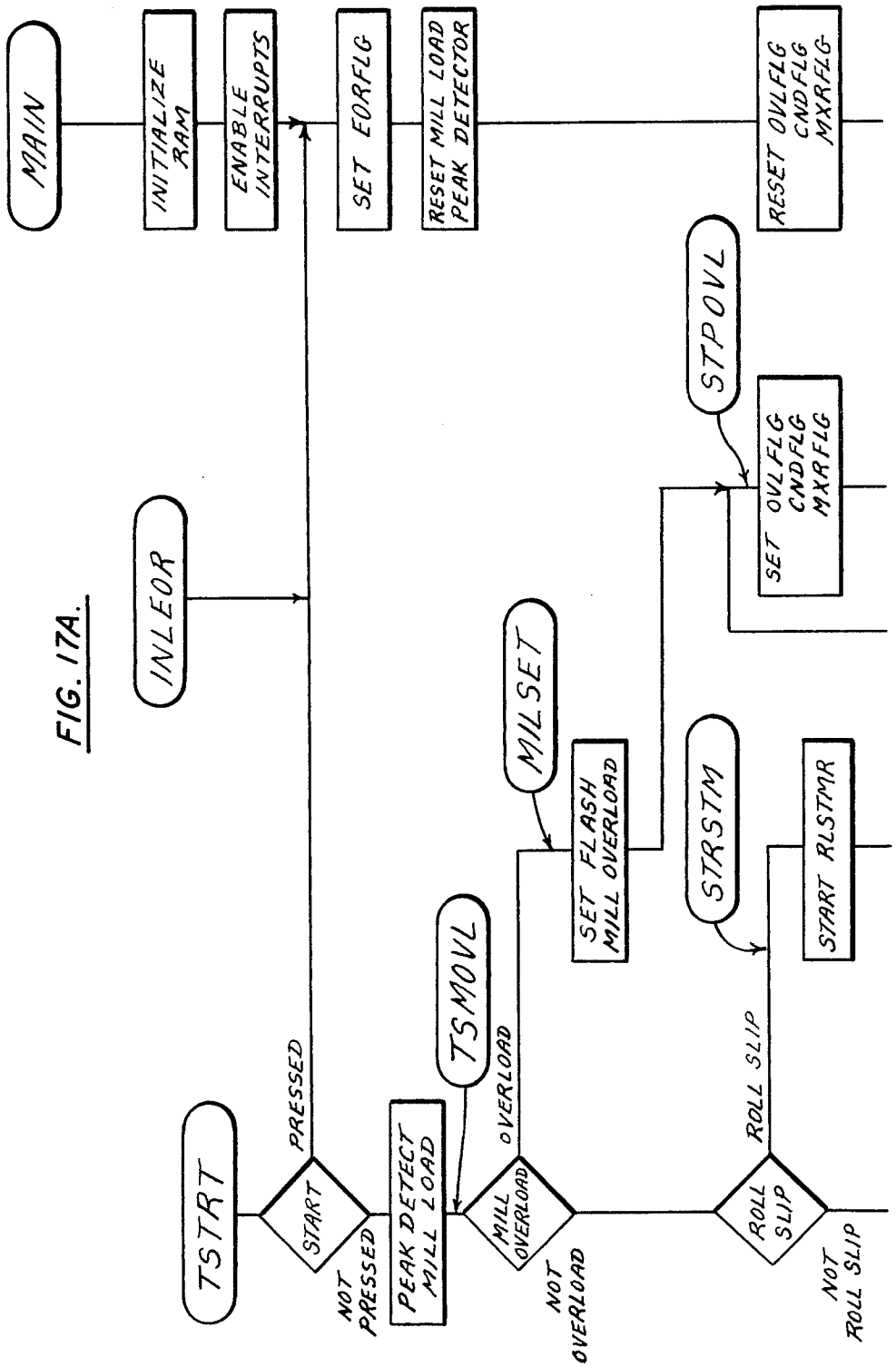
Figure 17B:
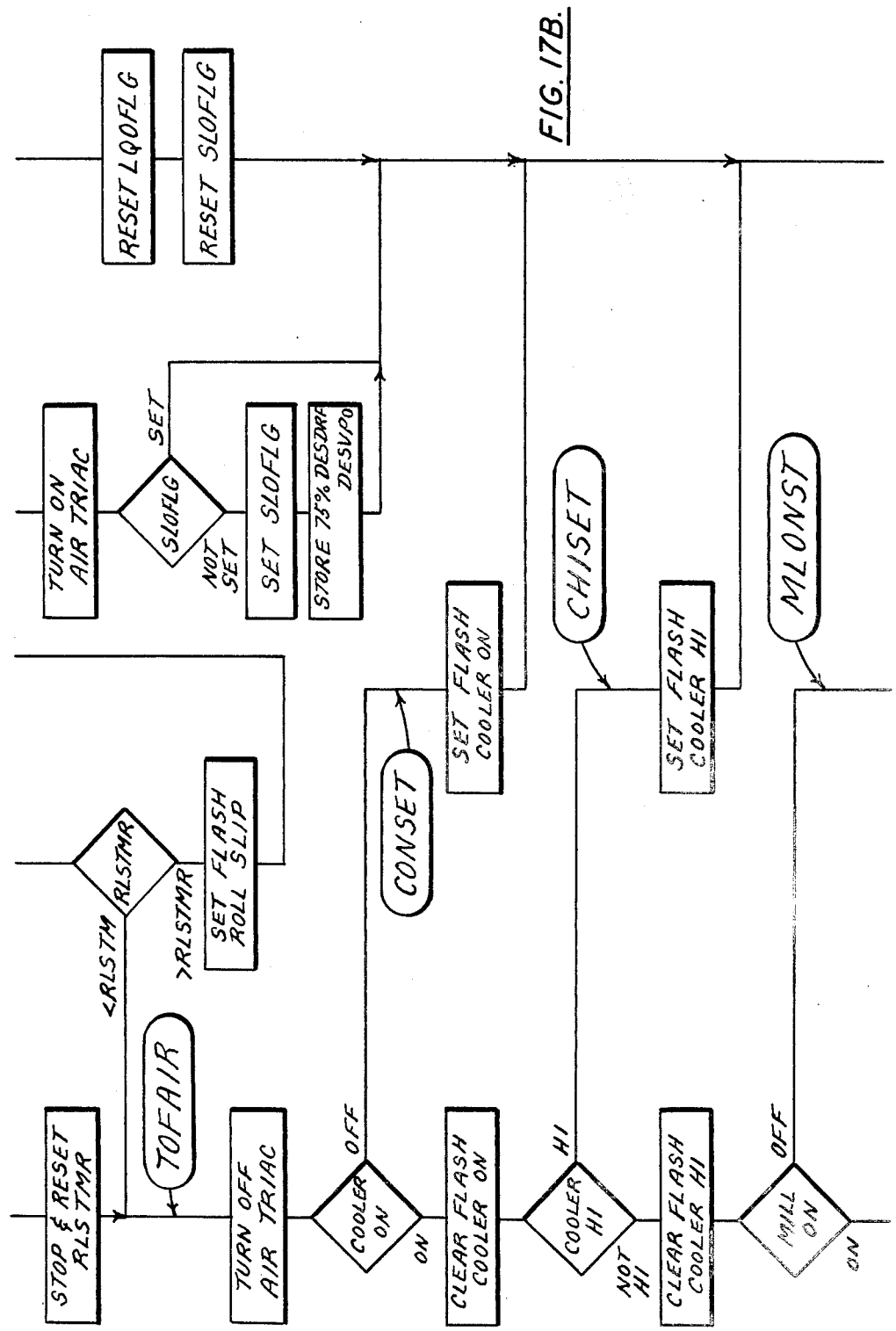
Figure 17C:
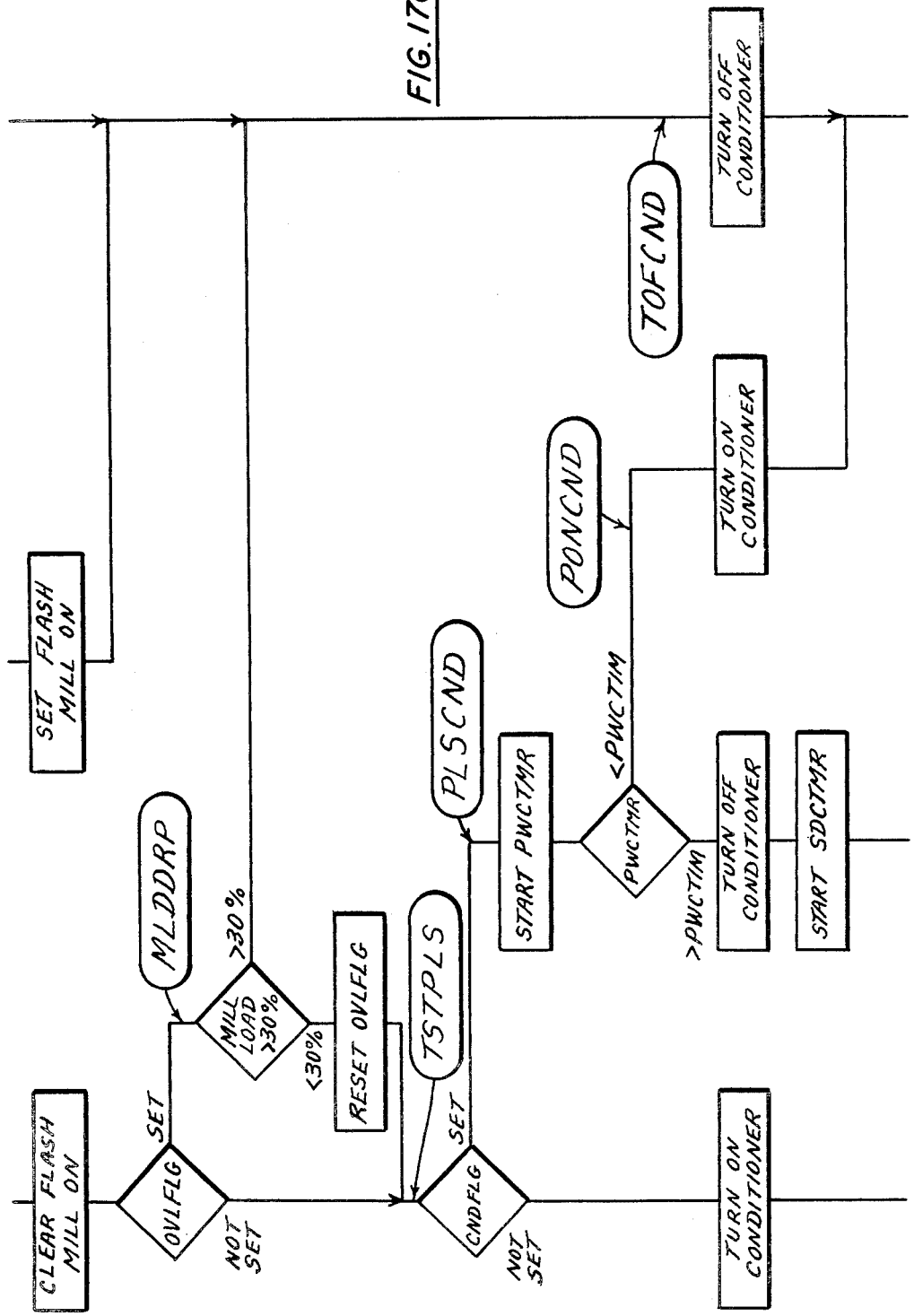
Figure 18A:
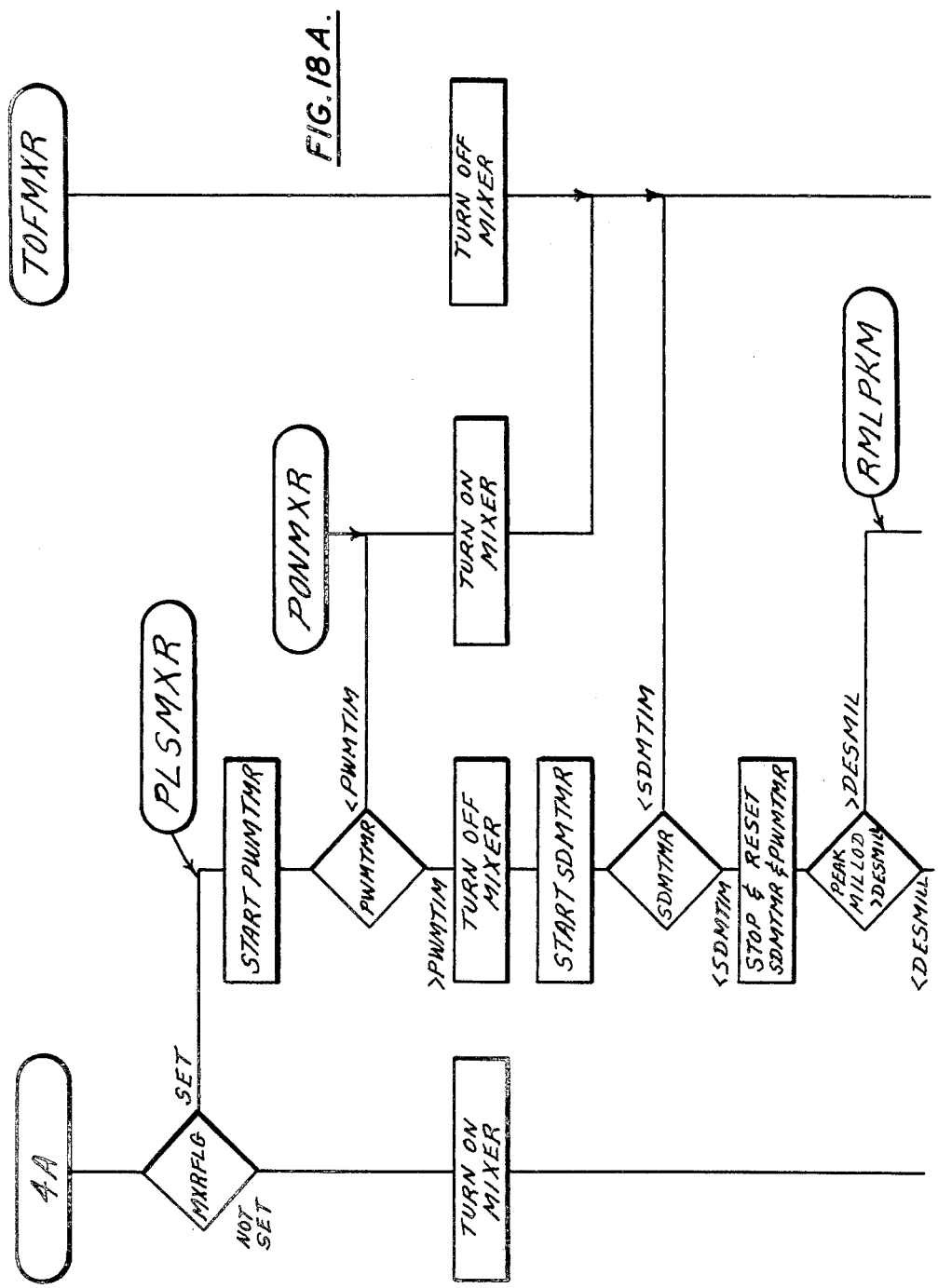
Figure 18B:
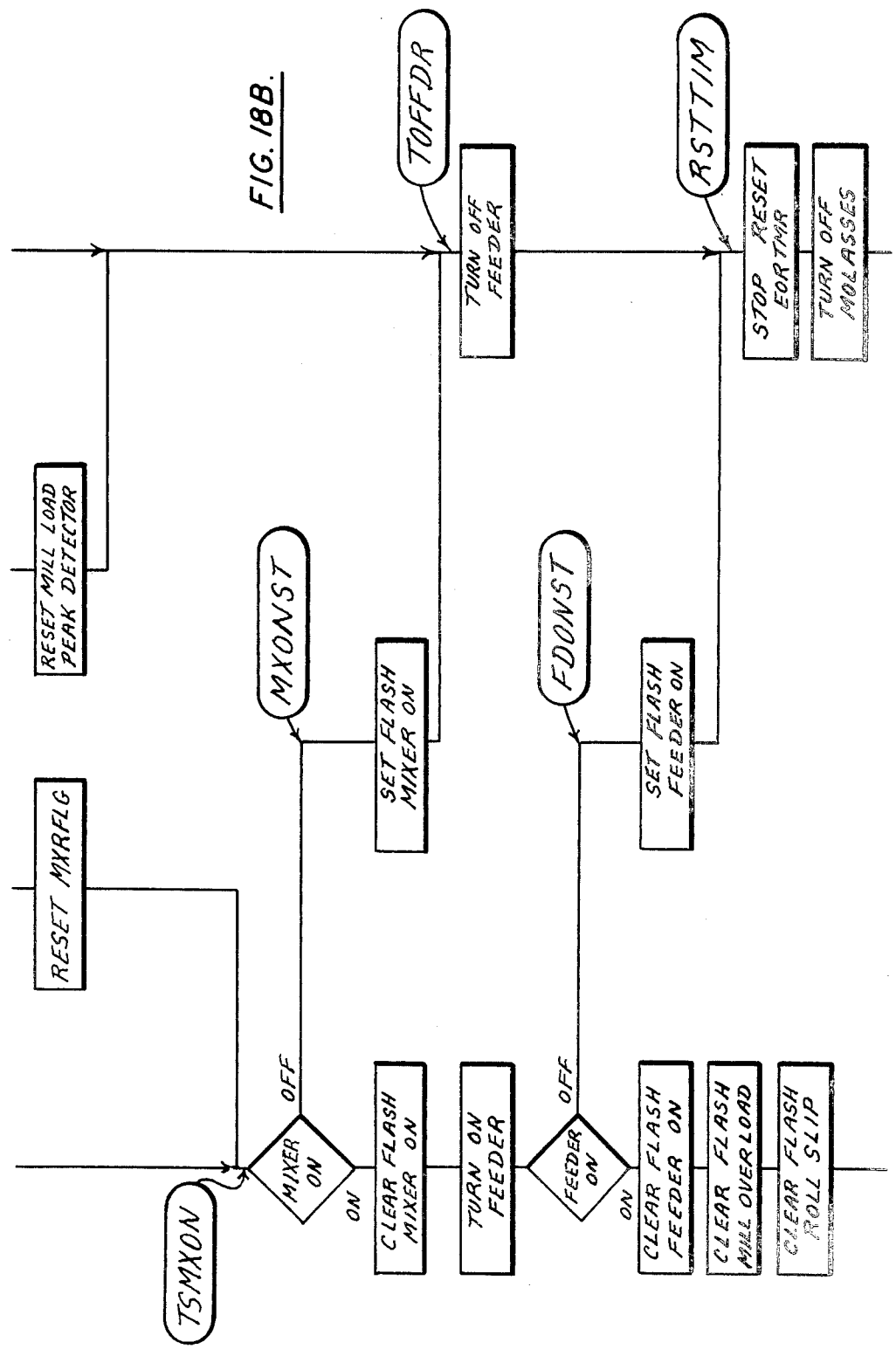
Figure 18D:
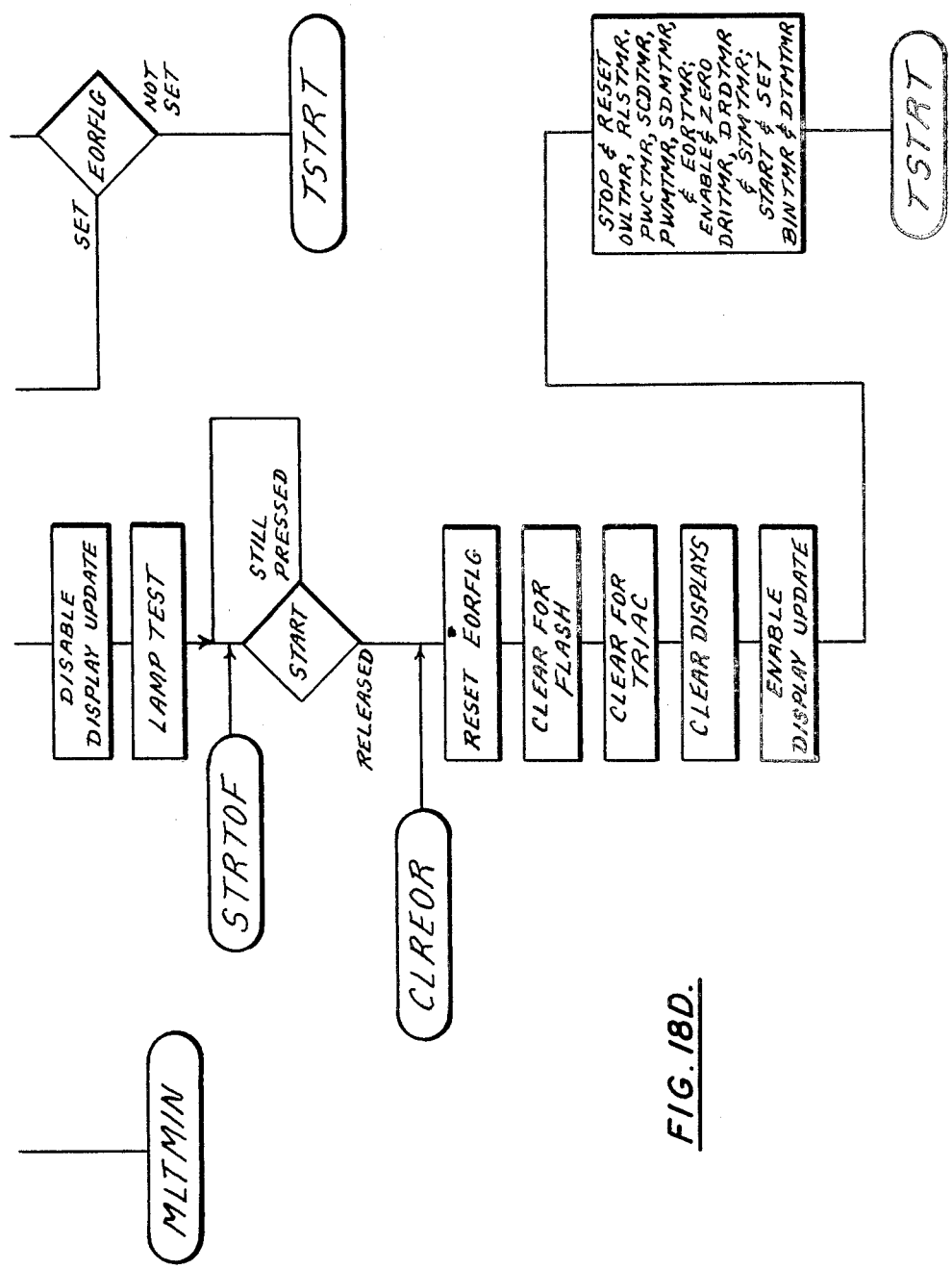
Figure 19:
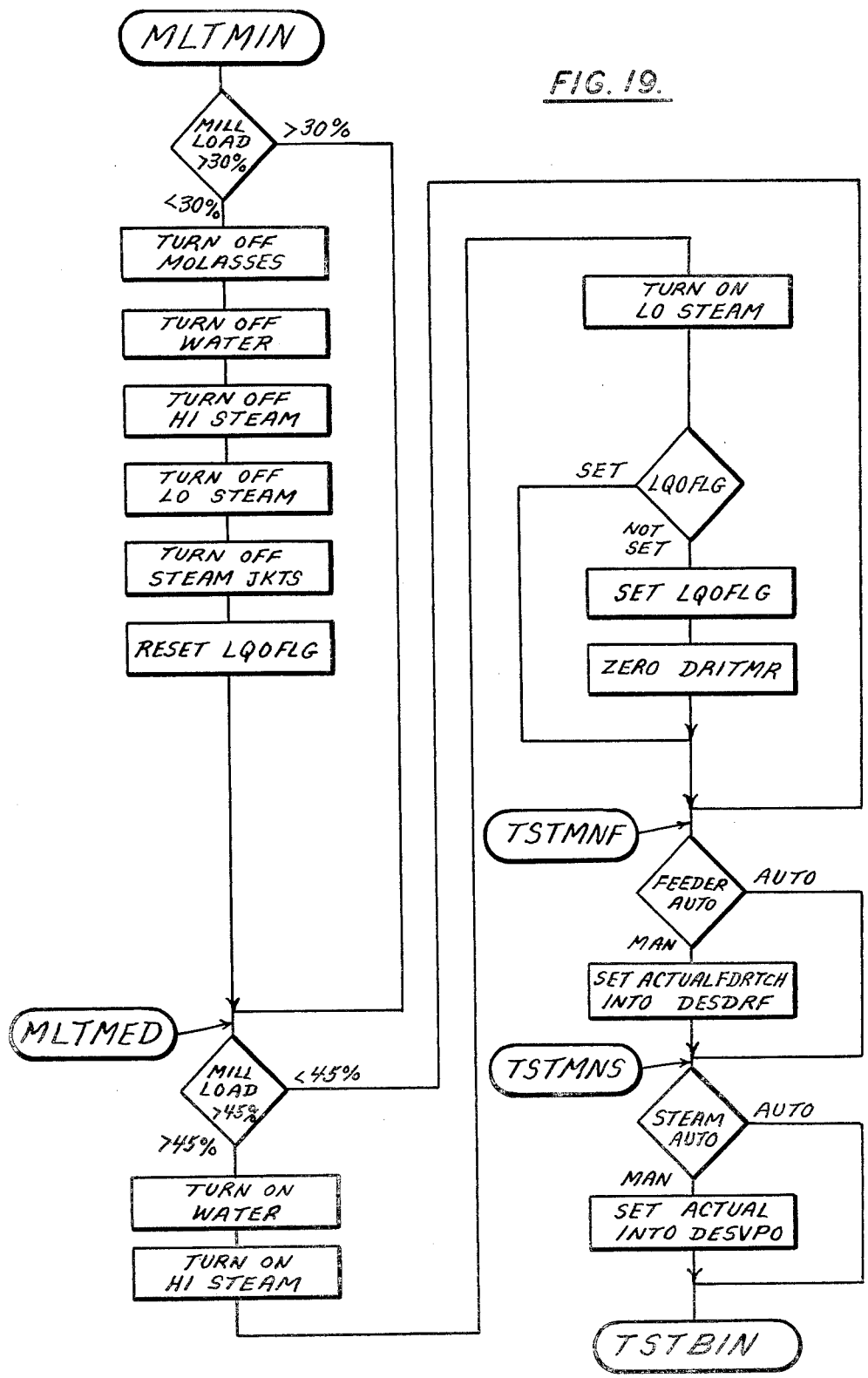
FIG. 19 is a flow chart of the mill test minimum subroutine.
Figure 20A:
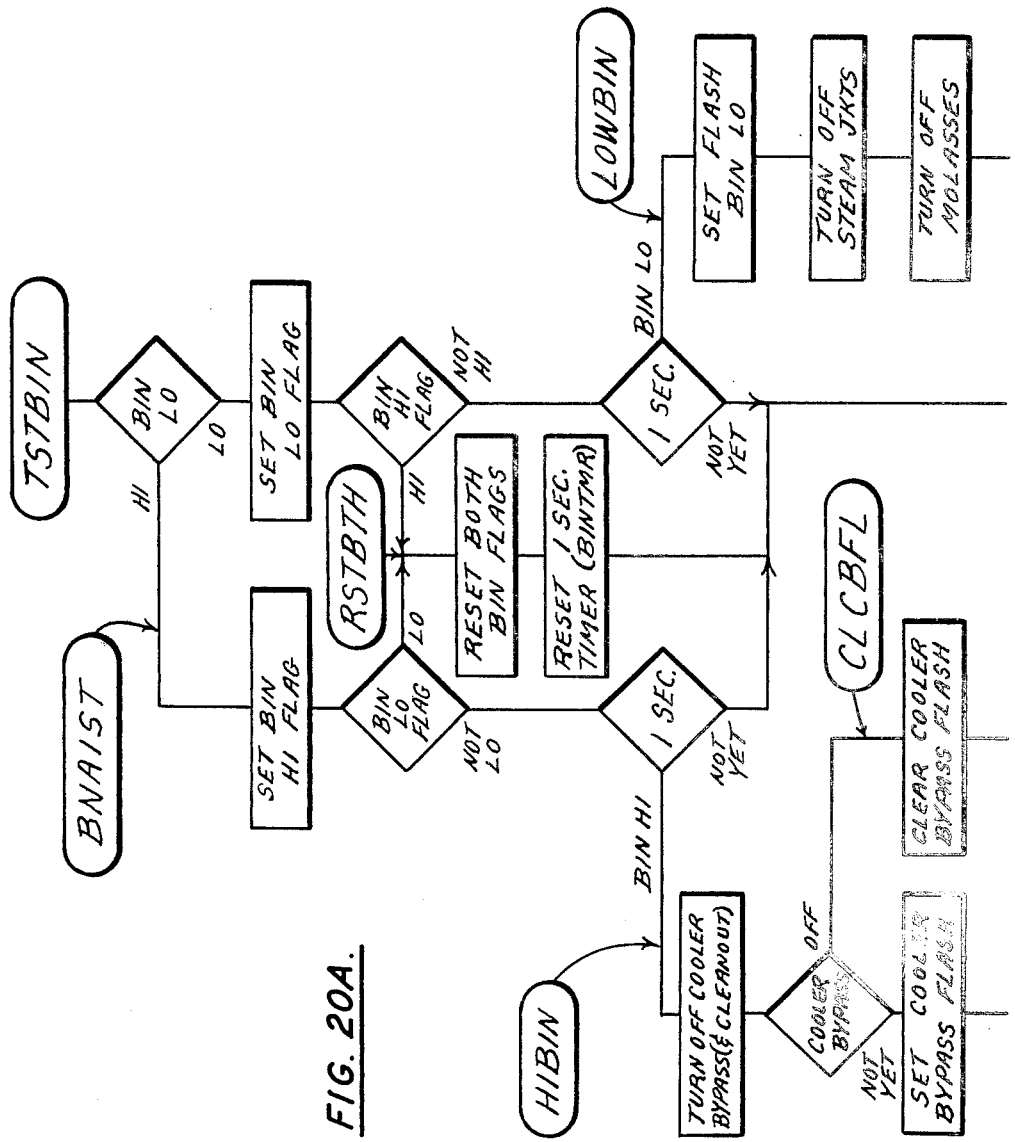
FIGS. 20A-C is a flow chart of the test bin subroutine.
Figure 20B:
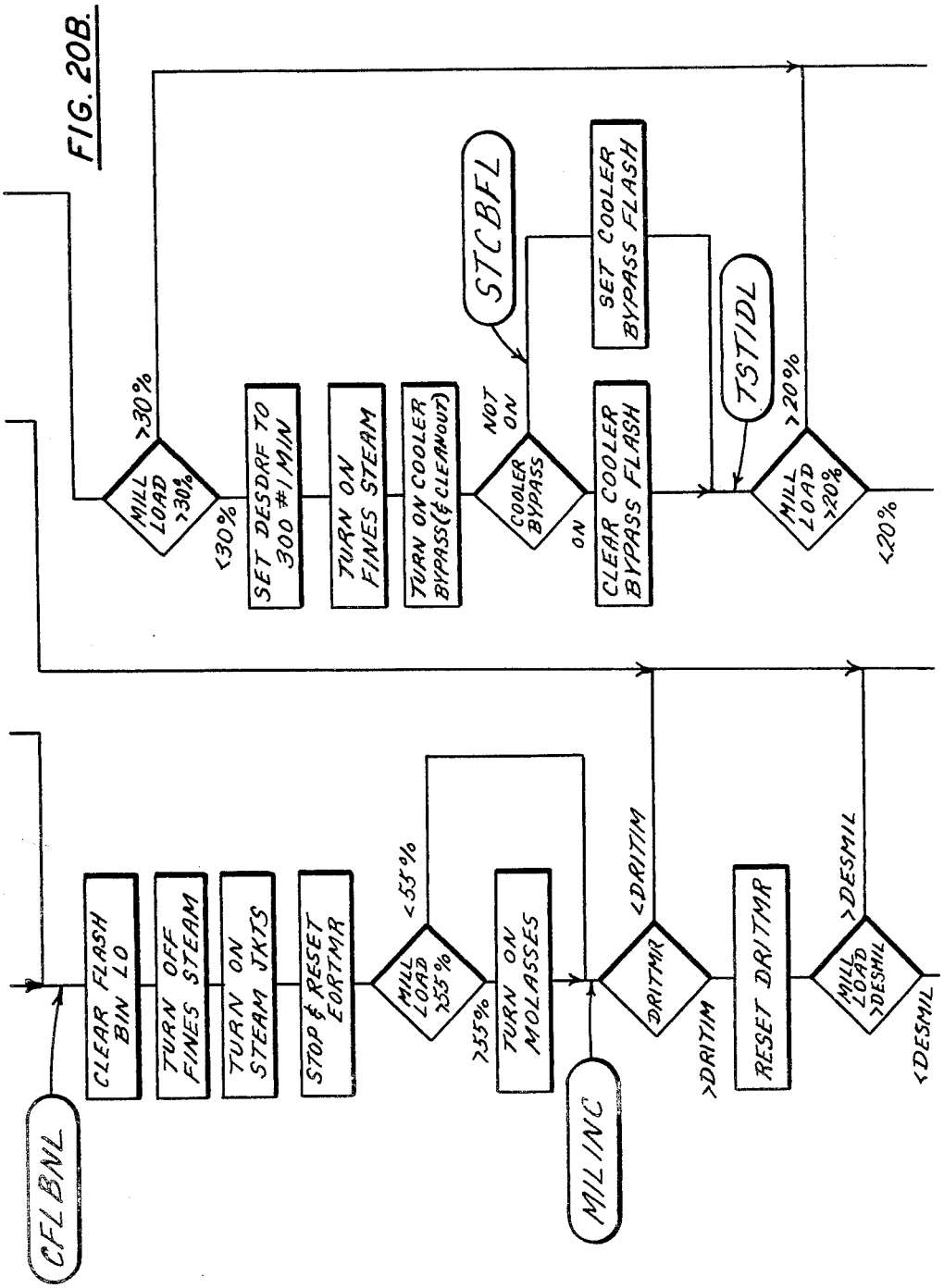
Figure 20C:
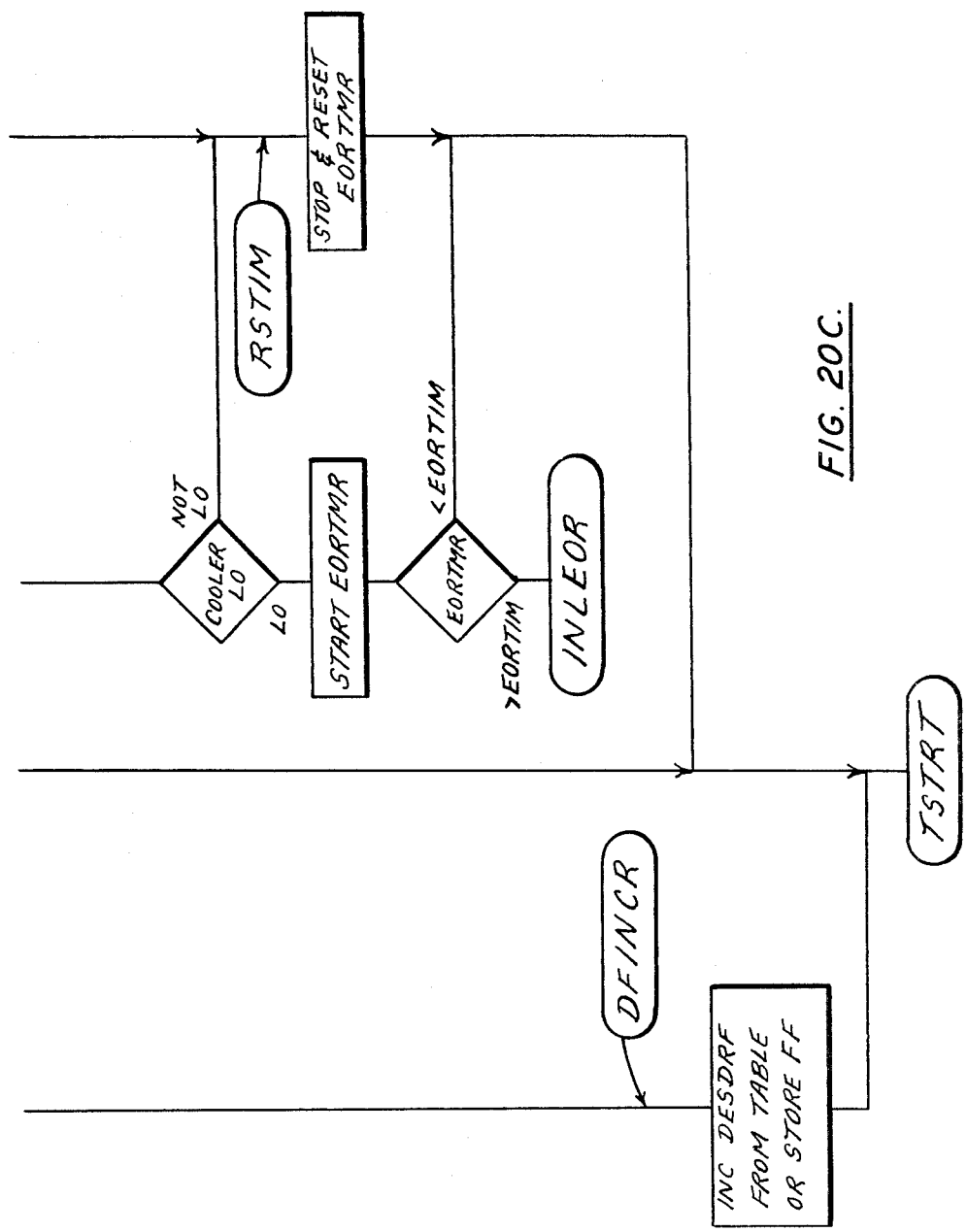

The next portion of the TSMNEQ subroutine including test water, test molasses, and test fines steam, is shown in FIGS. 15A-C. The test water or TSTWTR portion of the subroutine monitors and indicates to the operator the condition of the water controls. However, an additional step in this position ratios the percentage of water desired to the dry flow (rate of dry feed input) and sets the valve position for the rate of flow desired. Similarly, the test molasses on or TSTMOO portion monitors the condition of molasses control equipment and includes a ratio step to ratio the percentage of molasses to the rate of dry flow, and additionally checks to make sure that the water is on. If not, it flashes a light to indicate to the operator to select water. This is required because molasses is not input into the mill unless the water to dissolve and dilute the molasses is being input. The next portion of this subroutine is the test fines steam on or TSTFSO which is a separate supply of steam used to process the fines at the end of a pelleting run. This portion of the subroutine is very similar to the high steam portion described above. Next, if the displays are enabled, the information stored in the RAM is updated. If the displays are not enabled, then there is a branch to that portion of the subroutine which follows that converts the Mill load from decimal to binary or CVDMLB.

The display update portion of the test monitor equipment subroutine is shown in FIGS. 16A-E. This portion of the subroutine may be generally described as first testing the position of the display switch to determine which parameter is to be displayed, getting the data from a RAM which has been input from an A/D converter and setting the display values in RAM that are available for update by the main I/O handler portion of the software, FIG. 9. Referring to the subroutine, the first series of steps is to set the display RAM per the A/D value by getting the dry flow rate from the A/D RAM, multiply by a scale factor to get the pounds per minute rate, and store the result in the dry flow RAM. Next is a test point to determine the position of the display selector, the operator being able to select either the dry flow total, or the rate of dry flow. If dry flow total is selected, then the dry flow total is read from the TTL RAM and the display is set for that information. If the dry flow rate is selected, then the dry flow rate from the A/D, adjusted by the scaling factor, is available and the displays are set for that information. A similar logical sequence is followed for the water flow or total, molasses flow or total, steam flow or total, bin temperature-spout temperature or ΔT, and mill load −ΔT Mill or feeder tach-pellet temperature. The next portion of this subroutine takes care of displaying the digital input and alarm/status conditions. A repetitive loop is used to count through all of the data until all of the bits have been displayed in the displays, after which the repetitive loop branches to convert the desired mill load to binary and set this information in storage at DESMIL. After this step, an incoming branch for monitor exit or MONEXT branches in from the beginning of the test monitor equipment program, as described above. This branch point skips the entire test monitor equipment section unless it is time to execute it. The next set of logical sequences restores memory, registers, and returns the software to the main I/O subroutine, which in turn returns program control to that portion of the program which was being executed when the machine interrupt occurred.

The main equipment subroutine is shown in FIGS. 17A-D and 18A-D. It is recalled that the program immediately branches to this subroutine from the beginning of the software. Starting at the branch point labeled MAIN, this subroutine initializes the RAM, enables the interrupts, resets a series of flags, turns off the conditioner, branches at TOFMXR to turn off the mixer, feeder, molasses, water, high steam, fines steam, steam jackets and then tests if the end of run flag or EORFLG is set. The first time through this subroutine, the end of run flag is set and the program branches to turn off other equipment, set up the end of run display for flash, and then test the position of the start button on the operator's console. If the start button is not pressed, the program loops until it senses that the start button is pressed. Upon the start button being pressed, all of the front panel lights are turned on to test the lamps and indicate to the operator that the program is ready to start a run. There is another test point for the start button and if it is still pressed, program execution is trapped in another loop until it is released. After the start button is released, the end of run flag is reset, the end of run display which was flashing is cleared, all the displays are cleared, the display update is enabled, and a group of software timers are zeroed and started, before the program branches to TSTRT or test start. This branch point takes program control back to the beginning of the subroutine at FIG. 17A where the start button is again tested to ensure that the operator has released it. If released, mill overload is tested and roll slip is tested, both of which should not be happening in a start-up condition. The equipment is then tested to see if the operator has enabled it or turned it on, and if not, a flashing display is set up to tell the operator to turn on the particular equipment not enabled, or turned on in the manual mode. The program does this for the cooler, the mill, the conditioner, the mixer, and the feeder, before getting into a run condition. This portion of the subroutine also sets in some initial dry flow parameters, and valve positions for the input of steam. It tests the mill load and decrements the desired dry flow if the load is too high. This subroutine then branches to the mill test minimum or MLTMIN subroutine shown in FIG. 19.

The mill test minimum subroutine tests first to see if mill load is greater than 30%. If mill load is less than 30%, molasses, water, high and low pressure steam, and steam jackets are turned off and the liquid off flag (LQOFLG) is reset. This allows the mill to build up a load of feed before liquids are added. If the mill load is greater than 30%, then the program branches around and mill load is tested at the 45% point. If mill load is greater than 45%, water and both high and low pressure steam are enabled and the liquid off flag is tested to see if an additional amount of dry feed should be introduced to compensate for the reduction of load caused by the addition of liquids. A software timer DRITMR is zeroed, and the feeder selector switch is tested for manual or auto position. If in manual, the actual feeder tachometer speed is stored in the desired dry flow (DESDRF) memory so that the program can start from the actual feeder speed if the operator switches to manual control and then back to the automatic mode. Similarly, the steam selector switch is tested and if in the manual position, the actual valve position is set into the DESVPO memory location. The subroutine next branches to test bin or TSTBIN shown in FIGS. 20A-C.

The test bin or TSTBIN subroutine monitors the amount of dry feed in the bin and if neither a high bin or low bin condition is detected, this subroutine is skipped and returns to the test start or TSTRT subroutine. If a high bin is detected, the cooler bypass and cleanout is turned off and a display is flashed to warn the operator if it did not turn off. Next several interlocking steps are performed and then the mill load is tested at the 55% level. If abcve 55%, molasses is turned on, and a timer is tested to see if it is time to adjust the mill load. If so, the timer is reset and the mill load is tested against the desired mill load or DESMIL. If less than desired mill load, the desired dry flow or DESDRF is incremented or the maximum value stored in memory. If greater than desired mill load is detected, then the subroutine branches to test start.

If a low bin condition is detected, the bin low display is flashed, steam jackets are turned off, molasses is turned off, and mill load is tested at the 30% point. If greater than 30%, the rest of this subroutine is skipped and it branches back to test start until the mill load is less than 30%. If less than 30%, a fixed feeder speed is set, the fines steam is turned on, and the cooler bypass and clean-out is turned on, with flashing displays to warn the operator if they did not turn on. Mill load is next tested at the 20% level, and if below 20%, the cooler is tested for its condition. If it is low, the end of run timer is started and after it times out, this subroutine branches to initialize end of run or INLEOR in the main equipment monitor subroutine above.

That completes the detailed description of the software flow charts which provide one mode of operation for applicant's computerized pellet mill controller. It is to be understood that other software routines could be developed emphasizing other control and system operating parameters or combinations thereof, or which might approach the solution to monitoring and controlling a pellet mill from a different conceptual viewpoint. However, this program and all others which are obvious variations of it are included within the scope of this invention, and would be a functional equivalent thereof.

We claim:

1. A digital electronic automatic controller for a continuous pelleting apparatus, said pelleting apparatus having means to produce pellets, said pellets being comprised of a plurality off ingredients, said controller having means to select a desired proportion of said plurality of ingredients to be used in the formulation of said pellets, means to control the rate of input of said ingredients, means to monitor a plurality of system operating parameters, means to control said ingredient input control in response to at least one of said system operating parameters, and means to permit operator selection of said controlling system operating parameter 2. A microprocessor based automatic controller for a continuous pelleting apparatus, said pelleting apparatus having means to produce pellets, said pellets being comprised of a plurality of ingredients, said controller including a microprocessor having means to monitor and control the input of said ingredients to produce pellets having a desired formulation, means to monitor a plurality of system operating parameters, and means to control the rate of input of said ingredients in response to at least one system operating parameter in accordance with a preselected relationship, said microprocessor being programmable to permit alteration of the control relationship between said system operating parameters and said ingredient input control means.

3. A digital electronic automatic controller for a continuous pelleting apparatus, said pelleting apparatus having means to produce pellets, said pellets being comprised of a plurality of ingredients, said ingredients including dry material, water, molasses, and steam, said controller having means to monitor the temperature and moisture content of the dry material and the mixture of ingredients as it traveres the pelleting apparatus, means to monitor and control the rate of input of ingredients in response to a change in said moisture content, means to monitor and control the rate of input of ingredients in response to a change in said temperature, and means to select said moisture change means or said temperature change means for controlling the rate of ingredient input.

4. The controller of claim 3 further comprising means to monitor a load on the pellet producing means, and means to enable or disable the input of certain ingredients in response to said load monitoring means.

5. The controller of claim 4 further comprising means to permit operator selection of a desired load, said controller having means to maintain said desired load.

6. The controller of claim 4 wherein molasses, water and steam and disabled when the load is less than approximately 30%.

7. The controller of claim 4 wherein water and steam are enabled for loads greater than approximately 45%.

8. The controller of claim 4 wherein molasses is enabled for loads greater than approximately 55%.

9. The controller of claim 4 further comprising means to monitor the amount of dry material remaining to be input, and means to automatically shut down said pelleting apparatus as said dry material id depleted.

10. The controller of claim 9 wherein said pellet producing means inadvertently produces a quantity of improperly pelleted material, or fines, and wherein the controller further comprises means to reprocess said fines before automatically shutting down said pelleting apparatus.

11. An automatic controller for a continuous pelleting apparatus, said pelleting apparatus having means to produce pellets, said pellets being comprised of a plurality of ingredients, said ingredients including dry material, water, molasses, and steam, said controller including a programmable microprocessor, means to input a desired formulation of ingredients including percent water, percent molasses, and percent steam, means to input a desired load for said pellet producing means, means to monitor an actual load on said pellet producing means, means to select and input a plurality of desired operating parameters to be used to control the pelleting process, said desired operating parameters including ΔT, ΔT mill, and percent steam, said controller having means to monitor and control the rate of input of said ingredients in response to at least one of said operating parameters and the desired load to produce pellets having the desired formulation and maintain the monitored load on the pellet producing means approximate to the selected desired load.

12. An automatic controller for a continuous pelleting apparatus, said pelleting apparatus having means to produce pellets, said pellets being comprised of a plurality of ingredients, said ingredients including dry material, water, steam, and molasses, said controller including a programmable microprocessor, means to input a desired formulation of ingredients including percent water, percent molasses, and percent steam, means to input a desired load for said pellet producing means, means to select and input a desired operating parameter to be used to control the rate of input of steam as an alternative to said percent steam input, said operating parameters including ΔT and ΔT mill, and means to monitor and control a load on the pellet producing means by adjusting the rate of input of dry material, the controller having means to automatically adjust the rate of input of water, molasses, and steam to follow the adjustment of the input rate of dry material and maintain the desired formulation.

13. The controller of claim 12 further comprising a timing means, said timing means having means to permit comparison of desired load with the monitored load on the pellet producing means only at preselected intervals, said adjustments to the rate of dry material input being made in response to said comparisons.

14. The controller of claim 12 further comprising a second timing means, said second timing means being functional when ΔT is selected as an operating parameter, said second timing means having means to permit comparison of desired ΔT with actual ΔT only at preselected intervals, said control of the rate of steam input being made in response to said comparison.

15. The controller of claim 12 further comprising a third timing means, said third timing means being functional when ΔT mill is selected as an operating parameter, said third timing means having means to permit comparison of desired ΔT mill with actual ΔT mill only at preselected intervals, said control of the rate of steam input being made in response to said comparison.

16. The controller of claim 12 further comprising means to establish a minimum load point, a medium load point, and a high load point, means to disable input of molasses, water and steam when the load is below the minimum load point, means to enable input of water and steam when the actual load is above the medium load point and means to enable input of molasses when the actual load is above the high load point.

17. The controller of claim 16 wherein the minimum load point is approximately 30 percent, the medium load point is approximately 45 percent and the high load point is approximately 55 percent.

18. The controller of claim 12, wherein the pelleting apparatus further comprises an input bin to hold the dry material to be pelleted, the controller further comprising means to detect a low material level in said bin, means to disable molasses input in response to said low bin level detection means, means to establish a minimum load point and automatically turn off said pelleting apparatus as the actual load drops below said mimimum load point.

19. The controller of claim 18 wherein said pellet producing means inadvertently produces a quantity of improperly pelleted material, or fines, and wherein the controller further comprises means to automatically run fines through said pelleting apparatus after the dry material in the bin has been depleted.

20. An automatic controller for a continuous pelleting apparatus, said pelleting apparatus having means to mix a plurality of ingredients and produce pellets, said pellets being comprised of the plurality of ingredients, said ingredients including dry material and moisture, said controller including a programmable microprocessor, means to input a desired formulation of ingredients, means to input a desired load for said pellet producing means, means to select and input a desired operating parameter to be used to control the rate of input of moisture, and means to monitor and control a load on the pellet producing means by adjusting the rate of input of dry material, the controller thereby having means to separately, simultaneously control said moisture and dry material inputs to optimize the operation of the pelleting apparatus.

21. The controller of claim 20 wherein the moisture ingredient includes steam and water.

22. The controller of claim 20 wherein the desired operating parameters include ΔT and ΔT mill, the controller further comprising means to monitor a temperature of the mixture in the pelleting apparatus at a plurality of positions.

23. The controller of claim 22 wherein the pelleting apparatus includes a mixer/conditioner, the temperature monitoring means including means to measure the temperature of the mixture at two spaced apart positions in said mixer/conditioner to produce a ΔT value.

24. The controller of claim 22 wherein the pelleting apparatus includes a mill, the temperature monitoring means including means to measure the temperature of the mixture at the entry and the exit to said mill to produce a ΔT mill value.

25. The controller of clim 20 wherein the operating parameters include ΔT and ΔT mill, and further comprising means to monitor the temperature of the mixture in the pellet producing apparatus at a plurality of positions and generate a temperature reading corresponding to each position, and means to take the difference between two of said temperature readings.

26. The controller of claim 20 wherein the controller further comprises means to monitor the moisture content of the mixture at a plurality of locations in the pelleting apparatus and produce a signal corresponding to each location, each of said signals corresponding to one of said desired operating parameters.

27. The controller of claim 26 wherein the pelleting apparatus includes a mixer/conditioner and a mill, said moisture content monitoring means including means to measure the moisture content of the mixture in the mixer/conditioner and in the mill.

28. The controller of claim 26 wherein the moisture content monitoring means has means to measure a temperature change in the mixture as it traverses part of the pelleting apparatus.

29. The controller of claim 28 wherein the pelleting apparatus includes a mixer/conditioner and a mill, the temperature change measuring means having means to measure the temperature change of the mixture as it traverses both the mixer/conditioner and the mill.

* * * * *